US009820144B1

(12) United States Patent
Hildner et al.

(10) Patent No.: US 9,820,144 B1
(45) Date of Patent: *Nov. 14, 2017

(54) MOBILE DEVICE MONITORING AND CONTROL SYSTEM

(71) Applicant: Mantech Advanced Systems International, Inc., Herndon, VA (US)

(72) Inventors: Steven Hildner, Leesburg, VA (US); Nathan Klonoski, Arlington, VA (US); Jerry N. Lukin, Jr., Dallas, TN (US); Robert Adam McKay, Sterling, VA (US); Sam Emara, Fairfax, VA (US); Thomas Shanley, Brambleton, VA (US); Thomas Krussel, Herndon, VA (US); Paul Neuner, Ballwin, MO (US)

(73) Assignee: Mantech Advanced Systems International, Inc., Herndon, VA (US)

( * ) Notice: Subject to any disclaimer, the term of this patent is extended or adjusted under 35 U.S.C. 154(b) by 269 days.

This patent is subject to a terminal disclaimer.

(21) Appl. No.: 14/151,118

(22) Filed: Jan. 9, 2014

Related U.S. Application Data

(63) Continuation of application No. 13/735,117, filed on Jan. 7, 2013, now abandoned.

(51) Int. Cl.
*H04M 3/00* (2006.01)
*H04W 12/02* (2009.01)

(52) U.S. Cl.
CPC .................................. *H04W 12/02* (2013.01)

(58) Field of Classification Search
CPC .... H04L 41/0806; H04L 63/30; H04W 12/12; H04W 12/02; H04M 3/42221
See application file for complete search history.

(56) References Cited

U.S. PATENT DOCUMENTS

| | | | |
|---|---|---|---|
| 2006/0041657 A1* | 2/2006 | Wen ...................... | H04W 88/02 709/224 |
| 2008/0216158 A1* | 9/2008 | Imbimbo ................ | H04L 63/00 726/4 |

* cited by examiner

*Primary Examiner* — Nabil Syed
(74) *Attorney, Agent, or Firm* — Morrison & Foerster LLP

(57) ABSTRACT

Methods and apparatus, including computer program products, for surreptitiously installing, monitoring, and operating software on a remote computer controlled wireless communication device are described. One aspect includes a control system for communicating programming instructions and exchanging data with the remote computer controlled wireless communication device. The control system is configured to provide at least one element selected from the group consisting of: a computer implemented device controller; a module repository in electronic communication with the device controller; a control service in electronic communication with the device controller; an exfiltration data service in electronic communication with the device controller configured to receive, store, and manage data obtained surreptitiously from the remote computer controlled wireless communication device; and a listen-only recording service in electronic communication with the device controller.

19 Claims, 7 Drawing Sheets

MOBILE DEVICE MONITORING AND CONTROL SYSTEM

1 CROSS-REFERENCE TO RELATED APPLICATIONS

This application is a continuation under 35 U.S.C. §120 of U.S. patent application Ser. No. 13/735,117, filed 7 Jan. 2013, which application claims priority under 35 U.S.C. §120 of U.S. patent application Ser. No. 12/209,904, filed 12 Sep. 2008, now U.S. Pat. No. 8,373,538, and which application claimed priority under 35 U.S.C. §119(e) to provisional U.S. Patent Application Ser. Nos. 60/971,872, filed 12 Sep. 2007, and 61/076,665, filed 29 Jun. 2008. Each of these cited applications is incorporated herein by reference in its entirety and for all purposes.

2 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright 2007 Oceans' Edge, Inc.

3 BACKGROUND

3.1 Field of the Invention

This invention relates to wireless telecommunication. In particular, the various embodiments of the invention relate to monitoring and tracking wireless communications devices and their activities, the construction and management of applications for performing such functions, the monitoring of activities and data stored in mobile devices, and the transparent exfiltration of collected information from monitored mobile devices using wireless links. The present invention has applications in fields of computer science, electronics, telecommunications, and security.

3.2 The Related Art

Mobile devices include pagers, mobile phones, and combination devices that include the functionality of mobile phones, pagers, and personal digital assistants (PDAs). These devices allow the exchange of textual information (e.g., using pagers, cell phones, or PDAs) as well as voice and data (e.g., using cell phones and PDAs). Mobile devices have also recently been integrated with useful features such as global positioning system (GPS) access, cameras, and scanners (including scanners able to process radio frequency identification (RFID) and barcodes), and magnetic data storage cards. Wireless communication ("wireless") allows two or more electronic devices to exchange information without the need for a physical connection (i.e., a wire or cable) between the devices, using radio or microwave transmissions; and devices using wireless communications can be fixed or mobile. Unlike traditional "wired" technologies, wireless communication technologies permit users to operate from any location at which there is sufficient wireless signal power to enable the communication. Fixed wireless devices allow wireless communication from a fixed location to mobile device. Mobile wireless permits communication between several mobile devices; and mobile devices generally communicate using radio-frequency transmissions.

Transmitters send a signal from a wireless communication point-of-presence to a mobile device, while receivers process a signal received at a point-of-presence from a device. A point-of-presence is a collection of one or more transmitters and receivers that can communicate with a mobile device. For example, a fixed point-of-presence can be a communication tower in a cellular telephone network or a wireless local area network connection at a coffee shop. Fixed points-of-presence are typically spaced so that their ranges overlap to allow continuous communication as a device moves amongst various locations. A mobile point-of-presence can be any other mobile device that is not a fixed point of presence. An example of a mobile point of presence is a laptop accepting WiFi connections or a mobile telephone handset accepting WiFi or Bluetooth. As long as a connection can be made between the point-of-presence and the mobile device, information can be sent and received appropriate to the capabilities of the device. But in many environments, such constant contact between a mobile device and a point-of-presence is not possible; because areas exist which are not in range of a point-of-presence, and variances of land or building materials may interfere with the signal. As a result, a mobile device can be out of coverage for a few minutes or hours, and mobile phone calls, wireless internet connections, and access to mobile points of presence may be cut off unexpectedly.

More recently, mobile devices have allowed application programs to be written to manage data communication (and not just voice) to and from the device so that more advanced functionality can be enabled in the device without connecting the mobile device to a computer or other device to download and install the application programs. Such applications can communicate with other devices, such as networked computers and other electronic equipment (including other mobile devices). Examples include the ability to send and receive email; review and process calendar, tasks, contacts, and other personal information manager records; retrieve, display and manage stock data; find and display nearby restaurants or clothing stores; and to receive or send documents and files using a mobile device. Alternatively, these applications rely upon an always-available Internet connection, and communicate using standard Internet techniques and protocols (for example, sockets, UDP (User Datagram Protocol), TCP (Transmission Control Protocol), and HTTP (HyperText Transfer Protocol)). In some cases, applications make use of WAP protocols and associated WAP Gateways to access Internet resources when the device's display resolution or other capabilities are inadequate for full Internet access. Wireless Application Protocol (WAP) is a standard implemented through WAP Gateways which are servers that act as communications bridges between wireless devices and internet services, transferring data between devices and services, and transforming data as required between the various protocols used. Each of these methods relies on the wireless connection being available when needed.

A user's employment of a mobile device, and the data stored within a mobile device, is often of interest to individuals and entities that desire to monitor and/or record the activities of a user or a mobile device. Some examples of such individuals and entities include law enforcement, corporate compliance officers, and security-related organizations. As more and more users use wireless and mobile devices, the need to monitor the usage of these devices grows as well. Monitoring a mobile device includes the collection of performance metrics, recording of keystrokes, data, files, and communications (e.g. voice, SMS (Short Message Service), network), collectively called herein "monitoring results", in which the mobile device participates. Network management applications monitor device performance in order to identify network and device performance issues. Additional applications of monitoring technologies include the protection of corporate information and ensuring information covered by non-disclosure agreements is not inappropriately distributed. For example, recent high profile securities fraud cases have identified users who have sent details of upcoming mergers and acquisitions to accomplices who use the information for personal profit. Similarly, monitoring technologies provide advantages to law enforcement as the criminal element increasingly uses portable mobile devices to communicate and manage their criminal enterprises.

Mobile device monitoring can be performed using "over the air" (OTA) at the service provider, either stand-alone or by using a software agent in conjunction with network hardware such a telephone switch. Alternatively, mobile devices can be monitored by using a stand-alone agent on the device that communicates with external servers and applications. In some cases, mobile device monitoring can be performed with the full knowledge and cooperation of one of a plurality of mobile device users, the mobile device owner, and the wireless service provider. In other cases, the mobile device user or service provider may not be aware of the monitoring. In these cases, a monitoring application or software agent that monitors a mobile device can be manually installed on a mobile device to collect information about the operation of the mobile device and make said information available for later use. In some cases, this information is stored on the mobile device until it is manually accessed and retrieved. In other cases, the monitoring application delivers the information to a server or network device. In these cases, the installation, information collection, and retrieval of collected information are not performed covertly (i.e. without the knowledge of the party or parties with respect to whom the monitoring, data collection, or control, or any combination thereof, is desired, such as, but not limited to, the device user, the device owner, or the service provider). The use of "signing certificates" to authenticate software prior to installation can make covert installation of monitoring applications problematic. When software is not signed by a trusted authority, the software may not be installed, or the device user may be prompted for permission to install the software. In either case, the monitoring application is not installed covertly as required. Additionally, inspection of the mobile device can detect such a monitoring application and the monitoring application may be disabled by the device user. Alternatively, OTA message traffic may be captured using network hardware such as the telephone switch provided by a service provider. This requires explicit cooperation by the service provider, and provides covert monitoring that is limited to message information passed over the air. As a result, service provider-based monitoring schemes require expensive monitoring equipment, cooperation from the service provider, and are limited as to the types of information they can monitor.

Additional challenges are present when the monitoring results are transmitted from a mobile device. First, many mobile devices are not configured to transmit and receive large amounts of information. In some instances, this is because the mobile device user has not subscribed to an appropriate data service from an information provider. In other instances, the mobile device has limited capabilities. Second, transmitting information often provides indications of mobile device activity (e.g. in the form of activity lights, battery usage, performance degradation). Third, transmitting information wirelessly requires operation in areas of intermittent signal, with automated restart and retransmission of monitoring results if and when a signal becomes available. Fourth, many mobile devices are "pay as you go" or have detailed billing enabled at the service provider. The transmission of monitoring results can quickly use all the credit available on a pre-paid wireless plan, or result in detailed service records describing the transmission on a wireless customer's billing statement. Lastly, stored monitoring results can take up significant storage on a mobile device and the stored materials and the use of this storage can be observed by the device user.

Some devices have a removable identity card. SIMs are part of a removable smart card, and the combination of a SIM and the smart card is commonly referred to as a "SIM card". SIM cards securely store the service-subscriber key used to identify a subscriber to a given wireless network, and they also support the SIM Application Toolkit (STK), which is a standard of the GSM system that enables the SIM to initiate actions that can be used for various value added services, such as payment authorization for purchases. In GSM 2G networks, the STK is defined in the GSM 11.14 standard. In GSM 3G networks, the USIM Application Toolkit (USAT) is the equivalent of STK, and is defined in standard 3GPP 31.111. Both STK and USIM are referred to herein as "STK" when the context does not require specification of the 2G or 3G versions specifically.

The STK consists of a set of functions programmed into the SIM card that define how the SIM can interact directly with the device (commonly referred to in this context as a "handset"), and/or the network. The STK provides functions that can give commands to the handset, for example: to display a menu and ask for user input, to dial phone numbers, or to control or access other device features, such as GPS receivers and RFID readers. These functions enable the SIM to carry out an interactive exchange between a network application and the end user and to provide or control access to the network. Details of STK capabilities and use are defined in the 3rd Generation Partnership Project (3GPP) Specification of the SIM Application Toolkit (STK) for the Subscriber Identity Module-Mobile Equipment (SIM-ME) interface (also known as the 11.14 specification) and related standards documents.

In addition to the STK, SIM cards can implement additional systems for supporting application programs that run on the SIM card. There are a plurality of systems and standards for such support, including the Open Platform and Java Card standards. Some standards support only one operating system or hardware smart card, others, like the Java Card standard, are supported on a plurality of smart cards under a plurality of operating systems. These systems can provide mechanisms for installing applications programs, selecting applications to execute, and means for the application programs to interact with each other or with the world outside of the smart card they are running on. Thus, the open-ended capabilities of applications installed on smart cards pose a potential security hazard to the smart card and to devices in which the cards are installed, similar to that of other general purpose computing devices.

Although SIM cards originated with GSM devices, the cards have proven so useful that other network types have adopted similar mechanisms. For example, CDMA systems have implemented a SIM-like device called a Removable User Identity Module (R-UIM), and a more advanced version of this called a CDMA Subscriber Identity Module (CSIM), which are cards developed for CDMA handsets that are equivalent to a GSM SIM. The CSIM is physically compatible with GSM SIMs, can fit into existing GSM phones, and is an extension of the GSM standard but is capable of working on both CDMA and GSM networks.

Removable identity modules can designate one or more pieces of software to run when a device is powered on with the identity modules. Removable identity modules thus provide a mechanism for surrupticiously installed software to be installed and then moved between devices.

From the foregoing, it will be appreciated that effective covert monitoring of a mobile device requires the combination of several technologies and techniques that hide, disguise, or otherwise mask at least one aspect of the monitoring processes: the covert identification of the mobile devices to be monitored, the covert installation and control of the monitoring applications, and the covert exfiltration of collected monitoring results. As used herein, "covert exfiltration" refers to a process of moving collected monitoring results from a mobile device while it is under the control of another without their knowledge or awareness. Thus covert exfiltration processes can be those using stealth, surprise, covert, or clandestine means to relay monitoring data. "Collected monitoring results" as used herein includes any or all materials returned from a monitored mobile device to other devices, using either mobile or fixed points-of-presence. Examples of collected monitoring results include one or more of the following: command results, call information and call details, including captured voice, images, message traffic (e.g. text messaging, SMS, email), and related items such as files, documents and materials stored on the monitored mobile device. These materials may include pictures, video clips, PIM information (e.g. calendar, task list, address and telephone book), other application information such as browsing history, and device status information (e.g. device presence, cell towers/wireless transmitters/points-of-presence used, SIM data, device settings, location, profiles, and other device information). Additionally, the capability to covertly utilize a mobile device as a covertly managed camera or microphone provides other unique challenges.

Thus covert monitoring of a mobile device's operation poses the significant technical challenges of hiding or masking the installation and operation of the monitoring application, its command and control sessions, hiding the collected monitoring results until they are exfiltrated, surreptitiously transmitting the results, and managing the billing for the related wireless services. The exemplary illustrative technology herein addresses these and other important needs.

4 SUMMARY OF THE INVENTION

The present invention provides software, systems, and methods for surreptitiously installing, monitoring, and operating software on a remote computer controlled wireless communication device.

In a first aspect, the present invention provides methods for the unauthorized surreptitious monitoring and, optionally, surreptitious control of, a remote computer controlled wireless communication device from a control system. In some embodiments, the methods of this first aspect comprise: determining under computer control computer program instructions corresponding to least one device discovery and modification module and computer program instructions corresponding to at least one control module; determining under computer control computer program instructions corresponding to at least one monitoring module; constructing under computer control a first package of computer program instructions for said at least one device discovery and modification module and said at least one control module; publishing under computer control said first package of computer program instructions; constructing under computer control a second package of computer program instructions for said at least one monitoring module; and publishing under computer control said second package; and notifying under computer control said device to initiate download of said first and said second packages. The first and said second packages being constructed according to characteristics of said computer controlled wireless communications device such that said computer program instructions encoded in said first and said second packages are installed and accepted by said computer controlled wireless communication device as if authorized by the user of said computer controlled wireless device, said user of said device being unaware of said installing and accepting without said user's authorization.

In some more specific embodiments, the determining and constructing are performed by a computer controlled module repository. In still more specific embodiments, the method includes receiving under computer control device information at said computer controlled module repository. In yet more specific embodiments, the device information is received directly from said device. And in still more specific embodiments, the device information is received as part of a service call, which in some embodiments is received as parameters to a URI provided as part of said service call to said computer controlled module repository.

In some embodiments, the device information is received from a control service. In more specific embodiments, the information is received from a database.

In other embodiments of the method described above, the device discovery and modification module and said control module are configured under computer control in correspondence with at least one characteristic specific to said device.

Still other embodiments of the invention include those in which said discovery and modification is configured to perform computer controlled operations including at least one of: determining under computer control the OS capabilities of said device; modifying under computer control the security policy and provisioning setting of said device; loading under computer control at least one certificate appropriate to said device;

accessing under computer control the connection of said device; securing under computer control a communications method with said control system; loading under computer control at least one appropriate interceptor and at least one control module. More specific embodiments include further including self-deleting and passing control of said device to said control module; instantiating under computer control said discovery and modification module from a SIM or memory card electronically coupled with said device; and downloading under computer control said discovery and modification module to said device in response to a message sent to said device.

Yet other more specific embodiments include further including redirecting under computer control said device to a specified WAP gateway, intercepting under computer control a request for a software device made through said WAP gateway, and downloading under computer control to said device computer program instructions configured to install said discovery and modification module.

Still more aspects, embodiments, uses and advantages of the invention will be apparent when the Description herein is read along with the Drawings.

5 DESCRIPTION OF THE DRAWINGS

6 DETAILED DESCRIPTION OF EMBODIMENTS OF THE INVENTION

6.1 Overview

Figure 1:
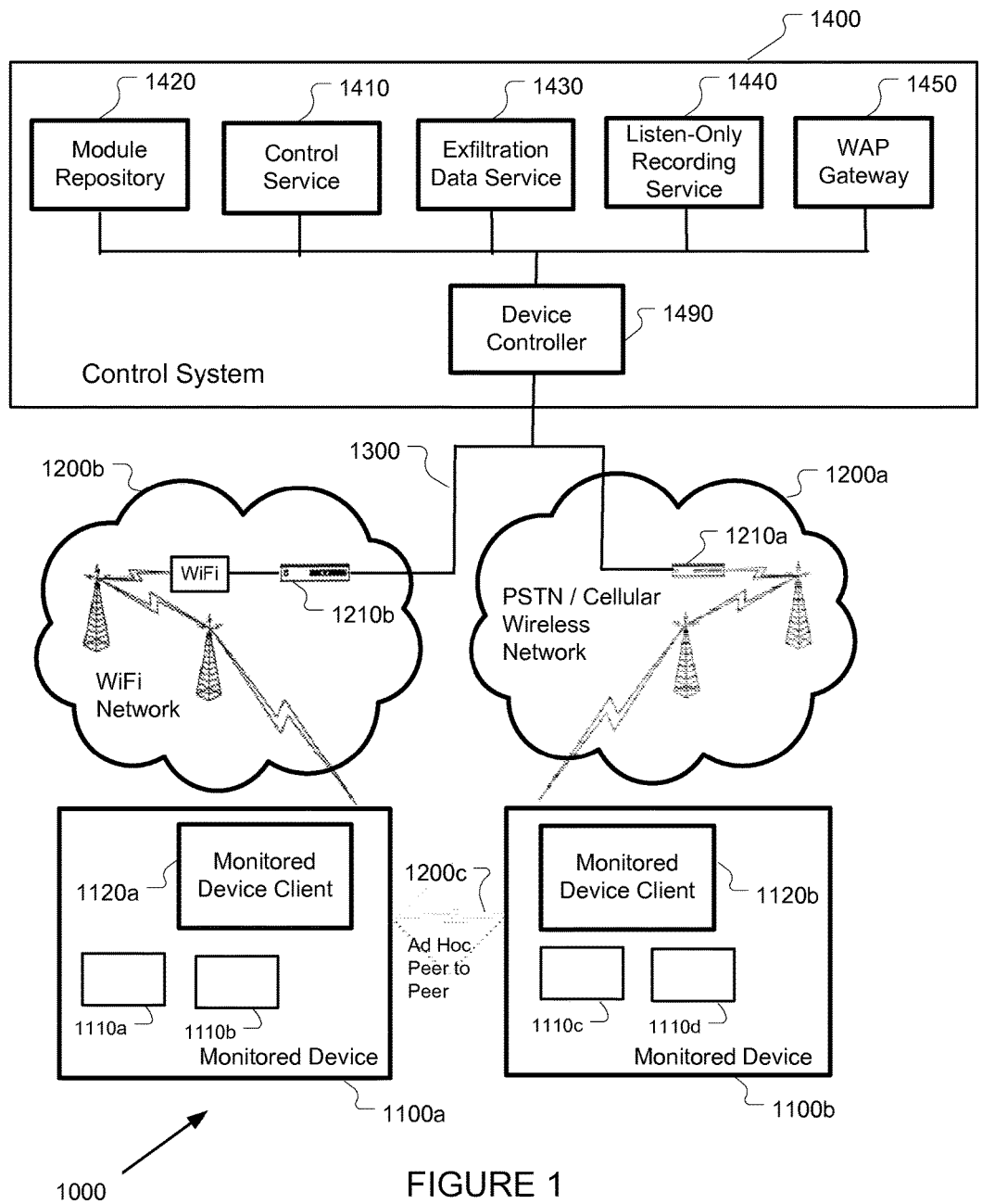
FIG. 1 depicts a schematic diagram of wireless communications system architecture in accordance with one embodiment of the invention.

The present invention provides architecture, system, software, and methods that enable covert or surreptitious gathering of mobile wireless computer controlled communication device (referred to herein as "mobile devices") information and control mobile devices' use. Using the various architectures, systems, methods, and software provided by the invention and described with respect to certain embodiments illustrated herein, mobile devices can be monitored and controlled in a covert or surreptitious manner. The mobile device monitoring system provides methods of covertly, transparently, and remotely distributing, installing, instantiating and managing applications and data on mobile devices with at least one network interface. As it is desirable to implement a system that adapts to incorporate as many devices as possible, the present invention provides a system with a common interface that is independent of device type, device data connection, device network, or device capabilities to the extent possible.

In a first aspect, the present invention provides architectures, software, methods, and systems for covertly or surreptitiously downloading surreptitious monitoring and control software to a mobile device. Various embodiments of this aspect of the present invention include the suppression of various external indicators of device activity in this context, such as, but not limited to, the suppression of lights (e.g., LEDs) indicative of sending and receiving signals, progress bars, status messages, sounds, and the like. Other embodiments of this aspect of the invention include the suppression or circumvention of security software that is configured to identify, locate, and suppress, disable or remove unauthorized software installed on the mobile device.

In a second aspect, the present invention provides architectures, software, methods, and systems for covertly or surreptitiously installing, monitoring and operating software on a mobile device so as to monitor, control, or monitor and control, use of the mobile device. Various embodiments of this aspect of the present invention include the suppression of various external indicators of device activity in this context, such as, but not limited to, the suppression of lights (e.g., LEDs) indicative of sending and receiving signals, progress bars, status messages, sounds, and the like. Other embodiments of this aspect of the invention include the suppression or circumvention of security software that is configured to identify, locate, and suppress, disable or remove unauthorized software installed on the mobile device.

In a third aspect, the present invention provides architectures, software, methods, and systems for covertly or surreptitiously operating software on a mobile device. Various embodiments of this aspect of the present invention include the suppression of various external indicators of device activity in this context, such as, but not limited to, the suppression of lights (e.g., LEDs) indicative of sending and receiving signals, progress bars, status messages, sounds, and the like. Other embodiments of this aspect of the invention include the suppression or circumvention of security software that is configured to identify, locate, and suppress, disable or remove unauthorized software installed on the mobile device. Still other embodiments of this aspect of the invention include covert or surreptitious control of software on the mobile device from a remote system.

In a fourth aspect, the present invention provides architectures, software, methods, and systems for covertly or surreptitiously transmitting data obtained by the monitoring and control software installed on a mobile device to a defined location or external system. Various embodiments of this aspect of the present invention include the suppression of various external indicators of device activity in this context, such as, but not limited to, the suppression of lights (e.g., LEDs) indicative of sending and receiving signals, progress bars, status messages, sounds, and the like. Other embodiments of this aspect of the invention include the suppression or circumvention of security software that is configured to identify, locate, and suppress, disable or remove unauthorized software installation on the mobile device.

More particularly, the present invention provides systems, methods, apparatus, and software (such as encoded on a computer readable medium as computer readable program code devices to cause a computer to take instructed actions) for wirelessly surreptitiously installing, monitoring, and operating software on a mobile device. In some embodiments, the systems, methods, apparatus, and software include or enact a control system for communicating programming instructions and exchanging data with the mobile device. Among those embodiments are embodiments in which the control system includes a computer implemented device controller that is configured to establish communication with the mobile device and relay programming instructions and data to and from the mobile device. The control system includes a module repository in electronic communication with the device controller that is configured to store software modules comprising programming instructions to be communicated to the mobile device. The control system further includes a control service in electronic communication with the device controller; the control service is configured to provide information about the mobile device. The control system optionally includes an exfiltration data service in electronic communication with the device controller; the exfiltration data service is configured to receive, store, and manage data obtained surreptitiously from the mobile device. A listen-only recording service in electronic communication with the device controller is also optionally included. The listen-only recording service is configured to relay surreptitiously telephone communications between the mobile device and a receiver while recording said telephone communications. Some embodiments further include a proxy computer controlled device that forms a communications bridge between the control system and the mobile device. In more specific embodiments, the proxy relays instructions and exfiltration data (defined below) between the control system and the mobile device.

In other embodiments, the control system described above includes a WAP gateway in electronic communication with the mobile device, the WAP gateway is configured to provide WAP services to the mobile device in addition to at least one of recording, blocking, filtering, delaying, redirecting or modifying WAP requests from and responses to the mobile device. In more particular embodiments, The WAP gateway is further configured to forward one or more modules stored in the module repository to the mobile device while the mobile device is communicating with a service provided to the mobile device.

In another aspect, the present invention provides software for use on a mobile device, such device comprising a device operating system, a remote device communications interface in electronic communication with the device operating system and which is configured to enable wireless communications between the mobile device and at least one wireless communications system. Said software is referred to herein as a "monitored device client". A monitored device client is configured to be in electronic communication with the device operating system, and can optionally be configured to be in electronic communication with the remote device communications interface, such that the monitored device client is enabled to covertly and surreptitiously communicate wirelessly with a device controller. In more particular embodiments, the monitored mobile device client further includes at least one monitoring module configured to monitor or control at least one aspect of the operation of the mobile device; said monitoring module is can also be in electronic communication with one or more other modules of the monitored mobile device client. In other embodiments, the monitored device client further includes a covert storage module configured to store information about the remote computer controlled device that has been gathered surreptitiously by the monitored device client. In still other embodiments, the monitored device client further includes a selective router configured to surreptitiously monitor and manage the communications of the mobile device. In still other embodiments, the monitored device client further includes a control application configured to manage the deployment and operation of the modules of the monitored device client. And in still other embodiments, the monitored device client further includes a device discovery and modification module configured to identify the configuration and characteristics of the mobile device and to facilitate the transfer to, installation on and instantiation of at least one other aspect of the monitored device client on the mobile device. The above-described embodiments and additional embodiments and illustrative examples will now be described.

FIG. 1 illustrates an exemplary mobile device monitoring and control architecture in accordance with one embodiment of the present invention, in which a first monitored mobile device communicates with a control system to provide device monitoring and management features under the control of the control system. The exemplary mobile device monitoring architecture comprises a control system (1400), which further includes a control service (1410), a module repository (1420), an exfiltration data service (1430), a listen-only recording service (1440) and a WAP Gateway (1450), each of which is connected through one or more wireless networks (e.g. 1200*a*) such as a cellular network or other wireless network such as a WiFi (802.11b/g) wireless network (e.g. 1200*b*) to any of a plurality of monitored mobile devices (e.g. 1100*a*, 1100*b*), through a computer implemented device controller (1490) as described in greater detail below. Implementation of these elements can be accomplished by those having ordinary skill in the art.

Continuing with reference to FIG. 1, the Figure also illustrates a wireless communication system architecture (1000) in which a first monitored mobile device (1100*a*) communicates with a computer implemented device controller (1490) in accordance with one embodiment of the invention. A monitored mobile device (1100*a*, 1100*b*) is capable of connecting to wireless telephony networks and associated wireless data networks, and can comprise devices such as cell phones, PDAs, handheld or laptop computers with cellular modems, and are described in more detail below and with reference to FIG. 2. Each monitored mobile device (1100) communicates through one or more wireless communications networks (e.g. 1200*a*, 1200*b*) that each include a gateway (1210*a*, 1210*b*) that is in communication with a computer network (1300). Some examples of wireless communications networks (1200*a* and 1200*b*) include cellular telephone networks utilizing CDMA (Code Division Multiple Access) or GSM (Global System for Mobile communications) technologies, and wireless metropolitan or area networks utilizing 802.11-based technologies. The wireless communication networks enable the wireless transmission and reception of information between mobile devices and external systems. Wireless communications can provide, in addition to voice telephony communications, data communications capability, such as TCP/IP-based protocol support, or more limited data communications means using SMS, MMS, FLEX, and other messaging protocols. Additionally, wireless communications can involve communications using peer to peer communications mechanisms, such as Bluetooth, and can even provide hybrid communications using one or more of the above communications means simultaneously or sequentially. Exemplary wireless communications networks (1200*a*, 1002*c*, and 1200*c*) are composed of components having designs, materials, and methods well known to those of ordinary skill in the art.

The network (1300) provides communication with a device controller that is in communication with one or more services or servers, and at least a first monitored mobile device (1100).

The control system (1400) further comprises one or more instances of services hosted on one or more computer systems, commonly called services. Each service may be operated on a computer, which is commonly called hosting. Each service is hosted on a single computer or alternatively, instances of each service can be hosted on several discrete computers. Further alternative configurations can provide for several different services to be hosted on a single computer.

The device controller (1490) of the control system (1400) provides communications support and routing selection between each particular monitored mobile device and server components such as a control service (1410), a module repository (1420), an exfiltration data service (1430), a listen-only recording service (1440) and a WAP Gateway (1450). Components (1400, 1410, 1420, 1430, 1440, 1450 and 1490) can be integrated into a single component, or implemented as one or more separate server devices and database components as shown in FIG. 1. The device controller (1490) selects one or more communications networks and methods for communicating between a particular monitored mobile device and one or more service components. The selection can be made upon a variety of factors and may be made automatically or under control of a person operating the device controller. Some factors that may be used by the device controller in the selection process include the device ID, device OS, device status, network availability, network device user configuration, network carrier configuration, version and capabilities of software on the monitored mobile device, and the instructions of the control system operator. In a first exemplary embodiment, the device controller (1490) can select an SMS communication link using a commercial cellular telephone network, such as those provided by commercial service providers like Verizon or AT&T/Cingular. In a second exemplary embodiment, the device controller (1490) can select a TCP/IP communications link using a wide area wireless network such as metropolitan wireless network such as those provided by Earthlink or MetroFi. In some exemplary embodiments the device controller (1490) can select a plurality of communication links and permit the selective router module (2320) on the monitored device to choose between them as detailed below.

The device controller (1490) provides networking infrastructure that permits each service to communicate with one or more monitored mobile devices (1100) using one or more communications networks and protocols as described above. The device controller (1490) can be integrated into each service, or can be structured as one or more additional components. The device controller (1490) can optionally switch between wireless networks, communication protocols, and can split or assemble communications from partial communications using disparate networks. For example, a device controller (1490) can use SMS to communicate with a monitored mobile device (1100) when its status is not known, and switch to communications on an 802.11 WiFi link when a monitored mobile device (1100) is known to be in range of an 802.11 wireless network. Additionally, a device controller (1490) can break a larger message into smaller parts, referred to as fragments, and communicate these fragments over protocols that are not capable of communicating the entire message in one piece. The device controller (1490) also can receive message fragments from a monitored mobile device and "reassemble" them into complete messages for processing by a service.

Additionally, the device controller (1490) can be configured to determine an appropriate way to reach a specific monitored mobile device using a combination of state information and routing information. Thus, as a monitored mobile device moves from being only reachable on a cellular network, to being reachable on a higher bandwidth 802.11 based wireless network, to being reachable using a peered device as a proxy or gateway, to being completely inaccessible, the device controller (1490) can consolidate this information and provide a common means for most efficiently reaching the monitored mobile device (1100).

The device controller (1490) also can provide message encryption/decryption, determine device status based upon periodic reporting (e.g. heartbeat), and other services as will be described in further detail below.

Services (1410, 1420, 1430, 1440 and 1450) preferably communicate with each monitored wireless mobile device (1100a, 1100b) using the device controller (1490) as described above. Alternatively, the services can communicate directly with a monitored wireless mobile device. Direct communication with a monitored wireless mobile device means communicating with the monitored mobile device (1100) using a well-known protocol such as TCP/IP in the case of wireless networks (such as 802.11 networks) using common networking protocols. In telephony based networks such as CDMA or GSM networks, direct communications with a monitored wireless mobile device means communicating with the telephony network provider's network interface using a well known protocol, and having the network interface communicate with the monitored wireless mobile device on the service's behalf using a telephony protocol. In the illustrated example, services include specific applications in the form of an exfiltration Data Service (1430) a Control Service (1410), a Module Repository Service (1420), a Listen-Only Recording Service (1440) and a WAP Gateway, each of which in turn pass data to, and receive data from, a monitored mobile device with a monitoring component ("monitored mobile device client," 1120a/b). The monitored mobile device client (1120a/b) also can serve as a filter between network traffic and the applications (1110a/b/c/d) running on the monitored mobile device (1100).

Although FIG. 1 illustrates a mobile device for illustrative purposes, the term "mobile device" will be defined herein to include not only traditional mobile devices including pagers and cellular telephones, but also terminal devices, emulated devices, and server devices connected to at least one wireless network. Aspects of the exemplary, illustrative technology are equally applicable to all classes of devices that experience intermittent connectivity, such a laptops and PDAs that are intermittently connected to a company LAN. In addition, although FIG. 1 shows communication between a service (e.g., a server contained within the network (1300) or within the device controller (1490)) and a particular monitored mobile device (e.g., 1100a) it will be appreciated by those of ordinary skill in the art that an arbitrary number of devices can communicate with each other in accordance with the technology as described herein. Thus, the exemplary illustrative technology herein includes communications among all types of devices.

6.2 Module Repository 1420

The module repository (1420) is, in some embodiments, a server device hosting the module repository (1420) service. In such embodiments, the module repository (1420) service stores and manages monitored mobile device modules, selects modules for deployments, provides installer packages and configurations for specific monitored mobile devices (1100), and manages known monitored mobile device type-module associations. The module repository (1420) can be constructed using a network appliance or server computer running one of the server operating systems well known to those skilled in the art.

The module repository (1420) maintains a database of modules (described below) and manages a list of associations between specific types of monitored mobile devices (1100) and modules that can be used on those monitored mobile devices (1100). Types of monitored mobile devices can be further categorized by the operating system used, the communication service provider used by the device, or by other relevant factors as determined by those of skill in the art. Operating systems and other relevant factors can be further categorized, such as by version numbers or options installed. The modules themselves can be taken from a database, a directory, shared files, or other storage means known to those skilled in the art. In some embodiments, groups of modules can be grouped together by the module repository (1420). The database of modules provides a mechanism for identifying modules that may be associated with a particular monitored mobile device (1100), network provider, or other attribute.

In one embodiment, the module repository (1420) maintains a database of tags associated with each module stored in the system. The database of tags identifies a specific monitored mobile device or device type (1100), operating system, and control function provided by a module. A selection of modules that include a set of well-known tags can be selected from the database using well-known query techniques. For example, a query can be constructed to search for all modules with a minimum set of tags. One such example query might be constructed for a "Blackberry 1710" monitored mobile device (1100) and would be for all modules that have a "Device=Blackberry 1710" tag. A more refined query might be for modules that have a "Device=Blackberry 1710" tag and an "OS=4.1" tag. The tag can take the form of a database entry, or can be contained within a digital signature certificate provided with the modules.

In other embodiments, a list of modules for each specific monitored mobile device (1100) or monitored mobile device configuration can be loaded into the module repository (1420). The module repository (1420) can use this list of modules to associate specific modules with a specific monitored mobile device (1100) of a known type. The list may be stored in a database, flat file, directory service, or other storage means (not shown).

Figure 3:
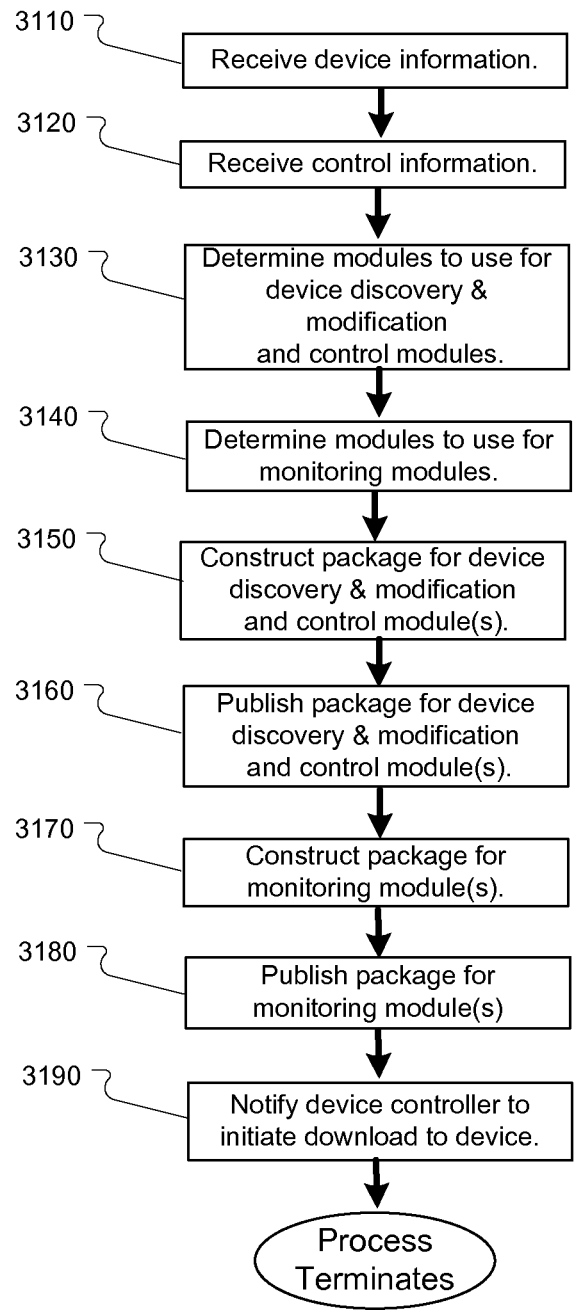
FIG. 3 is a process flow chart depicting the steps performed by the module repository (1420) to select a package, in accordance with one embodiment of the invention.

The module repository (1420) uses information obtained from a device discovery and modification module (2310) in conjunction with the pre-defined association information, and desired control information, to construct a list of modules to be deployed to a monitored mobile device (1100), and to provide a distribution package for module distribution. Alternatively, an operator can assign a list of modules to be deployed to a monitored mobile device. The module(s) can be packaged using an appropriate packaging technology, for example, Microsoft cab and dll files for Windows, SIS files for Symbian, jar files for J2ME, or other packaging and distribution means appropriate for the destination mobile device. The module repository (1420) can encrypt the package using a common or device-specific key to protect the contents. In some embodiments, one or more modules can be pre-associated and delivered as a unit by the module repository (1420). FIG. 3 is a process flowchart that details the steps performed by the module repository (1420) to produce a package.

As can be seen in FIG. 3, in step 3110, the module repository (1420) receives monitored mobile device information (for example, one or more of device type, OS version, device ID, etc.) from either the control service (1410) or directly from a monitored mobile device (1100). In a first exemplary embodiment, the monitored mobile device information is stored in a device database and is made available to the module repository (1420) using that database. In a second example embodiment, the monitored mobile device information is provided directly to the module repository (1420) as part of the service call. In an even more particular embodiment, the monitored mobile device information is provided to the module repository (1420) as parameters to a URI provided as part of a service call to the module repository (1420).

In optional step 3120, the module repository (1420) receives control information indicating the monitored mobile device (1100) and the controls and modules to be deployed to the monitored mobile device (1100). The control information may include such information as the monitored mobile device (1100) ID and the desired controls and modules for the monitored mobile device (1100). In some exemplary embodiments, the control information is preconfigured within the device repository or within a database accessed by the module repository (1420). In other particular exemplary embodiments, the control information is provided to the module repository (1420) from another service, such as the control service (1410).

In step 3130, the module repository (1420) uses the monitored mobile device information and the control information to determine the specific modules to use for the device discovery and modification module (2310) and the control module (2340). Different monitored mobile devices (1100) can have differing requirements for the device discovery and modification module (2310) and control module (2340) based upon device-specific characteristics, such as monitored mobile device operating system (2100), configuration parameters, and the like. Differing modules can be provided in order to effectively manage and control modules installed to different configurations of monitored mobile devices.

In step 3140, the module repository (1420) uses the monitored mobile device information and the control information to determine the monitoring modules to use for the monitored mobile device (1100). Different monitored mobile devices have varying hardware configurations, such as cameras and available memory, and each piece of hardware can require differing modules. For example, it makes no sense to deploy an image capture module to a monitored mobile device (1100) that does not have an embedded image sensor (e.g. a camera). Module deployment packages appropriate to each known device type can be pre-built and stored for selection as needed, modules can be stored individually and assembled into a deployment package as needed, or a combination of these methods can be used for different device types, as determined to be appropriate by those having skill in the art.

In step 3150, the module repository (1420) selects or constructs a deployment package for the device discovery and modification module and control module(s) determined in step 3120. The deployment package can be as simple as a list of modules to be downloaded or a single file that contains multiple modules. The single file may be a single module, or may be an installer package as described above.

In some embodiments, the deployment package is protected for integrity using techniques such as digital signatures that are well known to those skilled in the art. Similarly, each deployment package can be optionally encrypted using either public key or symmetric key encryption. For example, a deployment package may be encrypted using a key specific to a mobile device, such as the mobile devices' device ID. Carrier and manufacturer device identification numbers are good candidates for potential keys.

Once a deployment package is selected or constructed, the module repository (1420) makes it available in a step 3160, referred to as "publishing." Publishing the package makes the package available to monitored mobile devices (1100) and other services. In one particular embodiment, the deployment package is published to a service that makes it available to the monitored mobile device (1100) for download.

The process of selecting or constructing and publishing one or more deployment packages for the modules to be deployed to a monitored mobile device (1100) are repeated for the monitoring modules. These steps are shown in the flowchart as steps 3170 and 3180.

In the flowchart of FIG. 3, steps 3150 to 3180 are shown as discrete steps for clarity as to the functional aspects of the process. Without loss of generality, in some exemplary embodiments, steps 3150 and 3170 are combined for efficiency. Similarly, steps 3160 and 3180 may be combined for efficiency Similarly, steps 3150 to 3170 may be repeated as often as necessary, and can produce several deployment packages for a single monitored mobile device (1100). Likewise, once a deployment package, or packages, has been created for a particular device type, operating system or other relevant factors, the package(s) can be stored, for example, in a database, and used with a plurality of mobile device instances that match the device type, operating system or other relevant factors that the package was created for. This capability permits greater efficiency, and shortens deployment time.

In step 3190, the module repository (1420) notifies the device controller (1490) to initiate download of one or more packages to a monitored mobile device (1100).

Modules downloaded to a monitored mobile device will replace, modify, enhance, or otherwise alter the normal processing of one or more aspects of the device operating system or other typical software for purposes of implementing the technology herein. Where the device operating system or other software supports the concept of "loadable modules" (e.g. "dynamic loadable libraries (DLLs)", "plug-ins", or "drivers"), it can be possible to implement one or more of the downloaded modules in the form of loadable modules and incorporated into the monitored mobile device's systems using the facilities present in the device to support this mode of operation. In some cases it can be possible to replace the monitored mobile device's operating system in whole or in part with software that supports the monitoring and other aspects of the technology described herein in addition to providing the expected behavior in the monitored device from the point of view of the device's user, service provider, and other entities that are not involved in the monitoring and other activities of the technology described herein. In some cases the original device software can be retained and used in whole or in part to accomplish this, while not being allowed to regain full control over the monitored device.

6.3 Control Service (1410)

The control service (1410) provides command and control services to the control system (1400). The control service (1410) provides a database of devices currently being monitored, in which information about each monitored mobile device (1100) is stored. This information includes monitored mobile device identification information, such as IMEI (International Mobile Equipment Identity), IMSI (International Mobile Subscriber Identity), MIN (Mobile Identification Number), and ESN (Electronic Serial Number), along with assigned telephone number, monitored mobile device configuration information, such as the version of the operating system present on the monitored mobile device (1100), and monitored mobile device information such as device type, model, and device capabilities. For example, a device type and model can be used to identify the specific equipment being used at the monitored mobile device (1100). Device capabilities include the availability of GPS or camera functions on the monitored mobile device (1100). The database is also used to form associations between one or more monitored mobile devices (1100), such as identifying monitored mobile devices (1100) associated with one or more persons. The database thus provides the ability to look up and control a monitored mobile device (1100) if a user knows the identifying information or a person associated with the monitored mobile device (1100). Thus, the monitored mobile devices (1100) associated with a particular person (e.g. a particular user's three cellular telephones), or all of the cellular telephones belonging to a group of people (e.g. the cellular telephones of a particular group of interest), can be associated together. The ability to associate disparate monitored mobile devices (1100) provides a mechanism to provide common command and control to all of the monitored mobile devices (1100) that are so associated together in a group.

The control service (1410) also manages the status of each monitored mobile device (1100) known to it. The status of the each monitored mobile device (1100) defines whether the mobile device is currently online and available, the aspects of monitoring that the device is configured to support, and whether the monitored mobile device (1100) has uploaded all monitored information that has been collected. Other information collected in the status of the monitored mobile device (1100) includes whether a monitored mobile device (1100) is reporting information on schedule, current state of the mobile device and its security mechanisms (e.g. the device's ability to perform the monitoring functions covertly), and whether the mobile device is currently collecting monitoring (or not).

The control service (1410) is further able to issue commands to and monitor requests from the control component of the monitoring device client (1120). The control service (1410) preferably operates in conjunction with the other services, in particular, a device controller (1490), to send commands to and receive responses from monitored mobile devices (1120). The control service (1410) also monitors requests from monitored mobile devices (1100), including data exfiltration requests and module download requests. In some embodiments, the control service (1410) receives these requests and forwards them to another service for processing. In other embodiments, the control service (1410) receives notifications of the requests from the service processing the request.

The control service (1410) supports several commands related to monitoring mobile devices. Examples of such commands are listed in Table 1.

TABLE 1

Control Service Commands

| COMMAND | FUNCTION |
| --- | --- |
| Collect Device Information | Requests device information from the network provider and/or monitored mobile device (1100). Obtains device information, including operating system version, device type, and device capabilities. |
| Status update | Requests a status update from the network providers and/or one or more monitored mobile device (1100). |
| Install/uninstall module | Requests one or more monitored mobile device (1100) to install/uninstall one or more particular modules. |
| Start/stop monitoring | Requests one or more monitored mobile device (1100) to start/stop specific aspects of monitoring. |
| Start/stop exfiltration | Requests one or more monitored mobile device (1100) to start/stop specific aspects of the exfiltration of monitoring results. |
| Disable device | Requests one or more monitored mobile devices (1100) to be disabled. |
| Set Destination | Sends the Device the specified URL for exfiltration information. This is set upon initial installation and canalso be updated after module installation |
| Provisioning Device Settings | Allows for device settings to be updated or changed that creates the device runtime environment to be most receptive to exploits |

The control service (1410) manages and controls operations of other services of control system (1400). These services can be used to extend the range of commands and functions provided by the control service (1410).

The control service (1410) primarily communicates with other services using a combination of service interface calls and responses, direct application requests, and using various event-based mechanisms. For example, the control service (1410) may communicate with the exfiltration data service (1430) using a service-based interface to determine a list of monitoring results stored for a specific monitored mobile device (1100), and can further communicate with a notification service (not shown) in order to cause a specific user to be notified when new monitoring results have been received for a specific monitored mobile device (1100).

Lastly, the control service (1410) provides a user interface for managing monitored mobile devices, commands, and the command (results). In some embodiments, this is a web-based interface.

6.4 Exfiltration Data Service (1430)

The exfiltration data service (1430) receives, stores, and manages monitoring results exfiltrated from one or more monitored mobile devices (1100). The information is stored by the exfiltration data service (1430) as described below, and is preferably cross-referenced by source device information. In some embodiments, the exfiltration data service (1430) provides a file store in which exfiltration data is stored. In alternate embodiments, the monitoring results may be stored in a database or other content management system that is part of the exfiltration data service (1430). In some implementations, the exfiltration data service (1430) provides key management service to manage the encryption keys of encrypted monitoring results. Monitoring results can be encrypted (or re-encrypted) by the exfiltration data service (1430) in order to protect the monitoring results after they are received from a monitored mobile device (1100). Similarly, the exfiltration data service (1430) may digitally sign, or otherwise protect for integrity, monitoring results using techniques understood by those skilled in the arts. Protecting monitoring results in this manner preserves their usefulness as evidence when the system of the present invention is used by law enforcement personnel.

The exfiltration data service (1430) makes this information (monitoring results, key information) available to authorized users. The information can be provided using a dedicated user interface or as part of a service interface. In some embodiments, the exfiltration data service (1430) can send a notification to one or more services or users by sending an event, a service call, or by other means when a specific monitoring result is received and made available by the exfiltration data service (1430).

6.5 Listen-Only Recording Service (1440)

The listen-only recording service (1440) provides a telephone number, accepts a telephone call and a forwarding number from the monitored mobile device (1100), and forwards the call to the forwarding number, makes a recording, and sends the recording to a data repository (not shown).

When the user of the monitored mobile device attempts to place a call that requires monitoring, the monitored mobile device temporarily blocks the call from being placed, contacts the Listen-Only Recording Service (1440) to obtain a telephone number and to provide the Listen-Only Recording Service (1440) with the number the device user has attempted to call (the forwarding number). The monitored mobile device then places a call from the monitored mobile device to the number provided by the Listen-Only Recording Service (1440). The Listen-Only Recording Service (1440) places a call to the forwarding number, answers the call from the monitored mobile device and, for the duration of the call from the monitored mobile device, records the call and forwards the call to the forwarding number. In this way the monitored mobile device user obtains the expected call to the requested party, but the Listen-Only Recording Service (1440) is enabled to record the call for future use. In some exemplary implementations, the monitored mobile device's call log is adjusted to show that the call was placed to the originally requested number, rather than to the number provided by the Listen-Only Recording Service (1440). In some exemplary implementations the Listen-Only Recording Service (1440) provides the monitored mobile device's identifying information to the communication service provider when placing the call to the forwarding number so that the call is reflected as expected on the device user's account in order to maintain covertness and surreptitiousness of operations.

An alternative method of operation for the Listen-Only recording Service (1400) involves the monitored mobile device placing the originally requested phone call to the originally requested phone number, and including the Listen-Only Recording Service (1440) phone number in a conference call arrangement, so that the Listen-Only Recording Service (1440) is enabled covertly and surreptitiously to record the telephone call. In some exemplary embodiments, the monitored mobile device's call log is adjusted to show that the call was not placed as a conference call, and the call is placed in such a manner as to avoid conference call charges appearing on the device user's account using methods described herein. The methods used to place conference calls from wireless mobile devices are well understood by those having skill in the art.

When it is desired to record a call placed to a monitored mobile device, the monitored mobile device transmits the data to the exfiltration data service for storage, as with other gathered data. When possible, such exfiltration is done as the call occurs. Some devices, such as GSM phones, do not support concurrent voice and data connections. On such devices incoming and outgoing (mobile originated and mobile terminated calls) are recorded to device memory as audio files while the call is active. When the call is complete the recorded audio files are uploaded from the device's memory to the server. When the files have been confirmed as received by the server, the monitored mobile device deletes the recorded audio files from the device's memory.

6.6 WAP Gateway (1450)

The Wireless Application Protocol (WAP) Gateway (1450) acts as a normal WAP Gateway service for the monitored device, but also permits recording, blocking, filtering, delaying, redirecting or modification of WAP requests from, and associated responses to, the monitored device. The WAP Gateway service used by the device is specified for the monitored device by the Device Discovery and Modification Module, described below, as part of its normal modification of the mobile device's configuration, policy and provisioning settings. The WAP Gateway (1450) in some exemplary embodiments performs all normal WAP gateway services for the monitored mobile device. In other exemplary embodiments, the WAP Gateway (1450) passes those WAP messages that are not blocked or filtered, optionally after recording, delaying, or modification, between the WAP gateway service originally configured for the monitored mobile device and the monitored mobile device. Such use of the originally configured WAP gateway service can simplify implementation of the WAP Gateway (1450), and also provide an approximation of expected traffic levels to and from the originally configured WAP gateway service, which reduces detectable influences resulting from the operation of the system of the present invention, thus increasing its stealthiness in covert operation scenarios.

The WAP Gateway (1450) can also be used as a method of covert deployment for modules installed on a monitored mobile device. By redirecting the monitored mobile device's WAP gateway traffic through the WAP Gateway (1450), modules of the present invention can be substituted for, or included with, software being downloaded by the device or device user. This avoids a need for a separate transmission of the modules, and "piggybacks" on a known, expected or otherwise unremarkable network connection. In some scenarios the user can install, or authorize installation of when prompted, the modules, while believing they are desired software or data.

In an alternate exemplary method of specifying the WAP Gateway to be used by a device, a device that accepts WAP Gateway settings in the form of signed WAP Binary XML (WBXML) sent via SMS message can be reconfigured by creating a settings specification in XML, converting it to WBXML and signing the result by methods well understood by those having skill in the art. The signed WBXML is sent to the device via an SMS message. The exemplary device, like many in actual current use (such as those used by TMobile of Olympia, Wash.), accepts signed settings without prompting the device user. Once the settings are accepted by the device, the WAP Gateway specified in the settings will be used, rather than the WAP Gateway previously specified for use by the device. This method of altering the WAP Gateway settings of the device is independent of the existence of the Device Discovery and Modification Module on the device, and can be used as a method of instantiating the Device Discovery and Modification Module in some exemplary implementations as described below.

6.7 Network (1300) and Network Billing

The network (1300) provides communication with a control system (1400) and one or more monitored mobile devices (1100).

A mobile device, such as a cell phone, is typically formed of software, firmware, and hardware adapted to provide communications services over a specific wireless network provided by a specific network operator. This process of forming the relationship between the mobile device and the wireless network is known in the art as provisioning. Typically a network operator provisions the mobile device in conjunction with a subscription to a service contract. The service contract specifies the types of voice and data services available to the mobile device user and the charges associated with the use of those services. In some instances, users form a temporary relationship with a service provider using "prepaid" mechanisms that effect payment without a formal service contract.

In a voice and data wireless network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems), both voice and data services may be available to mobile devices. Example voice services include voice calling and Short Messaging Service (SMS). Example data services include Internet browsing, email, and Multimedia Messaging Service (MMS).

Although many services may be available on a given network, only those device users that use mobile communications devices that have been provisioned for those services will be able to benefit from them. This may present problems for the device user and the network operator alike. Network operators provide "free of charge" provisioning services to device users. These services are also called "Type 0" services. Other services are provided by the network operator for managing their network and device configurations. Collectively, type 0 and related network operator-provided management messages are called "carrier reserved protocols".

Each monitored wireless mobile device (1100) communicates through one or more wireless communications networks (e.g. 1200a, 1200b) each of which in turn is in communication with a computer network (1300). Some examples of wireless communications networks (1200a and 1200b) include cellular telephone networks utilizing CDMA (Code Division Multiple Access) or GSM (Global System for Mobile communications) technologies including wireless metropolitan or area networks utilizing 802.11-based technologies. The wireless communication networks enable the wireless transmission and reception of information between monitored mobile devices and external control systems. Wireless communications may provide TCP/IP-based protocol support, can provide more limited communications means using SMS, MMS, FLEX, and other messaging protocols. Additionally, wireless communications can provide communications using peered communications mechanisms such as Bluetooth, and can even provide hybrid communications using one or more of the above communications means. Exemplary wireless communications networks (1200a, 1002c, and 1200c) are composed of components having designs, materials, and methods well known to those of ordinary skill in the art.

In some embodiments, the exemplary technology includes a peer-to-peer network connection to a second device, which performs as a proxy between the mobile device and the control system (1400). The alternative technology provides for a proxy device, which can be a mobile device as described herein, a server, or other computer system such as a desktop computer. Alternatively, a network appliance such as a cable modem or set top box may be used as the proxy device. The proxy device provides for control channel and exfiltration information to be communicated to and from the first mobile device via the proxy device instead of communicating directly with the first mobile device. Use of a proxy device is effective for bypassing firewalls and monitoring systems using peer-to-peer networks and protocols.

Figure 4:
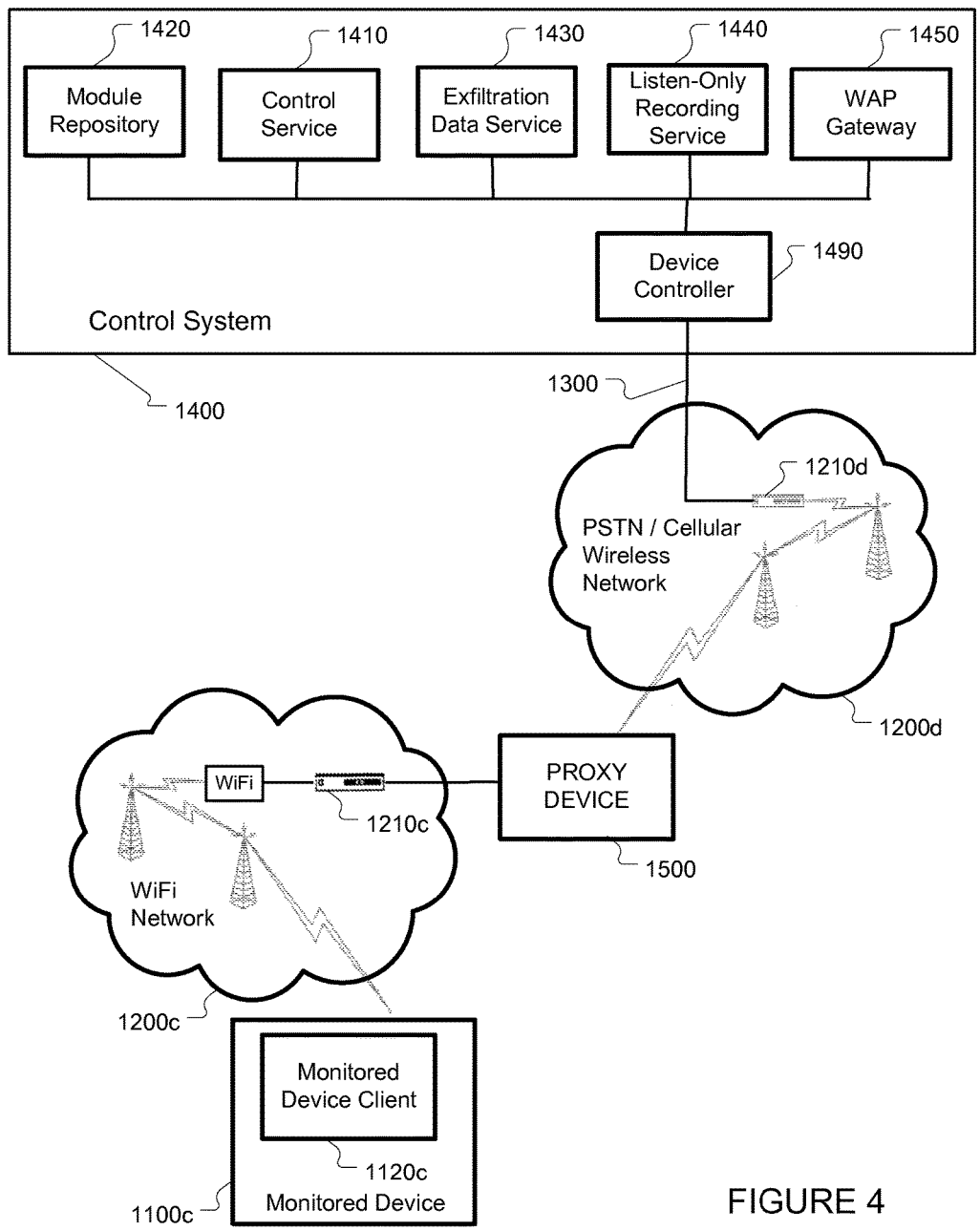
FIG. 4 depicts an exemplary peer-to-peer network connection using a proxy device between the monitored mobile device (1100) and the control system, in accordance with one embodiment of the invention.

In one particular implementation, a peer-to-peer network connection can be constructed between the first mobile device (the monitored mobile device) and a second mobile device (e.g. the proxy device) using a peer-to-peer network such as Bluetooth, Infrared, or 802.11 technologies. Other wireless technologies can be used if they are supported by both the monitored mobile devices (1100) and the proxy device. Control information can be passed from the control system directly to the monitored mobile device (1100), or can be relayed through the proxy device. Exfiltrated information can be passed directly to the control system, or can be passed to the proxy device for forwarding to the control system. FIG. 4 shows an exemplary peer-to-peer network connection where exfiltrated information is passed from the monitored mobile device (1100c) through a 802.11 connection (1200c) to proxy device (1500), which then forwards the exfiltration information through PSTN/cellular wireless network (1200d) to network (1300) to control system (1400). Control information also can be passed in the opposite direction through the network from control system (1400) to the proxy device (1500) and then to the monitored mobile device (1100a).

One challenge for covert operation over commercial networks is masking or removing call detail records associated with telephony and access services provided by wireless carriers. Traditional service agreements provide for wireless device customers to pay charges based upon their usage and to optionally provide call details for all usage of the wireless device against a specific account. Payment arrangements may vary, ranging from monthly subscription, ala carte pricing, prepaid cards, and other commercial schemes implemented by wireless network operators. Various techniques can be used by the present invention to circumvent the accounting and call details that are collected by the wireless carriers.

In a first implementation, the present invention shifts network traffic from a first wireless carrier's network to a second wireless carrier's network. For example, the mobile device may be instructed to route covert messages over a second wireless operator's network where the charges for use of the second wireless network are billed to the control system operator instead of the mobile device user. This can be accomplished by providing alternative device identification numbers that are registered with the second wireless network, or by providing third party billing information to the wireless network provider. Alternatively, the network traffic can be routed to alternate networks, such as WiFi networks if they are in range, where the WiFi network is either not controlled or billed to the mobile device user, or for which alternative billing options have been provided. An example of this technique is to connect to a public WiFi network such as those provided by Earthlink and to connect using an SSID and account that charges the control system operator for use of the WiFi network. Covert traffic may be sent using any of these techniques that eliminate the charges and call detail record reporting to the mobile device user for that covert traffic, having the effect of hiding the traffic reporting on monthly statements.

In a second implementation, covert message traffic may be charged as "type 0" traffic and thus be masked from the device user's bill. In a variant of this tactic, the control system operator may register as a content provider with the wireless network operators, and arrange for usage of their "content service" to be charged to them instead of the mobile device user.

Lastly, for users operating with prepaid services, the control system can automatically replenish funds the mobile device users' prepaid account to compensate the user for use. This technique works because prepaid accounts generally do not provide call detail information to the mobile device users but instead only provide the remaining balance available.

6.8 Monitored Mobile Device (1100)

A monitored mobile device (1100), as described above, can include a cellular telephone, Blackberry, PDA, or other device that communicates using wireless telephony and related data technologies. These devices have a variety of capabilities, including voice telephony, wireless data exchange, applications and capabilities such as Personal Information Management (PIM), camera, Global Positioning System (GPS), and other functions.

Figure 2:
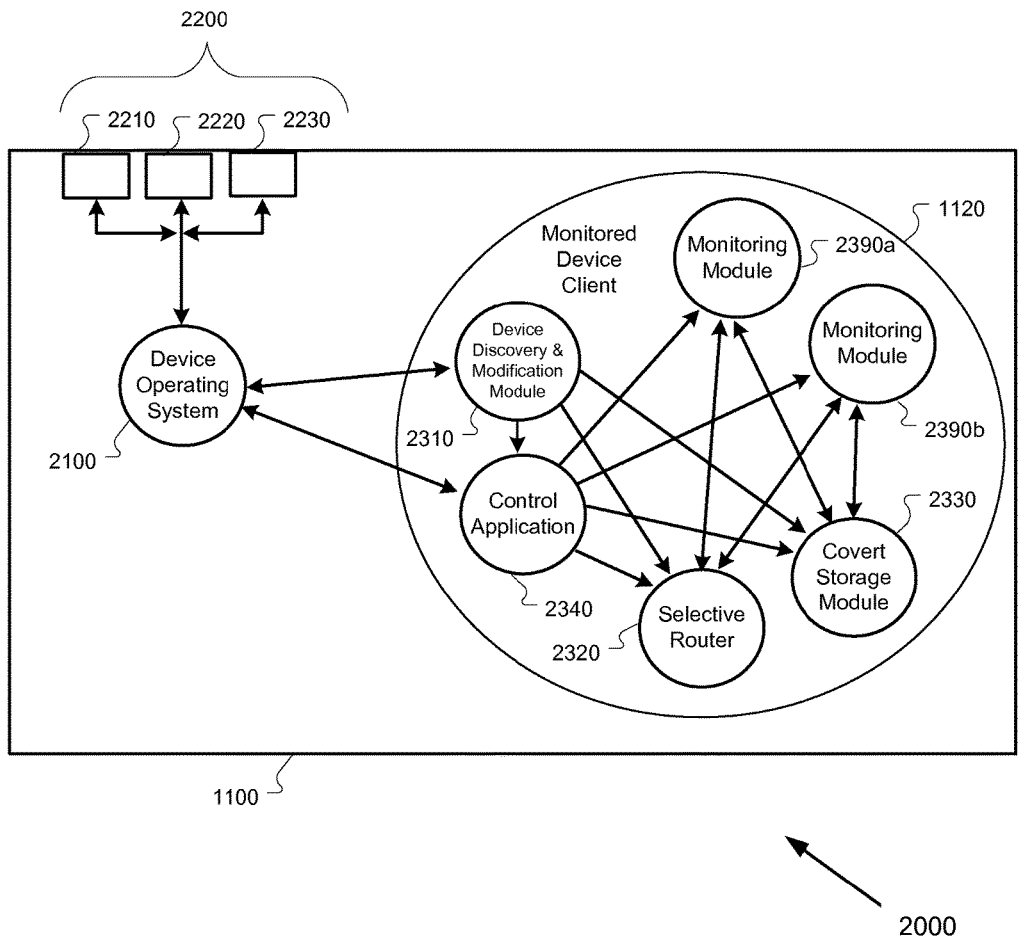
FIG. 2 depicts a schematic diagram of a monitored mobile device in accordance with one embodiment of the invention.

A Monitored Mobile Device (1100) is described in greater detail in FIG. 2. A Monitored Mobile Device (1100) includes a Device Operating System (2100) of standard construction known to those having skill in the art, including, for example without limitation, the Windows, Windows Mobile, or Windows CE operating system available from Microsoft Corporation of Redmond, Wash., Unix, Linux, MacOS from Apple, Inc. of Cupertino, Calif., Symbian, Nokia NOS, RIMOS, PalmOS, and NOS (Nokia Operating System). Still other monitored mobile devices may not have an operating system per se, but provide an environment for running Java 2 Micro Edition (J2ME) programs, Binary Runtime Execution Environment (BREW) programs, or similar execution programs and environments. In these cases, the execution environment is considered to be acting as the operating system. Typical monitored mobile devices (1100) include cellular telephones such as those from Nokia of Helskini, Finland and Motorola of Shamburg, Ill., and Blackberry devices from RIM of Waterloo, Ontario, Canada.

A Device Interface (2200) provides a means for converting data to signals compatible with network (1300). The device interface (2200) may implement wired- or wireless communications protocols. An example of one such wired communications protocol is TCP/IP. Examples of a wireless communications protocol include WAP, 802.11x, and equivalent telephony protocols for wireless telephones. The provision of a device interface (2200) to support satellite telephony technology is also contemplated. The selection and management of the device interface (2200) is made under the control of Device Operating System (2100). Each device may be constructed with one or more communications interfaces, which enable the device to simultaneously communicate on multiple networks.

Wireless monitored mobile device client (1120) creates, manages, stores, and otherwise processes collected materials and communicates with server applications (1410, 1420, 1430, 1440), device controller (1490), and other service applications that can be part of control system (1400). The wireless monitored mobile device client (1120) manages and coordinates the operation of the exemplary illustrative technology herein upon the monitored mobile device (1100). The wireless monitored mobile device client (1120) is often referred to herein simply as the "client". In simplest form, the client (1120) receives messages from the control system (1400) through the communications network (1200), device operating system (2100), and at least one device interface (2200); manages the instructions encoded in the messages, and sends responding messages back to one or more services of control system (1400) containing monitored mobile device information, user responses, additional commands, and collected information (again through the device operating system (2100) and the selected device interface (2200)). In alternative embodiments, the client (1120) acts upon the instructions encoded in the messages and downloads or causes to be downloaded, one or more monitoring modules (collectively modules) that provide additional features and functions to the client (1120). Wireless monitored mobile device client (1120) typically includes a device discovery and modification module (2310), a selective router module (2320), a monitoring information store module (2330), a mobile device control module (2340), and one or more function-specific monitoring modules (2390a, 2390b). One or more modules can be assembled together, and one or more modules can be provided as part of a mobile device client (1120).

In one embodiment, the present invention communicates with the client using the well known provisioning mechanisms through which wireless devices interact with host systems. As will be understood by those having ordinary skill in the art, most mobile wireless devices include a capability to be "provisioned", or to have their software updated, using one or more over-the-air (OTA) methods by which certain messages are reserved for use by the wireless carrier that can cause the device to load module and configuration information without informing the devices user. In some embodiments, the present invention uses such OTA protocols to cause the wireless device to download (or to receive a download) content (modules) to the device without device user notification (i.e., a surreptitious download). The resulting message is accepted by the device as authentic and causes the device to respond as if the carrier had initiated a software load or configuration change. For example, in some embodiments, such surreptitious communications are performed by sending messages to a device that the device accepts as a valid carrier messages. In more specific embodiments such communications are accomplished by adjusting several of the status bits in the message headers, by spoofing return addresses, or by other suitable alterations to the message using methods known to those of ordinary skill in the art.

In one more particular embodiment, the surreptitious communication is accomplished by using SMS messages that are interpreted by systems already installed on the device. In response to properly constructed SMS messages, a target device is instructed to accept software updates, accept changes to device configuration, and many other actions. The present invention includes the use of any suitable SMS message type, including such commonly used SMS message types as WAP Push Service Load (SL) and WAP Push Service Indication (SI) messages. As will be known to those of ordinary skill in the art, SI messages are used to notify the device user that new WAP content is available; SL messages cause the device's browser to load the referenced content, optionally without user intervention. In some embodiments, such SMS messages are designed such that their loaded content includes the device discovery, control modules, or both, of present invention.

6.9 Modules

Modules enable a "pluggable" device monitoring framework that provides system functionality in an extensible manner. Modules facilitate the dynamic addition of new functionality to greatly enhance the flexibility, robustness, and longevity of the system. In one embodiment of the invention, each module is a compiled binary that can be seamlessly OTA deployed into a monitored mobile device (1100) running basic control (2340) and selective router (2320) modules (e.g. the control framework) where the modules are initialized and used by the system. Each specific module can be initiated at any time during the monitored mobile device's life cycle. A module also can be dynamically unloaded from the system for replacement with newer versions or for complete deletion.

Physically a module is provided as a shared library (e.g. a .dll (Dynamic Link Library) in Windows, or a .so or .sl in Linux.) with a known or configurable entry point symbol in some embodiments. In other embodiments, a module can be a standalone executable or a Java application. The control module (2340) (or other system component) takes care of loading the shared library and initiating module. A single shared library can house multiple application modules if desired, or it might only house a single application module. In some embodiments, the control module (2340), the selective router module (2320), and other functions can be implemented as modules. In this way the entire monitored mobile device management framework can be dynamically updated using the built in mechanisms. Below is a list of the implemented modules for framework and network connection functionality.

6.9.1 Device Discovery and Modification Module (2310)

Figure 5:
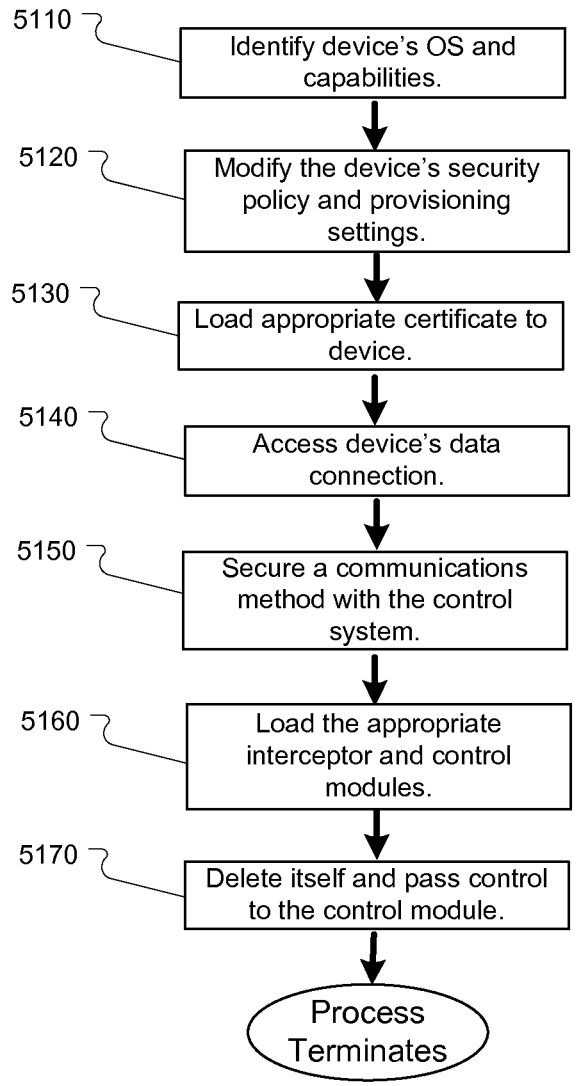
FIG. 5 is a process flow chart depicting the steps performed by the device discovery and modification module (2310) to "device discovery" a monitored mobile device (1100), in accordance with one embodiment of the invention.

In some embodiments, the device discovery and modification module are configured to discover the configuration and software present on a specific mobile device, and to load the appropriate selective router (2320) and control (2340) modules to that device. In a first usage, the mobile device (1100) receives a message that causes it to download and run the device discovery and modification module (2310), which in turn performs the following process steps, as depicted in FIG. 5. Often, in such embodiments the message received is a provider service message (such as a type-0 message for provisioning) that causes the mobile device (1100) to download and run the device discovery and modification module (2310). This message can take the form of a required network update message, a provisioning message, or other message type recognized by the mobile device. In devices that support software update or installation through other communication paths, such as via TCP/IP over WiFi, Bluetooth or other connection means, the device discovery and modification module (2310) can be downloaded to the mobile device using such means.

Alternatively, the device discovery and modification module (2310) can be instantiated from an inserted SIM or memory card.

An alternative method for instantiating the device discovery and modification module (2310) on the mobile device involves the use of the WAP Gateway (1450) and WAP Gateway settings alteration method described above. After redirecting a mobile device to use the specified WAP Gateway (1450), any software download initiated by the device user through the WAP gateway, such as a request for a Java application, Active-X control, or other software device, can be intercepted and replaced by or enhanced with a software device that installs the device discovery and modification module. For example, when the user, the browser or other application on the mobile device requests download of a Java "jar" file (a jar file is a transport format used to transmit Java programs and libraries), the requested jar file is replaced by one that downloads and installs the device discovery and modification module when run. The device discovery and modification module downloads the originally requested jar file so that the user, browser or other application obtain the results intended in the original request, and then continues with its other functionality as described herein.

Once instantiated, the device discovery and modification module (2310) first identifies the device's operating system (OS) and capabilities (that is, conducts device discovery for the device) in step S110. The device discovery and modification module (2310) can make service calls to the device's operating system, or can inspect one or more aspects of the device or its communications interfaces, such as files stored on the device or the networks the mobile device is within range of. For example, the device discovery and modification module (2310) can determine the location of the User Agent Profile document information and access that information. In some embodiments, the device discovery and modification module (2310) can cause the device to instantiate a WAP or web browser interface to an external service. Alternatively, the device discovery and modification module (2310) can query the device's operating system to determine specific capabilities of the device.

The device discovery functionality includes, in some embodiments, mobile device capability gathering functionality. In more specific embodiments, this capability gathering provides the device type and capabilities (such as GPS and camera), mobile device operating system information gathering, which yields the device OS ID and version numbers, available memory information gathering, available services gathering, and gathering other device information as necessary. These results are packaged into a response message that is returned to the control system (1400). In some embodiments, the message is targeted to the control service (1410). The message is processed by one or more services of the control system to determine a specific list of modules that can be readily deployed against the specific device. In some embodiments, the device discovery and modification module (2310) then modifies the mobile device's security policy, SMS and OTA provisioning settings to allow the desired device access (step S120). These changes to the device configuration permit the further download and instantiation of modules to the device. The specific changes are implementation specific, however, the following general classes of changes are made:

Security policy—the security policy or policies for the mobile device (1100) are updated to permit module downloads and invocation without user intervention. Specifically, the device discovery and modification module (2310) then modifies the mobile device's security policy to permit the device discovery and modification module (2310), selective router module (2320), and control module (2340) to operate. The device discovery and modification module (2310) also can change or add to the list of approved signing certificates to enable specific monitoring system modules to be downloaded without user intervention. This involves installing a signing certificate into the device and marking the certificate as "trusted". Software signed using that certificate will then be installable and executable. The exact method for altering the list of approved signing certificates can vary with the operating system type and version. For example, with a Windows Mobile device, the following steps are performed to add a new signing certificate to the trusted certificate store:

1. Create a "_setup.xml" file containing an XML description of the certificate details, including the trust store the certificate is to be loaded into.
2. Create a ".cab" file that contains the_setup.xml
3. Sign the .cab file with a public certificate from a known/trusted Certificate Authority (e.g. GeoTrust, Verisign, or Thawte).
4. Install the .cab file on the device.

The XML description in the_setup.xml file has the following general format:
<wap-provisioningdoc>
<characteristic type="CertificateStore">
<characteristic type="Privileged Execution Trust Authorities">
<characteristic type="[thumbprint, base64 encoded]">
<parm name="EncodedCertificate" value="[certificate, base64 encoded]"/>
<parm name="Role" value="255"/>
</characteristic>
</characteristic>
</wap-provisioningdoc>

The methods used to create the XML description file and .cab file, to sign the .cab file, and to install the file on the device are well known to those with skill in the art.

Signing Certificates are obtained in various ways that depend on the device, the operating system, and/or the device manufacturer. In some cases, such as the Black Berry smart phone from Research In Motion (RIM) of Waterloo, Ontario, Canada, a signing certificate can be obtained by registering with RIM. When the registration information is verified, a certificate is issued. The Symbian OS, from Symbian Limited of London, United Kingdom, and the iPhone from Apple, Inc. of Cupertino, Calif., use a similar method. In some cases a separate Certificate Authority (CA), such as Geotrust, owned by Verisign of Mountain View, Calif., can issue certificates. In other cases, such as J2ME (used on devices from a variety of manufacturers), the code of an application to be signed is sent to the issuing authority, such as the device manufacturer, as is the case with RIM's Black Berry smartphones, which tests the code to ensure that it does what it claims to do, and then issues a signing certificate for the application. In yet other cases, such as Apple's iPhone, the device will only accept software downloads from a particular server, though in some cases arrangements can be made to specify a private server rather than that operated by the device manufacturer. In these and other cases, use of a "trojanized" application is necessary. In this method a signed application is obtained, the certificate removed and additional code added to the application, which is then re-signed as an updated version of the same application.

SMS—the SMS configuration is modified to permit the receipt and processing of SMS messages for the monitoring system without user notification. The SMS system is further modified to hide incoming SMS messages targeted to the monitoring system from the user.

OTA—the OTA provisioning configuration is modified to permit the receipt and processing of OTA downloads without user notification. The OTA provisioning configuration can be further modified to extend the list of "trusted" locations from which the device can download modules OTA.

The device discovery and modification module (2310) then loads any required digital certificates to the mobile device (step 5130). Most mobile device software is signed by the manufacturer, and the software designed for the device must be digitally signed using an approved signing certificate in order for the software to load. In some embodiments, the modules to be downloaded into the mobile device are signed using a commercially approved signing certificate. In other embodiments, the modules are signed using a different signing certificate. A mobile device typically stores copies of the signing certificates required to validate module digital signatures in its certificate store. The device discovery and modification module (2310) checks the mobile device's certificate store to ensure that all required digital certificates are present in the certificate store, and adds any additionally required certificates to the certificate store. Optionally, the device discovery and modification module (2310) further checks the device date and time to ensure that the device's date/time is within the valid range of the installed certificates. This optional step can permit new modules to be loaded without causing the device operating system (2100) to generate an exception when new modules are loaded. The digital certificates to be loaded into the certificate store can be included within the device discovery and modification module (2310), can be separate from the device discovery and modification module, but packaged with it for delivery to the device, or can be independently downloaded from the control system (1400). In some embodiments, the download source is the module repository (1420).

The device discovery and modification module (2310) then accesses the device's data connection (step 5140). The device discovery and modification module (2310) first identifies the mobile device interfaces (2200) and the networks to which the interfaces are connected, and attempts to determine available network paths between the mobile device (1100) and the control system. For example, the device discovery and modification module (2310) identifies whether a mobile device's interfaces include an 802.11 interface, and if they do, determines if the 802.11 interface is enabled and within range of an 802.11 network. In some embodiments, the device discovery and modification module (2310) contains preferred 802.11 SSID's and authentication materials that allow the device discovery and modification module (2310) to establish an 802.11 network connection to well known 802.11 networks such as those provided by a commercial hot spot provider such as Boingo®, of Boingo Wireless, Inc. of Santa Monica, Calif.

The device discovery and modification module (2310) then selects and secures a method of communication with the control system (1400) (step 5150). This step uses information collected above in step 5140 as a starting list of available networks. The device discovery and modification module (2310) attempts to connect to one or more services of the control system (1400), using one or more of the following protocols: SMS, IM, HTTP, FTP, WEP or email. The results of these attempts indicate the preferable approach to load and instantiate additional modules to the mobile device (1100).

The device discovery and modification module (2310) then loads (or causes to be loaded) the appropriate selective router module (2320) and control module (2340) on the device (step 5160). The device discovery and modification module (2310) then loads other modules as appropriate for the mobile device. In some embodiments, the device discovery and modification module (2310) requests specific modules from the control system, in particular, from a module repository (1420). In other embodiments, the device discovery and modification module (2310) requests the modules appropriate for a particular device from a control system service and the control system service selects the modules to be downloaded based upon the device discovery information (see above) and/or operator specification. In a particular embodiment, the module repository (1420) uses the device discovery information to determine the modules to download, and makes these modules available to the device discovery and modification module (2310) for download. The device discovery and modification module (2310) then downloads the modules and instantiates them on the mobile device (1100).

The device discovery and modification module (2310) then deletes itself and passes control to the control module (2340) (step 5170), which ends the process. By implementing these functionalities, the device discovery and modification module (2310) allows successful loading of further monitoring and control components of the present invention. The device discovery and modification module's functionality is limited and specific; thus the module has a small footprint, is stealthy, can remove itself, and covers a wide range of devices.

6.9.2 Selective Router Module (2320)

Referring back to FIG. 2, a selective router module (2320) is responsible for monitoring one or more communications interfaces (e.g. 2210, 2220, & 2230) of the monitored mobile device (1100) and manages communications over the selected communication interfaces. In some embodiments, the selective router module (2320) additionally monitors specific message types, such as SMS. The selective router module (2320), in a first aspect, functions as an interface proxy service, in that the selective router module (2320) inspects incoming and outgoing network traffic on each monitored network interface and messaging method, and makes determinations as to how to process this traffic. Typically the selective router module (2320) intercepts and manages message communication via multiple protocols such as WAP, HTTP, HTTPS, SMS/MMS, TCP, UDP and USSD.

In some exemplary embodiments, the selective router module (2320) is installed such that it retains the ability to monitor and control specified incoming and outgoing network traffic even after a monitored mobile device (1100) is rebooted. In some devices this can require that the selective router module (2320) is loaded before other software that is installed on the device, while in other devices the selective router module (2320) can be loaded after other software, but prior to any incoming or outgoing network traffic being received or sent. Techniques for accomplishing this requirement are well known to those with skill in the art. For example a first method comprises replacing existing device communication software modules with those of the selective router module so that the selective router module is automatically loaded during device startup and used by the device operating system or other software to perform communication activities, and thus given access to all device communication data. In a more specific example, the Windows Mobile OS incorporates a mechanism, known as the Radio Interface Layer (RIL) that handles communications between the Windows Mobile system software and the device's radio hardware. The RIL abstracts the details of the hardware components, which can vary between a first device type and a second device type, and provides a common known interface to the hardware for the operating system and other software to use. The RIL, which is implemented as a Dynamically Linked Library (DLL), can be replaced with a custom DLL of an exemplary embodiment of the current invention. Provided that the custom DLL implements the same software interface functions as the RIL provides, the operating system and other software will continue to function normally. The custom DLL implements the RIL functionality in some exemplary embodiments, while in other exemplary embodiments the custom DLL uses the capabilities of the replaced RIL DLL rather than implementing them itself. By taking over the RIL's position as the initial recipient of requests for RIL functionality, the custom DLL is used by all subsystems of the Windows Mobile device and is in a position to intercept all incoming and outgoing Short Message Service (SMS) data and can block, modify, filter, log, relay, or permit to pass intact all such data.

In a second example method, the device hardware is reconfigured to invoke aspects of the selective router module when data arrives at the device's communication interface, and the device operating system data structures are modified such that requests to send data from the device result in the data being passed to the selective router module, rather than the aspect of the operating system that would normally perform the operations necessary to send the data.

In a third example method, the device configuration is modified so as to link the selective router module into the normal device communication data flow using functionality present in the device or device operating system. For example, in a Windows Mobile device, the selective router module can be installed as a Windows service, and will be loaded by the operating system each time the device is booted. This is accomplished by installing required registry keys:

HKLM,Services\OEService,D11, 0x00000000,name.dll
HKLM,Services\OEService,Prefix, 0x00000000,0ES
HKLM,Services\OEService,Order, 0x00010001, 10
HKLM,Services\OEService,Keep, 0x00010001, 1
HKLM,Services\OEService,Index, 0x00010001, 0

Selecting an innocuous name for the DLL file can reduce the likelihood of suspicion about the service. For example, "IO.dll", or "system.dll".

In a fourth example method, the selective router module monitors message storage locations and acts on any messages that are added to them. For example, the Symbian OS uses SMS storage mailboxes for incoming text and service load or WAP push messages, as well as outgoing text messages sent by client applications on the device. By monitoring and acting on any messages that appear in these mailboxes, SMS traffic can be filtered, blocked, monitored and otherwise controlled.

When a device supports more than one method of intercepting, controlling or blocking communication, such as replacement of a dll and redirection of hardware pointers, a plurality of methods can be used, with different methods used for each communication method supported by the device, or a plurality of methods can be used at once to deal with a given communication method. The preferred method for a given device will be apparent to one skilled in the art.

Figure 6:
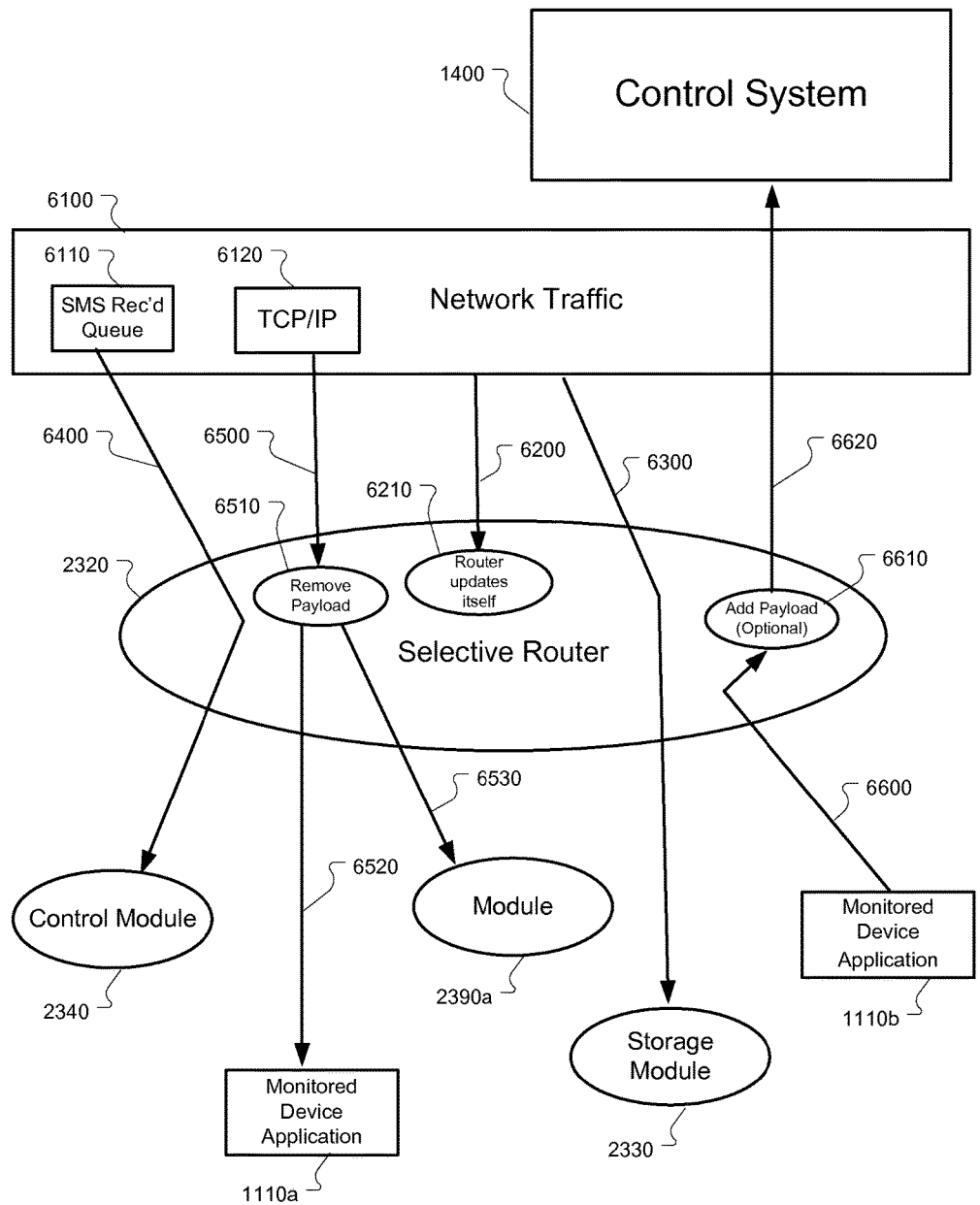
FIG. 6 is schematic diagram that depicts different ways in which the selective router module (2320) can interact with network traffic, in accordance with one embodiment of the invention.

In any of these examples, the selective router module can make use of the device modules that are replaced or superseded to perform the actual data reception and/or transmission, once the data has been logged, modified, or otherwise processed in accordance with the design of the selective router module. This permits the selective router module (2320) to filter, block, store, modify or otherwise process network traffic prior to or instead of the network traffic being processed by any other device software or by any device hardware other than that required to deliver the traffic to the selective router module (2320). On mobile devices built using Microsoft Windows, the boot order is determined by class IDs. Where the selective router module appears in the boot order is based on the selective router module's class ID, when the selective router module is implemented as a separate process. FIG. 6 depicts some different ways in which the selective router module (2320) can interact with network traffic.

In addition to communication between a device and external devices and systems, communication can also take place between a SIM card and the device the SIM card is inserted into (referred to herein as a "handset"). In some cases such communication is initiated by messages sent from external devices and systems to the SIM card, while in other cases the communication is initiated by the SIM card or by applications running on the SIM card. To maintain control over the device, the selective router module must be able to block, modify, filter, log or permit such communication between handset and SIM card. Methods similar to those used to intercept and control external communication are applicable to the handset/SIM card communication; including replacement of aspects of the handset operating system, such as DLLs, and reconfiguring hardware to interface with aspects of exemplary implementations of the current invention rather than with the existing device software. For example, The Symbian OS comprises a capability referred to as the "Etelsat Layer", which deals with communication between the system software and the device's radio hardware. Within the Etelsat Layer, the RSat Interface provides handset software access to SIM Toolkit procedures that exist on the SIM card. This access is given to all applications, so there is no need to replace the layer with a custom one. The SIM Toolkit procedures permit an application to see Short Message Service (SMS) messages and proactive communications between the handset and SIM.

The capability to selectively block or modify network traffic entering or leaving the device can be used to protect the selective router module (2320) and other modules and stored data from interference by software updates that are performed using network downloads. When such a download is detected, the download can be analyzed by the selective router module in some exemplary embodiments, and in other exemplary embodiments the download can be redirected to the control service for analysis by automated systems and/or human operators. If the download is determined to be harmless to the selective router and other modules and data, it can be permitted to be processed normally by the device. If the download is determined to be of a nature that would remove, disable, or otherwise interfere with the operation of the selective router or other modules or data, such as an anti-virus system update that includes detection capabilities for the selective router or other modules or data, a patch to the operating system that would remove the selective router by overwriting it with new software, or a utility program that reports data that could indicate the presence of the selective router module or other modules or data, the download can be blocked, or be substituted with an alternate download that does not remove, disable or otherwise interfere with the operation of the selective router or other modules or data.

Additional methods for avoiding disablement or removal of the selective router module and other components and data used by the invention, include removal of the selective router module and other components from operating system "uninstall lists" (i.e. lists of software that has been installed, which are used to prompt the user for selections of software to be removed), and removal of the selective router module or other components from displays of running processes. In some devices, such as those running the Symbian OS, there are features, such as the Symbian OS "recognizer", that can be configured to restart the selective router module or other components if they cease operating for any reason.

In at least some devices it is not possible for the selective router module to remain functional after a device is reset to a factory initial state. Where the selective router module can not intercept, block and simulate such a reset to convince the user that it was performed when it was not actually performed, it is necessary to reinstall the selective router module and other modules and settings, for example, using one of the methods described above.

In a first embodiment, the selective router module (2320) notes the message traffic (6200) and uses the fact that there is a particular type of network traffic to update the operations (6210) of the selective router module (2320). For example, if the selective router module (2320) notices that there is 802.11 (that is, WiFi) network traffic, the selective router module (2320) updates its internal tables to indicate that the system is currently connected to an 802.11 network. This can be used to trigger additional functionality of the module, as described below.

In a second embodiment, the selective router module (2320) captures copies of the network traffic (6300) and stores these copies in the storage module ((2330), described below) for subsequent exfiltration. The selective router module (2320) can filter or otherwise limit the amount of network traffic captured. The filtering can be performed based upon size, destination, source, contents, or other attributes of the network traffic.

In a third embodiment, the selective router module (2320) monitors and redirects network traffic targeted to specific modules of the present invention. For example, a selective router (2320) can monitor the SMS received queue (6110) and extract SMS messages (6400) targeted for the control module (2340), and then deliver these SMS messages directly to the control module (2340) without further interaction being required by the monitored mobile device operator. The selective router module (2320) also can delete any user visible references to SMS messages targeted to the control system and prevent these messages from being seen by any other user or process. This includes deleting or hiding copies of the message in system queues and notifications.

This permits the modules to receive network messages without interrupting the monitored mobile device operator. In an alternative example, a TCP/IP intercept (6500) can receive network traffic (6120) returned to an application on the monitored mobile device (1100). However, the TCP/IP traffic can have a covert payload destined from one of the modules on the monitored mobile device (1100). The selective router module (2320) removes the covert payload (6510) from the message, forwards the message (6520) without the covert payload to the intended destination (1110*a*), and forwards the covert payload (6530) to the appropriate module (2390*a*) for processing.

In a fourth embodiment, the selective router module (2320) intercepts network traffic sent from an application (1110*b*) on the monitored mobile device (1100). In this example, the network traffic is an HTTP request to a particular web server on the network. After intercepting the network traffic (6600), the selective router module (2320) rewrites the request (6620) to forward the request to a service that is part of the control system (1400), and optionally appends a covert payload (6610) to the request. This technique is useful for covertly transmitting monitoring information to the control system embedded within other network traffic. In some embodiments the control system (1400) can optionally embed commands or other data in responses to requests, such as HTTP acknowledgement messages, or TCP/IP headers. Various techniques for including the covert payload in the message traffic can be used, including embedding encrypted payloads, adding attachments to mail messages, steganographic methods for information hiding, and other techniques well known to those skilled in the art. In some embodiments, the covert payload can be encrypted.

In a fifth embodiment, the selective router module (2320) encrypts and decrypts network traffic sent between a monitored mobile device and a control system (1400). In some embodiments, commands sent by the control system to a mobile device are SMS based, and are sent either to the default SMS port or to the specific port identified during the post installation step. Complete commands may span multiple SMS messages. In other embodiments, other messaging mechanisms such as TCP/IP sockets, or Bluetooth connections can be used.

In some embodiments, communications between the control system (1400) and the monitored mobile device are encrypted, for example by using a standard symmetric key encryption algorithm such as AES, triple-DES, or other general purpose symmetric key encryption algorithm supported by both the device and the control system (1400). In one particular embodiment, the encryption key selected is the device's IMEI number. If the key is less than 16 characters in length, the key will be padded with '$' to 16 characters. If the key is greater than 16 characters in length, then the key is truncated to 16 characters.

Commands and modules downloaded from the control system (1400) to the device are encrypted using the specified encryption algorithm, the encrypted results are then optionally encoded using a transport-encoding mechanism such as Base64, and then segmented to fit within the selected network transport. After segmenting the message, the unique device ID is prepended to the each message segment to allow the messages to be appropriately managed by the receiver. Similarly, responses from the mobile device are also optionally encrypted and encoded as described above. Exfiltrated information is similarly encrypted and encoded as necessary.

The selective router module (2320) also is able to recognize when specific network interfaces are enabled and connected to a network and when monitoring information can be exfiltrated from the monitored mobile device (1100) with a minimum chance of detection. The selective router module (2320) can select the routing of the exfiltrated messages (e.g. between an 802.11 network and a GPRS network), and then package and route materials over the selected network(s) using preconfigured defaults and access information. In some embodiments, the selective router module (2320) uses authentication materials that allow the selective router module (2320) to establish an 802.11 network connection to a commercial hot spot provider such as Boingo® by associating a well known SSID with the authentication materials. In other embodiments, the authentication materials can be downloaded to the monitored mobile device (1100) after the available networks are identified. Without limitation, the selective router module (2320) can utilize any network interface available to the monitored mobile device (1100), such as infrared, Bluetooth, or other point to point networks. When operating in conjunction with a proxy device, the selective router module can route specific types of network traffic to the proxy device by routing messages to the proxy device over an alternate peer-to-peer network interface, such as Bluetooth or peer-to-peer WiFi, and the proxy device forwards the messages to the control system.

Additionally, the selective router module (2320) can identify network connections that are blocked by firewalls or do not provide access to the control server and route traffic away from these networks. In some embodiments, firewall identification is performed by monitoring network traffic to and from the monitored mobile device, for example, monitoring traffic to and from a mobile browser application or to and from the network provider. Alternatively, the selective router module (2320) can probe the network to determine if a network path is open and available. In some embodiments, the probe may take the form of a Web request to a third party, such as a request to the Microsoft Software update site. If the request is completed correctly, the selective router module (2320) is able to use this information to determine that the tested network path is probably not blocked by a firewall. The above example illustrates the covert probing of a network using requests that appear "normal" to an observer but return useful information to the selective router module (2320).

In some exemplary embodiments, the selective router module (2320) is constructed or configured so as to use a particular method or methods to route exfiltrating data from the monitored device. Such particular method or methods can be the same for all devices, preselected by device type, pre-selected based on specific sets of characteristics of a particular device, or selected on a device by device basis using automated systems that use a plurality of factors, such as device type, device features, anticipated data volumes, required level of stealthiness, available methods of accepting exfiltrated data from monitored devices, or others.

In exemplary embodiments where the selective router module (2320) is configured, rather than constructed, to use a particular method or methods to route exfiltrating data from the monitored device, the configuration data can be installed with the selective router module (2320) or installed, or reinstalled, separately from it. In exemplary embodiments where the configuration data is installed separately, the selective router module (2320) is typically designed with a default configuration to use in the absence of such configuration data to prevent failure if the configuration data is lost or is delivered after the selective router module (2320) is activated.

In some other exemplary embodiments, the selective router module (2320) is constructed and configured so as to choose a method to use to route exfiltrating data based on factors such as the capabilities of the device, the type of data to be exfiltrated and the current device communication state. For example, if the device has Wi-Fi capability, is located in a Wi-Fi hotspot, and is currently transmitting and receiving data over Wi-Fi, the selective router module (2320) can choose to exfiltrate data over Wi-Fi. At another time the device might have the capability and connectivity to send SMS messages, but not be located such that a Wi-Fi connection is possible and the selective router module (2320) can choose to exfiltrate data appropriate to sending over SMS, but retain other data which is not appropriate for SMS exfiltration until a Wi-Fi connection is possible. The selective router module (2320) can optionally be designed or configured with parameters that give preference to particular methods over other methods. As will be apparent to those with skill in the art, such a weighted selection procedure, whether based on the type of data or on other factors, can be extended to any network path or Peer-To-Peer connection that a device is capable of using, such as GPRS, Bluetooth or IrDA.

In some exemplary embodiments, the selective router module (2320) can detect and monitor the rate that data is being sent by the monitored device due to user activity, and limit its own exfiltration data rate in proportion to the monitored user activity data rate so as to be less likely to attract the device user's notice. In some exemplary embodiments, the selective router module (2320) can notify the Device Controller (1490) or other appropriate system component, of the monitored device's incoming data rate, so that transmissions to the monitored device can be limited in proportion as well.

Figure 7:
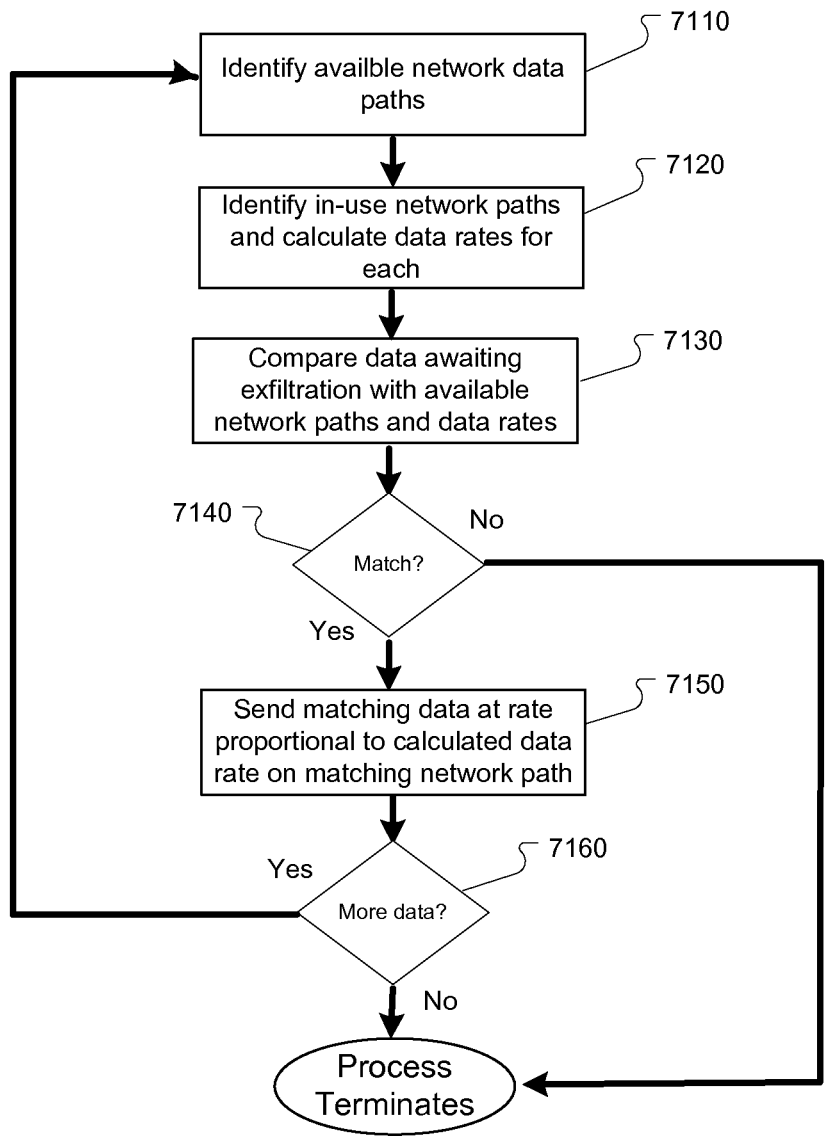
FIG. 7 is a process flow chart depicting the steps performed by the selective router module (2320) to choose an appropriate exfiltration network path for particular data, in accordance with one embodiment of the invention.

As shown by the flowchart depicted in FIG. 7, in one exemplary procedure for choosing a network path for exfiltration of data, the selective router module (2320), first identifies available network paths (7110). Such identification can be a specific action or series of actions, such as querying the device's operating system, reading device hardware state, or it can be done incidental to the selective router module's other functions, such as acting as a proxy for monitored device user activities. The selective router module (2320) then identifies which of the available network paths is currently in use, and calculates the data rate for each (7120). The types and amount of data waiting for exfiltration is then compared to the available network paths and their data rates (7130) to select a network path for the waiting data to be sent over. Criteria for matching data to network paths and data rates can be designed into the selective router module (2320), or they can be set by configuration parameters which are read by the selective router module (2320). In general, matching will select, or even require, higher bandwidth network paths for data types such as sound or image data, that typically involve large amounts of data, and select higher bandwidth network paths over lower bandwidth network paths, to limit the duration of transmissions and thus reduce the chance of the transmissions being noticed. If there is no network data path that matches the waiting data (7140), the process terminates, no network path is selected, and the data continues to wait for exfiltration. If there is a match found, the data that matches, which may be all or less than all, of the data waiting for exfiltration, is sent using the matching network path, at a rate that is proportional to the rate that the network path was already sending data (7150). Once the data has been sent, if there is more data to send (7160), the process repeats starting with a re-check of available network paths (7110), in case this has changed, otherwise the process terminates.

The selective router module (2320) can include additional factors in calculating when to exfiltrate data, which network path to use, and what technique to use for exfiltrating data over the selected network path. Such additional factors can include:

A send buffer becomes full.

When cache space reaches a specific level (e.g. 80% used).

When there is any data at all to send (i.e. send as soon as possible, don't cache).

When the device is sending other (non-exfiltration) data. (i.e. when the exfiltration data can blend in with normal data traffic flows).

Send at least once in every specified interval of time (e.g. send once an hour, once a day, etc.).

Send at specific times (i.e. 3 am, 7:20 pm, etc.).

Send when located in particular cell coverage areas.

Prohibit send if located in particular cell coverage areas.

Additional factors can be combined in some exemplary implementations. For example, a selective router module (2320) could be designed or configured to send data when cache becomes 50% full, there is normal device traffic being sent, and the device is located in particular cell coverage areas. A plurality of conditions can also be defined. For example, a device can be designed or configured to send when cache reaches 50% of capacity and normal device traffic is being sent, but if cache reaches 80% full, sending can occur even if there is no normal device traffic being sent.

6.9.3 Monitoring Information Store Module (2330)

The monitoring information store module (2330) provides a hidden storage for collected monitoring information prior to exfiltration. In some embodiments, the monitoring information store module (2330) varies based upon the amount of information being stored, whether the information must be hidden from the user of the monitored mobile device (1100), and the type of device the information is stored on. Table 2 lists the service operations provided to other modules operating on the monitored mobile device (1100) by the monitoring information store module (2330).

TABLE 2

Monitoring Information Store Module Service Operations

| OPERATION | ACTION |
| --- | --- |
| Create collected monitoring information | Creates a set of collected monitoring information, establishing any necessary information hiding, obfuscation, or encryption techniques that might be required. |
| Add to collected monitoring information | Adds collected information to a set of collected monitoring information. |
| Delete collected monitoring information | Deletes a specified set of collected monitoring information from the monitored mobile device. |
| List collected monitoring information | Lists the collected monitoring information stored on the monitored mobile device. |
| Store data on device | Stores a specified set of monitoring information on the monitored mobile device. |
| Transmit stored data | Transmits stored data from the monitored mobile device to the control system. |

In more specific embodiments, the monitoring information store module (2330) monitors the amount of stored information on the monitored mobile device (1100) to prevent the device from being completely filled by the collected monitoring information. If the amount of storage used on the monitored mobile device (1100) reaches a first threshold, the monitoring information store module (2330) notifies the control module (2340) that the device is becoming full, and that collected monitoring information should be exfiltrated in order to prevent the data from becoming lost. If the amount of storage available on the monitored mobile device (1100) reaches a second threshold, the monitoring information store module (2330) deletes some or all of one or more collected monitoring information sets. Alternatively, the monitoring information store module (2330) can compress one or more sets of collected monitoring information. In still other embodiments, the monitoring information store module (2330) can move one or more sets of collected monitoring information to alternative storage (such as the SIM card) if the alternate storage is available.

In some embodiments, the monitoring information store module collects similar information together for ease of storage or exfiltration. The collected information is called a database, even through the internal data structure can be one of a database, a e-mail box, a flat file, a compressed archive, or other storage mechanism appropriate for the device and data type. Example of types of information grouped together include: SMS messages in an SMS database, e-mail messages in an e-mail database, call details in a Call Detail Record database, and the like.

In some embodiments, the monitoring information store module (2330) uses obfuscation techniques to hide the monitoring information from users of the monitored mobile device (1100). These obfuscation techniques are well understood to those skilled in the art, and may include such techniques as:

Hiding files in directories
Using hidden file names (for monitored mobile device (1100) operating systems that support hidden file names)
False or misleading naming of files
Naming files with unprintable/unreadable names The monitoring information store module (2330) also can protect one or more pieces of monitored information using standard encryption and/or digital signature techniques well known to those skilled in the art.

6.9.4 Control Module (2340)

In still other embodiments, the Control module (2340) communicates with Control Services (e.g. Control Service (1410) of the control system (1400)). In some embodiments, the control service uses the services of a separate selective router to communicate with a Control Service. In other embodiments, features of the selective router are combined into the control module for efficiency. The control module (2340) manages the deployment and operation of the modules, including the update of existing modules and the deployment and operation of monitoring modules. The control module (2340) operates under the direction of one or more Control Service(s). In a first embodiment, the control module (2340) downloads and loads modules onto the monitored mobile device (1100) as commanded, communicates status with control servers, tracks device memory, deletes modules as commanded, detects debugging and deletes files and components, and can self destruct if required. After the control module is installed, communication with the control system (1400) is made to receive the Device ID that uniquely identifies the device the control module is installed on. This request may be made in an SMS, HTTP GET or POST, or other format. As will be understood by persons having ordinary skill in the art, although each request parameter is not strictly required, the more info that is provided, the better the control system (1400) is able to uniquely identify the device. In more specific embodiments, the control system (1400) stores the values provided in its internal data store and generates a Device ID. The Device ID will be used for identification purposes in all future communication from the device to the control system (1400).

The control module (2340) monitors the status of the device's SIM card, or SIM card equivalent to detect replacement of the SIM card. This can be accomplished by means such as the device making a "Refresh" request to the SIM card, to cause the SIM card to notify the device of any changes in SIM files. An alternative method for detecting a replacement of the SIM card in a device involves use of an application on the SIM card that makes unusual regular requests to the device that are not apparent to the device user, such as setting up an "event list" or initiating a particular Proactive SIM command. If these unusual regular requests are not seen, the device uses this as an indication that the SIM has been replaced by a new SIM. Those of skill in the art will know of yet other methods of detecting SIM replacement in a device.

If a first SIM card is replaced by a second SIM card in a first device, the control module on the first device obtains the ID information from the second SIM card, and sends this to the control system (1400), which updates the stored information for the first device. In scenarios where the first SIM card was used to instantiate the device discovery and modification module, insertion of the first SIM card into a second device can result in the second device instantiating a device discovery and modification module that contacts the control system (1400). In such cases the control system (1400) can instruct the second device's device discovery and modification module to remove itself without installing any additional components on the second device if monitoring of the second device is not desired. Alternatively, the control system (1400) can store the second device's information and begin monitoring the second device too.

In a first usage, the control module (2340) receives an incoming message from the control service (1400) or the selective router (2320), parses arguments from the message and invokes requested instruction, and reports status of instruction processing to the control system (1400). The messages from the control service or selective router have a specific header format as shown in Table 3.

TABLE 3

General Server Initiated Command Parameters ("I" delimited)

| NAME | DESCRIPTION | TYPE | MIN OC-CURS | MAX OC-CURS |
|---|---|---|---|---|
| # AES Pad characters | The very first character is the Hex representation of the number of pad characters appended to the encrypted message. This number is used to strip off the AES padding at the end of the message. This parameter is not delimited from the SMS # parameter. | Hex Numeric | 1 | 1 |
| SMS # | This represents the position this SMS is in respects to any other SMS that may make up the command. The first SMS is 0 and if the message is too big for one SMS, then next SMS will be 1. If the SMS number is greater than 0, control module headers will be shortened. There will | HEX Numeric | 1 | 1 |

TABLE 3-continued

General Server Initiated Command Parameters ("I" delimited)

| NAME | DESCRIPTION | TYPE | MIN OCCURS | MAX OCCURS |
|---|---|---|---|---|
| | only be SMS#, Message ID, then a payload in SMS's after the first SMS. This payload will need to be concatenated to the prior SMS payload | | | |
| Protocol version | Version of the control module header fields. This lets the device know the scheme of the control module header fields. | Hex Numeric | 1 | 1 |
| Number of Total SMS | Number of SMSs that make up the entire command. If the message is too big for one SMS, this value tells you how many total SMS's to watch for. Minimum is 1. | Hex Numeric | 1 | 1 |
| Device ID | Unique identifier for the device being commanded | Hex Numeric | 1 | 1 |
| Message ID | Unique identifier for this command | Hex Numeric | 1 | 1 |
| Application ID | The unique identifier for the application this command is targeted for. Application IDs are assigned at the time application modules are built. The control module application has a value of 0. "Ctrl + k" delimiter | Hex Numeric | 1 | 1 |
| Command | The control module command. Possible values are listed below. Each of these is discussed in more detail in a later section<br>sd—Set Destination<br>im—Install Module<br>um—Update Module<br>dm—Delete Module<br>mi—Module Inventory<br>mq—Memory Query<br>da—Destroy All<br>me—Module Command | Static | 1 | 1 |

Once decrypted, the text of the message contains header information for the control module and application module specific instructions. The message is in delimited ASCII encoding, using "ctrl-k" and "I" as delimiters. The selection of delimiter characters and encoding character set is implementation dependent. In this example embodiment, the header information is separated by "Ctrl+k" character. Each of the parameters are delimited by a pipe (l). The elements within the delimited string are parameters that define the meaning of the command. Additional parameters then may be appended for commands sent to specific modules. The meaning of these additional parameters is not necessarily known to control module. It is expected that the module being commanded will understand the parameters. The control module will always pass these values through to the module without modification.

The Control module acknowledges receipt and provides processing status for each command it receives. Additionally, the device may periodically transmit messages to the control system (1400) based on trigger events that may occur on the device (i.e., incoming SMS message, incoming phone call, device shutdown/startup, etc.). An example format for these messages is illustrated in Table 4. All messages are sent to the control system (1400) using the protocol and remote address identified via the Set Destination process (see section 5.8.4.1.6). Response messages are formatted and optionally encoded and/or encrypted as described elsewhere.

TABLE 4

General Device Initiated Message Parameters ("I" delimited)

| NAME | DESCRIPTION | TYPE | MIN OCCURS | MAX OCCURS |
|---|---|---|---|---|
| # AES Pad characters | The very first character is the Hex representation of the number of pad characters appended to the encrypted message. This number is used to strip off the AES padding at the end of the message. This parameter is not delimited from the SMS # parameter. | Hex Numeric | 1 | 1 |
| Device ID | Unique identifier for the device | Hex Numeric | 0* | 1 |
| MSISDN* | The MSISDN for the device | Alpha Numeric | 0* | 1 |
| IMEI* | The IMEI of the device | Alpha Numeric | 0* | 1 |
| IMSI* | The IMSI of the device | Alpha Numeric | 0* | 1 |
| Server Message ID | This is the Message ID of the control message sent from the server | Hex Numeric | 1 | 1 |
| Message ID | Unique identifier for the command associated with this message. | Hex Numeric | 1 | 1 |
| Application ID | The unique identifier for the application that generated this message. Application IDs are assigned at the time application modules are built. The control module application has a value of 0. | Hex Numeric | 1 | 1 |
| ReturnCode | The ReturnCode for the event that triggered the message. ReturnCode = 0 is used to indicate success. Any other value is considered a failure. Each application defines its own set of ReturnCode values. | Hex Numeric | 1 | 1 |
| ErrorString | A string containing a description of the error(s) that occurred during processing | Alpha Numeric | 0 | 1 |

The incoming message includes one or more instructions to the control module (2340). The first portion of the instruction includes a 'Control' instruction that the control module (2340) can process. Exemplary control instructions include those shown in Table 5. The function of each of these control instructions is described in more detail in the sections below.

TABLE 5

Control Instructions

| CONTROL INSTRUCTION | ACTION |
|---|---|
| Set Destination (sd) | Sets the default destination for exfiltration requests |
| Install/Update (im/um) | Installs or updates a module. |

TABLE 5-continued

Control Instructions

| CONTROL INSTRUCTION | ACTION |
|---|---|
| Uninstall (dm) | Deletes a module. |
| Inventory List (mi) | Reports the inventory of installed modules. |
| Memory Query (mq) | Queries available memory on the monitored mobile device (1100). |
| Self destruct (da) | Destroys all modules and data on the monitored mobile device (1100). |
| Command (mc) | Passes a command to an installed module. |

Various portions of the message define the instruction processing status callback address, which is the service address to be used by the control module (2340) (or another module) to access a control service (1400). This service address defines the protocol and destination endpoint for processing responses from a mobile device to a control service. The instruction processing status callback address can be an SMS address, a USSD address, or a service address defined by UDP, TCP, or URI address. Example instruction processing status callback addresses include those shown in Table 6.

TABLE 6

Instruction Processing Status Callback Address Examples

| ADDRESS TYPE | PROCESSING STATUS CALLBACK ADDRESS |
|---|---|
| SMS specification | sms://<msisdn> e.g. "SMS://3105551212" |
| USSD specification | ussd://<ussd string>,e.g. "USSD://*#555#" |
| UDP specification | udp://<ip>:<port>,e.g. "UDP: 10.1.1.1:2000" |
| TCP specification | tcp://<ip>:<port>, e.g. "TCP :10.1.1.1:2000" |
| URI specification (in the form specified by RFC 3986) | "HTTP:10.1.1.1:2000/path/to/service" |

6.9.4.1 Control Module Commands

The following sections describe the control module functioning in response to various commands.

6.9.4.1.1 Install Module Command

The Install Module command allows the control system (1400) to instruct the control module to load new modules onto the device via the control module application. A message (header portions truncated for clarity) specifying the control parameters below is received by the control module and processed.

TABLE 7

Install Module Command Parameters ("l" delimited)

| NAME | DESCRIPTION | TYPE | MIN OCCURS | MAX OCCURS |
|---|---|---|---|---|
| | ... header omitted for clarity | | | |
| Application ID | 0 (control module) | Hex Numeric | 1 | 1 |
| Command | "Ctrl + k" im (Install Module) | Static | 1 | 1 |
| Target Application ID | The unique identifier for the application being installed. Application IDs are assigned at the time application modules are built. The control module application has a value of 0. | Hex Numeric | 1 | 1 |

TABLE 7-continued

Install Module Command Parameters ("l" delimited)

| NAME | DESCRIPTION | TYPE | MIN OCCURS | MAX OCCURS |
|---|---|---|---|---|
| URI | The URI where control module can download the target application. | Alpha numeric | 1 | 1 |

Upon receipt of the Install Module command, the control module causes the defined application to be loaded from the specified URI using the access method and parameters specified in the URI. The loaded control module is installed into the mobile device, and assigned the "target application ID" provided in the control message (see above).

An example of a textual version of an install command received by a mobile device is shown below. The example uses "ctrl-k" and "l" as delimiters, and is shown without encryption, base64 encoding, or other adjustments. It provides an example of how the parameters described for a specific command are encoded for transmission over a textual transmission mechanism such as SMS. Other encodings are possible within the scope of the invention and may be performed by those skilled in the art.

d0|001|1|19|a2|0"Ctrl+k"im|1|http://demo.test.com/mc/public/modules/wm/HeartBeat.dl1$$$$$$$$$$$$$

Table 8 breaks out the fields for clarity.

| PARAMETER | VALUE |
|---|---|
| # AES Pad characters | d |
| SMS # | 0 |
| Protocol version | 001 |
| Number of Total SMS | 1 |
| Device ID | 19 |
| Message ID | a2 |
| Application ID | 0 |
| | "Ctrl + k" |
| Command | im |
| Target Application ID | 1 |
| URL | http://demo.test.com/mc/public/modules/wm/HeartBeat.dl1 |

Additionally, upon completion of processing of the Install Module command, the control module responds to the control service with a confirmation message, including a ReturnCode to indicate the processing status. The response is sent to the destination currently configured for use by the control module. The response is formatted as described in Table 9.

TABLE 9

Install Module Response Message Parameters ("l" delimited)

| NAME | DESCRIPTION | TYPE | MIN OCCURS | MAX OCCURS |
|---|---|---|---|---|
| | ... header omitted for clarity | | | |
| Application ID | 0 (control module) | Hex Numeric | 1 | 1 |
| ReturnCode | The error code range for the Install Module command is 200-299. 0 = Success 200 = Application already installed 201 = Error fetching application 299 = General unexpected error | Hex Numeric | 1 | 1 |

TABLE 9-continued

Install Module Response Message Parameters ("I" delimited)

| NAME | DESCRIPTION | TYPE | MIN OC-CURS | MAX OC-CURS |
|---|---|---|---|---|
| ErrorString | If ReturnCode >200, ErrorString should contain a description of the error condition(s) | Alpha numeric | 0 | 1 |

6.9.4.1.2 Update Module Command

The Update Module command allows the control system (1400) to load updates to modules already installed on the device via the control module application. Table 10 contains the Update Module command parameters.

TABLE 10

Update Module Command Parameters ("I" delimited)

| NAME | DESCRIPTION | TYPE | MIN OC-CURS | MAX OC-CURS |
|---|---|---|---|---|
| Application ID | . . . header omitted for clarity 0 (control module) | Hex Numeric | 1 | 1 |
| Command | "Ctrl + k" um (Update Module) | Static | 1 | 1 |
| Target Application ID | The unique identifier for the application being updated. Application IDs are assigned the time application modules are built. The control module application has a value of 0. | Hex Numeric | 1 | 1 |
| URI | The URI where control module can download the target application. | Alpha Numeric | 1 | 1 |

Upon receipt and processing of the Update Module command, the control module downloads the new module, stops the processing of the previous module, deletes any stored exfiltration data collected by the previous module, starts the new module running, and responds to the control service with a confirmation message, including a ReturnCode to indicate the processing status. The response is sent to the destination currently configured for control module. The response is formatted as described in Table 11.

TABLE 11

Update Module Response Message Parameters ("I" delimited)

| NAME | DESCRIPTION | TYPE | MIN OC-CURS | MAX OC-CURS |
|---|---|---|---|---|
| Application ID | . . . header omitted for clarity 0 (control module) | Hex Numeric | 1 | 1 |
| ReturnCode | The error code range for the Update Module command is 300-399. 0 = Success 300 = Application not installed 301 = Error fetching application 399 = General unexpected error | Hex Numeric | 1 | 1 |
| ErrorString | If ReturnCode >300, ErrorString should contain a description of the error condition(s) | Alpha Numeric | 0 | 1 |

6.9.4.1.3 Delete Module Command

The Delete Module command allows the control system (1400) to instruct the control module to remove modules from the device via the control module application. Table 12 outlines the Delete Module command parameters.

TABLE 12

Delete Module Command Parameters ("I" delimited)

| NAME | DESCRIPTION | TYPE | MIN OC-CURS | MAX OC-CURS |
|---|---|---|---|---|
| Application ID | . . . header omitted for clarity 0 (control module) | Hex Numeric | 1 | 1 |
| Command | "Ctrl + k" dm (Delete Module) | Static | 1 | 1 |
| Target Application ID | The unique identifier for the application being deleted. Application IDs are assigned at the time application modules are built. The control module application has a value of O. | Hex Numeric | 1 | 1 |

Upon receipt and processing of the Delete Module command, the control module responds with a confirmation message, including a ReturnCode to indicate the processing status. The response is sent to the destination currently configured for the control module. The response is formatted as described in Table 13.

TABLE 13

Delete Module Response Message Parameters ("I" delimited)

| NAME | DESCRIPTION | TYPE | MIN OC-CURS | MAX OC-CURS |
|---|---|---|---|---|
| Application ID | . . . header omitted for clarity 0 (control module) | Hex Numeric | 1 | 1 |
| ReturnCode | The error code range for the Delete Module command is 400-499. 0 = Success 400 = Application not deleted 499 = General unexpected error | Hex Numeric | 1 | 1 |
| ErrorString | If ReturnCode >400, ErrorString should contain a description of the error condition(s) | Alpha numeric | 0 | 1 |

6.9.4.1.4 Destroy all Command

The Destroy All command allows the control system (1400) to remotely remove all traces of the control module, any other installed modules, and any associated data residing on the device. All data to be destroyed is overwritten with random bytes before removing. Table 14 outlines the Destroy All command parameters.

TABLE 14

Destroy All Command Parameters ("I" delimited)

| NAME | DESCRIPTION | TYPE | MIN OC-CURS | MAX OC-CURS |
|---|---|---|---|---|
| Application | . . . header omitted for clarity 0 (control module) | Hex | 1 | 1 |

TABLE 14-continued

Destroy All Command Parameters ("I" delimited)

| NAME | DESCRIPTION | TYPE | MIN OCCURS | MAX OCCURS |
|---|---|---|---|---|
| ID | | Numeric | | |
| Command | "Ctrl + k" da (Destroy All) | Static | 1 | 1 |

Upon receipt and processing of the Destroy All command, the control module responds with the requested data, and/or a ReturnCode to indicate the processing status. The response is sent to the destination currently configured for the control module. After the control module has responded, it destroys itself. If there is an error deleting an individual module, the response is formatted as described in Table 15.

TABLE 15

Destroy All Response Message Parameters ("I" delimited)

| NAME | DESCRIPTION | TYPE | MIN OCCURS | MAX OCCURS |
|---|---|---|---|---|
| | ... header omitted for clarity | | | |
| Application ID | 0 (control module) | Hex Numeric | 1 | 1 |
| ReturnCode | The error code range for the Destroy All command is 700-799. 0 = Success 700 = Module was not removed 799 = General unexpected error | Hex Numeric | 1 | 1 |
| ErrorString | If ReturnCode >700, ErrorString should contain a description of the error condition(s) | Alpha numeric | 0 | 1 |
| Module Info | For each module, a structure as defined in Table 16. | Struct | 0 | n |

TABLE 16

Module Info Structure ("I" delimited)

| NAME | DESCRIPTION | TYPE | MIN OCCURS | MAX OCCURS |
|---|---|---|---|---|
| Module Indicator | "mi"—A static value used to indicate that the fields that follow represent a Module Info struct | Static | 1 | 1 |
| Application ID | The unique identifier for the application being deleted. Application IDs are assigned at the time application modules are built. The control module application has a value of 0. | Hex Numeric | 1 | 1 |
| Version | The currently installed version of the module. | Hex Numeric | 1 | 1 |
| ReturnValue | For each module, a Delete Indicator structure as defined in Table 17. | Struct | 0 | N |

TABLE 17

Delete Indicator Structure ("I" delimited)

| NAME | DESCRIPTION | TYPE | MIN OCCURS | MAX OCCURS |
|---|---|---|---|---|
| Delete Indicator | "di"—A static value used to indicate that the fields that follow represent a Return struct | Static | 1 | 1 |
| ReturnCode | Delete return code from module | Hex Numeric | 1 | 1 |
| ErrorString | If ReturnCode >0, ErrorString should contain a description of the error condition(s) | Alpha numeric | 1 | 1 |

6.9.4.1.5 Module Inventory Command

The Module Inventory command allows the control system (1400) to query a mobile device to determine which modules are installed, and their current destination configuration(s). Table 18 outlines the Module Inventory command parameters.

TABLE 18

Module Inventory Command Parameters ("I" delimited)

| NAME | DESCRIPTION | TYPE | MIN OCCURS | MAX OCCURS |
|---|---|---|---|---|
| | ... header omitted for clarity | | | |
| Application ID | 0 (control module) | Hex Numeric | 1 | 1 |
| Command | "Ctrl + k" mi (Module Inventory) | Static | 1 | 1 |
| Target Application ID | The unique identifier for the application being queried. Zero or one Application ID may be specified. If no ID is specified, control module will return information for all Applications currently installed. If one ID is specified, control module will return a record for the requested Application ID. | Hex Numeric | 0 | 1 |

Upon receipt and processing of the Module Inventory command, the control module responds with the requested data, and/or a ReturnCode to indicate the processing status. The response is sent to the destination currently configured for the control module. The response is formatted as described in Table 19.

TABLE 19

Module Inventory Response Message Parameters ("I" delimited)

| NAME | DESCRIPTION | TYPE | MIN OCCURS | MAX OCCURS |
|---|---|---|---|---|
| | ... header omitted for clarity | | | |
| Application ID | 0 (control module) | Hex Numeric | 1 | 1 |
| ReturnCode | The error code range for the Module Inventory command is 500-599. | Hex Numeric | 1 | 1 |

TABLE 19-continued

Module Inventory Response Message Parameters ("I" delimited)

| NAME | DESCRIPTION | TYPE | MIN OC-CURS | MAX OC-CURS |
|---|---|---|---|---|
| ErrorString | 0 = Success<br>500 = Application not installed<br>501 = No applications installed<br>599 = General unexpected error<br>If ReturnCode >501, ErrorString should contain a description of the error conditions | Alpha numeric | 0 | 1 |
| Module Info | For each module, a structure as defined in Table 20. | Struct | 0 | n |

TABLE 20

Module Info Structure ("I" delimited)

| NAME | DESCRIPTION | TYPE | MIN OC-CURS | MAX OC-CURS |
|---|---|---|---|---|
| Module Indicator | "mi"—A static value used to indicate that the fields that follow represent a Module Info struct | Static | 1 | 1 |
| Application ID | The unique identifier for the application being deleted. Application IDs are assigned at the time application modules are built. The control module application has a value of 0 | Hex Numeric | 1 | 1 |
| Version | The currently installed version of the application. | Alpha Numeric | 1 | 1 |
| Destination | For each destination defined for this module, a structure as defined in Table 21. Destination information is only included in the response message if a single module was queried. | Struct | 0 | N |

TABLE 21

Destination Structure ("I" delimited)

| NAME | DESCRIPTION | TYPE | MIN OC-CURS | MAX OC-CURS |
|---|---|---|---|---|
| Destination Indicator | "di"—A static value used to indicate that the fields that follow represent a Destination struct | Static | 1 | 1 |
| Priority | The priority for this destination | Hex Numeric | 1 | 1 |
| Address | The address parameter indicates the bearer, protocol and remote address. The address must be prefixed with one of the following to indicate bearer and protocol:<br>https://<br>http://<br>sms://<br>udp://<br>ussd://<br>blue:// (Bluetooth ID) | Alpha numeric | 1 | 1 |

6.9.4.1.6 Set Destination Command

The Set Destination command allows the control system (1400) to configure the bearer, protocol and remote address the control module application sends messages to. Each module installed on the device (as well as the control module application itself) can have its own destination configuration, and each destination configuration can have a list of distinct remote destinations. Each remote destination has associated with it a priority. The control module application first attempts to send messages using the highest priority destination available. In the event of a failure, the control module application falls back to the next highest priority, and continues until the send is successful or the list of destinations is exhausted. Additionally, if a particular module does not have a destination configuration defined, the control module application uses its own destination configuration.

TABLE 22

Set Destination Command Parameters ("I" delimited)

| NAME | DESCRIPTION | TYPE | MIN OC-CURS | MAX OC-CURS |
|---|---|---|---|---|
| Application ID | . . . header omitted for clarity<br>0 (control module) | Hex Numeric | 1 | 1 |
| Command | "C'trl + k"<br>sd (Set Destination) | Static | 1 | 1 |
| Target Application ID | The unique identifier for the application whose destination is being configured. Application IDs are assigned at the time application modules are built. The control module application has a value of 0. | Hex Numeric | 1 | 1 |
| Priority | The priority for this destination. If the value provided conflicts with an existing destination, control module will replace the existing destination with this one | Hex Numeric | 1 | 1 |
| Address | The address parameter indicates the bearer, protocol and remote address. The address must be prefixed with one of the following to indicate bearer and protocol:<br>https://<br>http://<br>sms://<br>udp://<br>ussd://<br>blue:// (Bluetooth ID) | Alpha numeric | 1 | 1 |

Upon receipt and processing of the Set Destination command, the control module responds with a confirmation message, including a ReturnCode to indicate the processing status. The response is sent to the destination currently configured for the control module, even if the set destination command specifies a different application. The response is formatted as described in Table 23.

TABLE 23

Set Destination Response Message Parameters

| NAME | DESCRIPTION | TYPE | MIN OC-CURS | MAX OC-CURS |
|---|---|---|---|---|
| Application ID | . . . header omitted for clarity<br>0 (control module) | Hex Numeric | 1 | 1 |

TABLE 23-continued

Set Destination Response Message Parameters

| NAME | DESCRIPTION | TYPE | MIN OCCURS | MAX OCCURS |
|---|---|---|---|---|
| Return-Code | The error code range for the Set Destination command is 100-199. 0 = Success 100 = Application not installed 199 = General unexpected error | Hex Numeric | 1 | 1 |
| Error-String | If ReturnCode >100, ErrorString should contain a description of the error condition(s) | Alpha numeric | 0 | 1 |

6.9.4.1.7 Memory Query

The Memory Query command allows the control system (1400) to query the available storage space on the mobile device using the control module application. Table 24 outlines the Memory Query command parameters.

TABLE 24

Memory Query Command Parameters ("T" delimited)

| NAME | DESCRIPTION | TYPE | MIN OCCURS | MAX OCCURS |
|---|---|---|---|---|
| | ... header omitted for clarity | | | |
| Application ID | 0 (control module) | Hex Numeric | 1 | 1 |
| Command | "Ctrl + k" mq (Memory Query) | Static | 1 | 1 |

Upon receipt and processing of the Memory Query command, the control module responds with the requested data, and/or a ReturnCode to indicate the processing status. The response is sent to the destination currently configured for the control module. The response is formatted as described in Table 25.

TABLE 25

Memory Query Response Message Parameters ("T" delimited)

| NAME | DESCRIPTION | TYPE | MIN OCCURS | MAX OCCURS |
|---|---|---|---|---|
| | ... header omitted for clarity | | | |
| Application ID | 0 (control module) | Hex Numeric | 1 | 1 |
| ReturnCode | The error code range for the Delete Module command is 600-699. 0 = Success 699 = General unexpected error | Hex Numeric | 1 | 1 |
| ErrorString | If ReturnCode >600, ErrorString should contain a description of the error condition(s) | Alpha numeric | 0 | 1 |
| Memory Device | For each available memory device, a structure as defined in Table 26. | Structure | 1 | N |

TABLE 26

Memory Device Structure ("T" delimited)

| NAME | DESCRIPTION | TYPE | MIN OCCURS | MAX OCCURS |
|---|---|---|---|---|
| Memory Device Indicator | "md"—A static value used to indicate that the fields that follow represent a Memory Device structure | Static | 1 | 1 |
| Device Type | Indicates whether the memory device is removable or non-removable R0 = First Removable Disk R1 = Second Removable Disk ... Rn = Nth Removable Disk N = Non-Removable | Alpha Numeric | 1 | 1 |
| Total Space | The total size of the device in bytes | Hex Numeric | 1 | 1 |
| Available Space | The available space on the device | Hex Numeric | 1 | 1 |

6.9.5 Monitoring Modules

In some embodiments, the following feature specific modules (e.g. 2390a, 2390b) are downloaded and run on a monitored mobile device (1100). The functionality of each module described herein is described as independent modules for clarity. However, as will be appreciated by persons having ordinary skill in the art, the functionalities may be combined into a subset of modules for efficiency in deployment without loss of generality.

6.9.5.1 Heartbeat Module

The heartbeat module provides presence and location data to the control service (1410). The heartbeat function can be enabled such that it reports back to the control service on a periodic basis (for example, once every 10 minutes) and/or in response to events on the monitored mobile device (1100) (for example, incoming call, and power on/power off). This module runs without the user's knowledge.

6.9.5.1.1 Heartbeat Module Commands

6.9.5.1.1.1 Heartbeat Command

The command to control the heartbeat function is formatted as described in Table 27.

TABLE 27

Heartbeat Command Format

| NAME | DESCRIPTION | TYPE | MIN OCCURS | MAX OCCURS |
|---|---|---|---|---|
| | ... header omitted for clarity | | | |
| Application ID | 1 (Heartbeat) | Hex Numeric | 1 | 1 |
| Command | "Ctrl +k" mc (Module Command) | Hex Numeric | 1 | 1 |
| Event Mask | Bitmask enumerating the events that should trigger a heartbeat message to be sent. See Table 28 for the bitmask layout | 4 byte Bitmask Hex | 1 | 1 |
| Timer Period | The period (in seconds) in between timer based heartbeat events. This value will be used only if the timer event is enabled via the Event Mask parameter | Hex Numeric | 0 | 1 |
| Location Flag | Flag indicating whether to include location information (if available) | boolean (0 = false, 1 = true) | 0 | 1 |

TABLE 28

Heartbeat Event Bitmask Layout

| BIT | DESCRIPTION |
|---|---|
| 0 | Timer Event |
| 1 | Open |
| 2 | Device Power On |
| 3 | Device Power Off |
| 4 | Incoming SMS |
| 5 | Outgoing SMS |
| 6 | Incoming call |
| 7 | Outgoing call |
| 8 | Incoming email |
| 9 | Outgoing email |
| 10 | Incoming MMS |
| 11 | Outgoing MMS |
| 12 | Data session initiated |
| 13 | Data session ended |
| 14 | WiFi session initiated |
| 15 | WiFi session ended |
| 16 | Bluetooth session initiated |
| 17 | Bluetooth session ended |
| 18-31 | Open |

Example Heartbeat Event Bitmask:
0000 0000 0000 0000 0011 0000 0000 1101

In this example, the following events are enabled and all others are disabled:

Timer (bit 0)
Device Power On (bit 2)
Device Power Off (bit 3)
Data session initiated (bit 12)
Data session ended (bit 13)

The Heartbeat Module acknowledges receipt and provides processing status for each command it receives. Table 29 shows the format for the Heartbeat response.

TABLE 29

Heartbeat Command Acknowledgement Message Parameters

| NAME | DESCRIPTION | TYPE | MIN OCCURS | MAX OCCURS |
|---|---|---|---|---|
| | ... header omitted for clarity | | | |
| Application ID | 1 (Heartbeat) | Hex Numeric | 1 | 1 |
| ReturnCode | The error code range for the Heartbeat Module command is 1100-1199.<br>0 = Success<br>1100 = One or more events is not supported<br>1101 = Location data is not supported<br>1102 = One or more events is not supported and location data is not supported<br>1199 = General unexpected error | Hex Numeric | 1 | 1 |
| ErrorString | If ReturnCode >1102, ErrorString should contain a description of the error condition(s) | Alpha numeric | 0 | 1 |
| Message Type | a—Acknowledgement | static | 1 | 1 |
| Event Mask | A bitmask representing the events that were successfully enabled for the Heartbeat command. See Table 28 for the bitmask layout | 4 byte bitmask in Hex | 1 | 1 |

6.9.5.1.1.2 Heartbeat Message

When the heartbeat function is enabled, a variety of events may cause the device to send a heartbeat message (i.e. incoming SMS message, incoming phone call, device shutdown/startup, etc.). All messages are sent to the server using the protocol and remote address identified via the Set Destination process. The message is formatted according to Table 30.

TABLE 30

Heartbeat Message Parameters

| NAME | DESCRIPTION | TYPE | MIN OCCURS | MAX OCCURS |
|---|---|---|---|---|
| | ... header omitted for clarity | | | |
| Application ID | 1 (Heartbeat) | Hex Numeric | 1 | 1 |
| ReturnCode | The error code range for the Heartbeat Module command is 1100-1199.<br>0 = Success<br>1150 = Failed to access location data | Hex Numeric | 1 | 1 |
| ErrorString | If ReturnCode = 1150, ErrorString should contain a description of the error condition(s) | Alpha Numeric | 0 | 1 |
| Message Type | h—Heartbeat | Static | 1 | 1 |
| Event Mask | A bitmask representing the event that triggered the heartbeat message. See Table 28 for the bitmask layout | 4 byte bitmask in Hex | 1 | 1 |
| Location Info | For Heartbeat Location data, a structure as defined in Table 31. | struct | 0 | 1 |

TABLE 31

Location Info Structure ("l" delimited)

| NAME | DESCRIPTION | TYPE | MIN OCCURS | MAX OCCURS |
|---|---|---|---|---|
| Location Indicator | "li"—A static value used to indicate that the fields that follow represent a Location Info struct | Static | 1 | 1 |
| Cell ID | The Cell ID of the tower that the device is currently connected to. | Hex Numeric | 0 | 1 |
| Timing Advance | The timing advance number at the time of the Heartbeat. | Hex Numeric | 0 | 1 |
| Latitude | Latitude number at the time of the Heartbeat | Hex Numeric | 0 | 1 |
| Longitude | Longitude number at the time of the Heartbeat | Hex Numeric | 0 | 1 |
| Blob | If location data is gathered but format is not known, put here | Alpha Numeric | 0 | 1 |

6.9.5.2 SMS Intercept Module

The SMS Intercept module has two configurations. In its passive configuration, it captures incoming and outgoing messages. In its active configuration, it sends SMS messages to the device or from the device. The SMS Intercept Module also can be used to exfililtrate the contents of all the SMS databases on the monitored device.

6.9.5.2.1 SMS Intercept Commands 6.9.5.2.1.1 SMS Intercept Command—Passive Configuration The command format for the passive configuration of the SMS Intercept function is described in Table 32.

TABLE 32

SMS Intercept Passive Configuration Command Format

| NAME | DESCRIPTION | TYPE | MIN OCCURS | MAX OCCURS |
|---|---|---|---|---|
| | . . . header omitted for clarity | | | |
| Application ID | 2 (SMS Intercept) | Hex Numeric | 1 | 1 |
| Command | "Ctrl + k" mc (Module Command) | Hex Numeric | 1 | 1 |
| Message Type | p (Passive) | static | 1 | 1 |
| Incoming SMS Action | Single character code, interpreted as follows: A—Allow (no action) F—Allow, but forward to control system (1400) I—Intercept and forward to control system (1400) B—Block (but do not forward) | Alpha | 1 | 1 |
| Outgoing SMS Action | Single character code, interpreted as follows: A—Allow (no action) F—Allow, but forward to control system (1400) I—Intercept and forward to control system (1400) B—Block (but do not forward) | Alpha | 1 | 1 |

TABLE 33

SMS Intercept Passive Configuration Command Acknowledgement Message Parameters

| NAME | DESCRIPTION | TYPE | MIN OCCURS | MAX OCCURS |
|---|---|---|---|---|
| | . . . header omitted for clarity | | | |
| Application ID | 2 (SMS Intercept) | Hex Numeric | 1 | 1 |
| ReturnCode | The error code range for the SMS Intercept command is 1200-1299. 0 = Success 1299 = General unexpected error | Hex Numeric | 1 | 1 |
| ErrorString | If ReturnCode >0, ErrorString should contain a description of the error condition(s) | Alpha numeric | 0 | 1 |
| Message Type | a—Acknowledgement | static | 1 | 1 |

6.9.5.2.1.2 SMS Intercept Command—Active Configuration

TABLE 34

SMS Intercept Active Configuration Command Format

| NAME | DESCRIPTION | TYPE | MIN OCCURS | MAX OCCURS |
|---|---|---|---|---|
| | . . . header omitted for clarity | | | |
| Application ID | 2 (SMS Intercept) | Hex Numeric | 1 | 1 |
| Command | "Ctrl + k" mc (Module Command) | Hex Numeric | 1 | 1 |
| Message Type | a (Active) | Static | 1 | 1 |
| Action | Single character code, interpreted as follows: D—Deliver SMS to local inbox S—Send SMS to remote address | Static | 1 | 1 |
| Text | SMS Message Text | Alpha numeric | 1 | 1 |
| Address | Remote address - to be interpreted as the sender's address for Action = D and as the recipient address for Action = S | Alpha numeric | 1 | 1 |

TABLE 35

SMS Intercept Active Configuration Command Acknowledgement Message Parameters

| NAME | DESCRIPTION | TYPE | MIN OCCURS | MAX OCCURS |
|---|---|---|---|---|
| | . . . header omitted for clarity | | | |
| Application ID | 2 (SMS Intercept) | Hex Numeric | 1 | 1 |
| ReturnCode | The error code range for the SMS Intercept command is 1200-1299. 0 = Success 1299 = General unexpected error | Hex Numeric | 1 | 1 |
| ErrorString | If ReturnCode >0, ErrorString should contain a description of the error condition(s) | Alpha numeric | 0 | 1 |
| Message Type | a—Acknowledgement | Static | 1 | 1 |

6.9.5.2.1.3 SMS Intercept Exfiltration Command

The SMS Intercept Exfiltration command exfiltrates the contents of all the SMS databases (inbox, sent, delete, draft). The command is presented in the format shown in Table 36.

TABLE 36

SMS Intercept Exfiltration Command Format

| NAME | DESCRIPTION | TYPE | MIN OCCURS | MAX OCCURS |
|---|---|---|---|---|
| | . . . header omitted for clarity . . . | | | |
| Application ID | 2 (SMS Intercept) | Hex Numeric | 1 | 1 |
| Command | "Ctrl + k" mc (Module Command) | Hex Numeric | 1 | 1 |
| Message Type | e (exfiltration) | Static | 1 | 1 |
| Action | Bitmask enumerating the databases that should be interrogated and their contents returned . . . See Table 37 for the bitmask layout. | Hex Numeric | 1 | 1 |

TABLE 37

SMS Intercept Event Bitmask Layout

| BIT | DESCRIPTION |
|---|---|
| 0 | All databases |
| 1 | Inbox |
| 2 | Outbox (waiting to be sent) |
| 3 | Sent |
| 4 | Drafts |
| 5 | Trash |

SMS Intercept Event Bitmask Examples
Example 1: 000001 (Hex 1)
In this example, the following events are enabled and all others are disabled:
  Capture all databases contents (bit 0)
Example 2: 001010 (Hex A)
In this example, the following events are enabled and all others are disabled:
  Capture Inbox contents (bit 1)
  Capture Sent contents (bit 3)

TABLE 38

SMS Intercept Exfiltration Command Acknowledgement Message Parameters

| NAME | DESCRIPTION | TYPE | MIN OCCURS | MAX OCCURS |
|---|---|---|---|---|
| | ... header omitted for clarity ... | | | |
| Application ID | 2 (SMS Intercept) | Hex Numeric | 1 | 1 |
| ReturnCode | The error code range for the SMS Intercept Exfiltration command is 1200-1299. 0 = Success 1299 = General unexpected error | Hex Numeric | 1 | 1 |
| ErrorString | If ReturnCode >0, ErrorString should contain a description of the error condition(s) | Alpha numeric | 0 | 1 |
| Message Type | a—Acknowledgement | Static | 1 | 1 |

TABLE 39

SMS Intercept File Transmission Message Parameters

| NAME | DESCRIPTION | TYPE | MIN OCCURS | MAX OCCURS |
|---|---|---|---|---|
| | ... header omitted for clarity ... | | | |
| Application ID | 2 (SMS Intercept) | Hex Numeric | 1 | 1 |
| ReturnCode | The error code range for the SMS Intercept Exfiltration command is 1200-1299. 0 = Success 1200 = No files to upload 1299 = General unexpected error | Hex Numeric | 1 | 1 |
| ErrorString | If ReturnCode >1200, ErrorString should contain a description of the error condition(s) | Alpha Numeric | 0 | 1 |
| Message Type | e—exfiltration | static | 1 | 1 |
| SMS Message Segment | For SMS Message Transmission data, a structure as defined in Table 40. There can be multiple of these, one right after the other. | struct | 0 | N |
| Information | | | | |

TABLE 40

SMS Message Data Structure ("1" delimited)

| Name | Description | Type | Min Occurs | Max Occurs |
|---|---|---|---|---|
| SMS Exfiltration Indicator | "sei"—A static value used to indicate that the fields that follow represent a SMS Exfiltration Info struct | static | 1 | 1 |
| Database | Hex value of the database this message came from. See Table 37. | Hex Numeric | 1 | 1 |
| Address | This is the address the SMS. This is either the From or To address based on the database the message came from. | Alpha | 0 | 1 |
| SMS Header | The header of the SMS message. This should contain items like sent/received time. Items from Trash or Drafts may not have this data. | Alpha | 0 | 1 |
| Subject | Subject of the SMS message. Some SMS messages may not contain a subject line. | Alpha | 0 | 1 |
| Body | Body of the SMS message. | Alpha | 1 | 1 |

6.9.5.3 Open Microphone (Open Mic) Module

The open microphone module records audio using a microphone on the monitored mobile device (1100) and exfiltrates the recorded audio to the control system (1400). The methods of audio capture are configurable and include the following:

Capture and store audio
  Relay stored audio
  Relay during capture (streaming)
  Audio quality specification
  Create open channel (call)—create a send-only call
  Configure open call destination—configures the phone number of the listen-only recording service (1440)

The recorded audio can be immediately streamed to the control system (1400), or saved on the device for later upload.

TABLE 41

Open Mic Command Format

| NAME | DESCRIPTION | TYPE | MIN OCCURS | MAX OCCURS |
|---|---|---|---|---|
| | ... header omitted for clarity | | | |
| Application ID | 3 (Open Mic) | Hex Numeric | 1 | 1 |
| Command | "Ctrl + k" mc (Module Command) | Hex Numeric | 1 | 1 |

TABLE 41-continued

Open Mic Command Format

| NAME | DESCRIPTION | TYPE | MIN OCCURS | MAX OCCURS |
|---|---|---|---|---|
| Message Type | Static variable that signifies the type of command this is. Valid values are 'c', 'q', 'a' and 'e'. (Configure, Query, Activate, Exfiltration). See Sections detailing each Message Type below. | static | 1 | 1 |
| Message Command struct | Structure to support Message Type | struct | 0 | 1 |

6.9.5.3.1 Open Mic Commands 6.9.5.3.1.1 Open Mic Configuration Command

The command to configure the options for exfiltration of audio data files for the Open Microphone module is formatted as described in Table 42.

TABLE 42

Open Mic Configuration Command Format

| NAME | DESCRIPTION | TYPE | MIN OCCURS | MAX OCCURS |
|---|---|---|---|---|
| | ... header omitted for clarity | | | |
| Application ID | 3 (Open Mic) | Hex Numeric | 1 | 1 |
| Command | "Ctrl + k" mc (Module Command) | Hex Numeric | 1 | 1 |
| Message Type | c (Configure) | static | 1 | 1 |
| Audio quality | Quality of codec to use. Values can 0 or 1, where 0 is the best quality (may have larger files) and 1 is lower quality than best (smaller sized files). Default value is 0. Example is 0 = WAV and 1 = GSM610. | Hex Numeric | 1 | 1 |
| Exfiltration Method | Three character code, interpreted as follows: STR—Stream audio data in real-time IMM—Upload audio data immediately after recording is stopped STO—Store audio data on device NDS—Upload audio data during next user-initiated data session NIP—Upload audio data during next idle period. Length of idle period must be specified with the Exfiltration Threshold parameter in this message MEM—Upload audio data when the available storage space reaches a minimum amount. The minimum amount of storage space must be specified with the Exfiltration Threshold parameter in this message | static | 1 | 1 |

TABLE 42-continued

Open Mic Configuration Command Format

| NAME | DESCRIPTION | TYPE | MIN OCCURS | MAX OCCURS |
|---|---|---|---|---|
| Exfiltration Threshold | Required for Exfiltration Method = NIP and MEM. Used to specify the threshold associated with each of these exfiltration policies | Hex Numeric | 0 | 1 |

Upon receipt of an Open Mic Configuration command, the Open Mic module responds immediately with an acknowledgement that the command was received and processed. Table 43 shows the format for the Open Mic Configuration response.

TABLE 43

Open Mic Configuration Command Acknowledgement Message Parameters

| NAME | DESCRIPTION | TYPE | MIN OCCURS | MAX OCCURS |
|---|---|---|---|---|
| | ... header omitted for clarity | | | |
| Application ID | 3 (Open Microphone) | Hex Numeric | 1 | 1 |
| ReturnCode | The error code range for all Open Mic commands is 1300-1399. 0 = Success 1300 = No audio capture capability 1301 = Start audio capture failed 1302 = Stop audio capture failed 1303 = No audio to upload 1399 = General unexpected error | Hex Numeric | 1 | 1 |
| ErrorString | If ReturnCode >1303, ErrorString should contain a description of the error condition(s) | Alpha numeric | 0 | 1 |
| Message Type | a—Acknowledgement | static | 1 | 1 |

6.9.5.3.1.2 Open Mic Query Configuration Command

The command to query the configuration of the Open Mic module is formatted as described in Table 44.

TABLE 44

Open Mic Query Command Format

| NAME | DESCRIPTION | TYPE | MIN OCCURS | MAX OCCURS |
|---|---|---|---|---|
| | ... header omitted for clarity | | | |
| Application ID | 3 (Open Mic) | Hex Numeric | 1 | 1 |
| Command | "Ctrl + k" mc (Module Command) | Hex Numeric | 1 | 1 |
| Message Type | q (Query) | Static | 1 | 1 |

Upon receipt of an Open Microphone Query Command, the Open Microphone module responds immediately with a list of audio codecs available on the device.

TABLE 45

Open Mic Query Command Acknowledgement Message Parameters

| NAME | DESCRIPTION | TYPE | MIN OCCURS | MAX OCCURS |
|---|---|---|---|---|
| | ... header omitted for clarity | | | |
| Application ID | 3 (Open Microphone) | Hex Numeric | 1 | 1 |
| ReturnCode | The error code range for all Open Mic commands is 1300-1399. 0 = Success 1300 = No audio capture capability 1301 = Start audio capture failed 1302 = Stop audio capture failed 1303 = No audio to upload 1399 = General unexpected error | Hex Numeric | 1 | 1 |
| ErrorString | If ReturnCode >1303, ErrorString should contain a description of the error condition(s) | Alpha numeric | 0 | 1 |
| Message Type | a—Acknowledgement | static | 1 | 1 |
| Configuration Information | For Open Mic configuration data, a structure as defined in Table 46. | struct | 1 | 1 |

TABLE 46

Query Info Structure ("1" delimited)

| NAME | DESCRIPTION | TYPE | MIN OCCURS | MAX OCCURS |
|---|---|---|---|---|
| Configuration Indicator | "qi"—A static value used to indicate that the fields that follow represent a Open Mic Configuration Info struct | static | 1 | 1 |
| Active Codec | The codec currently configured to be used by the Open Mic module | Alpha Numeric | 1 | 1 |
| Active Codec Index | This is the index associate with this codec. 0 = best quality, 1 = next best quality | Hex Numeric | 1 | 1 |
| Currently recording | This is a Boolean to let the server know if audio is in the process of being recorded. | Boolean (0-1) | 1 | 1 |
| Active Exfiltration Method | Three character code, interpreted according to the Exfiltration Method parameter defined in Table 42. | Alpha | 1 | 1 |
| Active Exfiltration Threshold | If Active Exfiltration Method = NIP or MEM, this value specifies the threshold associated with each of the exfiltration policy | Hex Numeric | 0 | 1 |
| Available Codec | The abbreviation for an available audio codec. | Alpha | 1 | n |

6.9.5.3.1.3 Open Mic Activation Command

The command to immediately start and stop audio recordings for the Open Microphone module is formatted as described in Table 47.

TABLE 47

Open Mic Immediate Start and Stop Command Format

| NAME | DESCRIPTION | TYPE | MIN OCCURS | MAX OCCURS |
|---|---|---|---|---|
| | ... header omitted for clarity | | | |
| Application ID | 3 (Open Mic) | Hex Numeric | 1 | 1 |
| Command | "Ctrl + k" mc (Module Command) | Hex Numeric | 1 | 1 |
| Message Type | a (Activation) | static | 1 | 1 |
| State | 1 = Activate microphone 0 = Deactivate microphone | boolean | 1 | 1 |
| Duration | The number of seconds to record room audio. A value of 0 indicates unlimited (or until a deactivate command is received or memory of device is low) | Hex Numeric | 1 | 1 |

Upon receipt of an Open Microphone Activation Command, the Open Microphone module responds immediately with an acknowledgement message formatted as described in Table 48. The acknowledgement is sent using the configured destination.

TABLE 48

Open Mic Activation Command Acknowledgement Message Parameters

| NAME | DESCRIPTION | TYPE | MIN OCCURS | MAX OCCURS |
|---|---|---|---|---|
| | ... header omitted for clarity | | | |
| Application ID | 3 (Open Microphone) | Hex Numeric | 1 | 1 |
| ReturnCode | The error code range for the Open Microphone Module command is 1300-1399. 0 = Success 1300 = No audio capture capability 1301 = Start audio capture failed 1302 = Stop audio capture failed 1303 = No audio to upload 1399 = General unexpected error | Hex Numeric | 1 | 1 |
| ErrorString | If ReturnCode >1303, ErrorString should contain a description of the numeric error condition(s) | Alpha | 0 | 1 |
| Message Type | a—Acknowledgement | static | 1 | 1 |

6.9.5.3.1.4 Open Mic Exfiltration Command

The command to immediately start uploading any saved audio recordings is formatted as described in Table 49.

TABLE 49

Open Mic Exfiltration Command Format

| NAME | DESCRIPTION | TYPE | MIN OCCURS | MAX OCCURS |
|---|---|---|---|---|
| | ... header omitted for clarity | | | |
| Application ID | 3 (Open Mic) | Hex Numeric | 1 | 1 |

TABLE 49-continued

Open Mic Exfiltration Command Format

| NAME | DESCRIPTION | TYPE | MIN OCCURS | MAX OCCURS |
|---|---|---|---|---|
| | "Ctrl + k" | | | |
| Command | mc (Module Command) | Hex Numeric | 1 | 1 |
| Message Type | e (exfiltration) | static | 1 | 1 |

Upon receipt of an Open Mic Exfiltration command, the Open Mic module responds immediately with an acknowledgement that the command was received and processed. Table 50 shows the format for the Open Mic Exfiltration response.

TABLE 50

Open Mic Exfiltration Command Acknowledgement Message Parameters

| NAME | DESCRIPTION | TYPE | MIN OCCURS | MAX OCCURS |
|---|---|---|---|---|
| | . . . header omitted for clarity | | | |
| Application ID | 3 (Open Microphone) | Hex Numeric | 1 | 1 |
| ReturnCode | The error code range for all Open Mic commands is 1300-1399.<br>0 = Success<br>1300 = No audio capture capability<br>1301 = Start audio capture failed<br>1302 = Stop audio capture failed<br>1303 = No audio to upload<br>1399 = General unexpected error | Hex Numeric | 1 | 1 |
| ErrorString | If ReturnCode > 1303, ErrorString should contain a description of the error condition(s) | Alpha numeric | 0 | 1 |
| Message Type | a—Acknowledgement | static | 1 | 1 |
| Configuration Information | For Open Mic audio file data, a structure as defined in Table 51. | struct | 1 | 1 |

TABLE 51

Audio File Number Info Structure ("|" delimited)

| NAME | DESCRIPTION | TYPE | MIN OCCURS | MAX OCCURS |
|---|---|---|---|---|
| Audio File Number Indicator | "afni"—A static value used to indicate that the fields that follow represent a Open Mic Exfiltration Info struct | static | 1 | 1 |
| Number of audio files | The number of audio files that will be uploaded. This is NOT the number of frames or segments. An example is if there are 3 different recording sessions saved to the device, that are made up of 6 total segments (2 segments per session), this number would be 3. | Hex Numeric | 1 | 1 |

6.9.5.3.1.5 Open Mic Audio File Transmission Message

The Open Microphone module uploads audio file according to the format in Table 52.

TABLE 52

Open Mic Audio File Transmission Message Parameters

| NAME | DESCRIPTION | TYPE | MIN OCCURS | MAX OCCURS |
|---|---|---|---|---|
| | . . . header omitted for clarity | | | |
| Application ID | 3 (Open Microphone) | Hex Numeric | 1 | 1 |

TABLE 52-continued

Open Mic Audio File Transmission Message Parameters

| NAME | DESCRIPTION | TYPE | MIN OCCURS | MAX OCCURS |
|---|---|---|---|---|
| ReturnCode | The error code range for all Open Mic commands is 1300-1399.<br>0 = Success<br>1300 = No audio capture capability<br>1301 = Start audio capture failed<br>1302 = Stop audio capture failed<br>1303 = No audio to upload<br>1399 = General unexpected error | Hex Numeric | 1 | 1 |
| ErrorString | If ReturnCode > 1303, ErrorString should contain a description of the error condition(s) | Alpha Numeric | 0 | 1 |
| Message Type | e—exfiltration | static | 1 | 1 |
| Audio Segment Information | For Audio Transmission data, a structure as defined in Table 53. | struct | 0 | 1 |

TABLE 53

Audio Data Structure ("|" delimited)

| NAME | DESCRIPTION | TYPE | MIN OCCURS | MAX OCCURS |
|---|---|---|---|---|
| Audio Exfiltration Indicator | "aei"—A static value used to indicate that the fields that follow represent a Audio Exfiltration Info struct | static | 1 | 1 |
| Audio Quality Index | The quality index of the codec used. | Hex Numeric | 1 | 1 |
| Audio Codec | The codec this audio was encoded with | Alpha | 1 | 1 |
| File Size | Required for all audio files, unless the audio is being streamed in bytes | Hex Numeric | 1 | 1 |
| File Count | When segmenting the audio into smaller files, specify the segment count here | Hex Numeric | 1 | 1 |
| File Index | When segmenting the audio into smaller files, specify the zero based index of this file here | Hex Numeric | 1 | 1 |
| Start Time | This is the start time of the entire audio capture, NOT segment start time. If there are multiple audio segments uploaded, this start time value will be the same. Format of time is yyyyMMddHHmmss with a 24 hour time stamp. | Date/Decimal | 1 | 1 |
| Stop Time | This is the stop time of the entire audio capture, NOT segment stop time. If there are multiple audio segments uploaded, this stop time value will be the same. Format of time is yyyyMMddHHmmss with a 24 hour time stamp. If uploading of data is occurring while audio is being captured, this value will be 0. | Data/Decimal | 1 | 1 |
| Audio File | The audio data, encoded according to the specified format | blob | 1 | 1 |

6.9.5.4 Denial of Service Module

The Denial of Service module disables the RF transmitter and receiver on a monitored device (1100), as well as the buttons/keys on the device and the display screen. Some or all of these elements can be disabled either permanently or for a specific period of time.

The command to activate the Denial of Service module is formatted as described in Table 54.

TABLE 54

Denial of Service Activation Command Format

| NAME | DESCRIPTION | TYPE | MIN OCCURS | MAX OCCURS |
|---|---|---|---|---|
| ... header omitted for clarity | | | | |
| Application ID | 4 (Denial of Service) | 1 byte integer | 1 | 1 |

TABLE 54-continued

Denial of Service Activation Command Format

| NAME | DESCRIPTION | TYPE | MIN OCCURS | MAX OCCURS |
|---|---|---|---|---|
| | "Ctrl + k" | | | |
| Command | mc (Module command) | Alpha numeric | 1 | 1 |
| Message Type | A (Activation message type) | Alpha | 1 | 1 |
| Disabled Functions | A bitmask defining which functions should be enabled/disabled<br>Bit 0: Disable keys<br>Bit 1: Disable screen(s)<br>Bit 2: Disable RF<br>Bits 3-7: Open | 1 byte bitmask | 1 | 1 |
| Duration | The length of time to disable functions defined in the Disabled Functions parameter, in seconds. A value of 0 indicates the functions will be disabled permanently, or until an enabling command is received (of course, this only works if RF is NOT disabled), or a specific keystroke sequence is entered on the device. | 4 byte integer | 1 | 1 |
| Survive Reboot | Indicates whether or not the disablement should remain intact if the device is rebooted. | boolean (1 = true, 0 = false) | 0 | 1 |

In some embodiments, upon receipt of a Denial of Service Activation Command, the Denial of Service module responds immediately with an acknowledgement that the command was received and processed. The acknowledgement must be sent prior to actually processing the command, because the command may disable the RF transmission function on the device, which would prevent the acknowledgement from being sent. The acknowledgement is sent using the configured destination.

TABLE 55

Denial of Service Activation Command Acknowledgement Message Parameters

| NAME | DESCRIPTION | TYPE | MIN OCCURS | MAX OCCURS |
|---|---|---|---|---|
| | . . . header omitted for clarity | | | |
| Application ID | 4 (Denial of Service) | 1 byte integer | 1 | 1 |
| ReturnCode | The error code range for the Denial of Service command is 1300-1399.<br>0 = Success<br>1399 = General unexpected error | 2 byte Integer | 1 | 1 |
| ErrorString | If ReturnCode > 1300, ErrorString should contain a description of the error condition(s) | Alpha numeric | 0 | 1 |
| Message Type | A—Acknowledgement | Alpha | 1 | 1 |

6.9.5.5 Call Intercept Module

The Call Intercept module records incoming and outgoing phone calls. The recorded audio can be uploaded immediately after phone call ends or saved on the device for later upload.

TABLE 56

Call Intercept Command Format

| NAME | DESCRIPTION | TYPE | MIN OCCURS | MAX OCCURS |
|---|---|---|---|---|
| | . . . header omitted for clarity | | | |
| Application ID | 5 (Call Intercept) | Hex Numeric | 1 | 1 |

TABLE 56-continued

Call Intercept Command Format

| NAME | DESCRIPTION | TYPE | MIN OCCURS | MAX OCCURS |
|---|---|---|---|---|
| | "Ctrl + k" | | | |
| Command | mc (Module Command) | Hex Numeric | 1 | 1 |
| Message Type | Static variable that signifies the type of command this is. Valid values are 'c', 'q' and 'e'. (Configure, Query, Exfiltration). See Sections detailing each Message Type below. | static | 1 | 1 |
| Message Command struct | Structure to support Message Type | struct | 0 | 1 |

In the illustrated embodiments, the Call Intercept Module acknowledges receipt and provides processing status for each command it receives. In more specific exemplary embodiments, the device periodically transmits messages to the control system (1400) based on trigger events that may occur on the device (i.e. incoming phone call and outgoing phone call). The messages are sent to the control system (1400) using the bearer, protocol and remote address identified via the Set Destination process.

TABLE 57

General Device Initiated Message Parameters ("|" delimited)

| NAME | DESCRIPTION | TYPE | MIN OCCURS | MAX OCCURS |
|---|---|---|---|---|
| | ... header omitted for clarity | | | |
| Application ID | The unique identifier for the application that generated this message. Application IDs are assigned at the time application modules are built. The control module application has a value of 0. | Hex Number | 1 | 1 |
| ReturnCode | The ReturnCode for the event that triggered the message. ReturnCode = 0 is used to indicate success. Any other value is considered a failure. Each application defines its own set of ReturnCode values. | Hex Numeric | 1 | 1 |
| ErrorString | A string containing a description of the error(s) that occurred during processing | Alpha Numeric | 0 | 1 |
| Message Type | A static variable describing the type of message. Valid values are 'a' and 'e' (acknowledgement and exfiltration) | static | 1 | 1 |
| Added structure | Depending on the Message Type of the incoming command this structure maybe a 'cici', 'afni' or 'ciei'. (Configuration Indicator, Audio File Number Indicator, and Exfiltration Indicator) | struct | 0 | 1 |

6.9.5.5.1 Call Intercept Commands
    6.9.5.5.1.1 Call Intercept Configuration Command
        The command to configure the options for the Call Intercept module is formatted as described in Table 58.

TABLE 58

Call Intercept Configuration Command Format

| NAME | DESCRIPTION | TYPE | MIN OCCURS | MAX OCCURS |
|---|---|---|---|---|
| | ... header omitted for clarity | | | |
| Application ID | 5 (Call intercept) | Hex Numeric | 1 | 1 |
| | "Ctrl + k" | | | |
| Command | mc (Module Command) | Hex Numeric | 1 | 1 |

TABLE 58-continued

Call Intercept Configuration Command Format

| NAME | DESCRIPTION | TYPE | MIN OCCURS | MAX OCCURS |
| --- | --- | --- | --- | --- |
| Message Type | c (Configure) | static | 1 | 1 |
| Audio quality | Quality of codec to use. Values can 0 or 1, where 0 is the best quality (may have larger files) and 1 is lower quality than best (smaller sized files). Default value is 0. Example is 0 = WAV and 1 = GSM610. | Hex Numeric | 1 | 1 |
| Exfiltration Method | Three character code, interpreted as follows:<br>STR—Stream audio data in real-time<br>IMM—Upload audio data immediately after recording is stopped<br>STO—Store audio data on device<br>NDS—Upload audio data during next user-initiated data session<br>NIP—Upload audio data during next idle period. Length of idle period must be specified with the Exfiltration Threshold parameter in this message | static | 1 | 1 |
| Exfiltration Threshold | Required for Exfiltration Method = NIP. Used to specify the threshold associated with each of these exfiltration policies | Hex Numeric | 0 | 1 |
| Call Information | Information to determine which incoming and outgoing calls to record as defined in Table 59. | struct | 1 | n |

TABLE 59

Call Intercept Configuration Info Structure ("|" delimited)

| NAME | DESCRIPTION | TYPE | MIN OCCURS | MAX OCCURS |
| --- | --- | --- | --- | --- |
| Call Configuration Indicator | "cci"—A static value used to indicate that the fields that follow represent a Call Configuration Info structure | static | 1 | 1 |
| Phone number | Phone number interested in recording. This can be a specific number as 5551234567, or an '*' to record all numbers, or a pattern match as in 360* or *1234*. | Alpha Numeric | 1 | 1 |
| Direction | Character code on when to record call;<br>OUT—record outgoing call only<br>IN—record incoming call only<br>All—record both incoming and outgoing calls<br>Off—Turn off call recording. | Alpha | 1 | 1 |

In some embodiments, upon receipt of a Call Intercept Configuration command, the Call Intercept module responds immediately with an acknowledgement that the command was received and processed. Table 60 shows the format for the Call Intercept Configuration response.

TABLE 60

Call Intercept Configuration Command Acknowledgement Message Parameters

| NAME | DESCRIPTION | TYPE | MIN OCCURS | MAX OCCURS |
| --- | --- | --- | --- | --- |
| . . . header omitted for clarity | | | | |
| Application ID | 5 (Call Intercept) | Hex Numeric | 1 | 1 |
| ReturnCode | The error code range for all Call Intercept command is 1500-1599.<br>0 = Success<br>1500 = No audio capture capability<br>1599 = General unexpected error | Hex Numeric | 1 | 1 |
| ErrorString | If ReturnCode > 1500, ErrorString should contain a description of the error condition(s) | Alpha numeric | 0 | 1 |

TABLE 60-continued

Call Intercept Configuration Command Acknowledgement Message Parameters

| NAME | DESCRIPTION | TYPE | MIN OCCURS | MAX OCCURS |
|---|---|---|---|---|
| Message Type | a—Acknowledgement | static | 1 | 1 |

6.9.5.5.1.2 Call Intercept Query Command

The command to query the configuration of the Call Intercept module is formatted as described in Table 61.

TABLE 61

Call Intercept Query Command Format

| NAME | DESCRIPTION | TYPE | MIN OCCURS | MAX OCCURS |
|---|---|---|---|---|
| | . . . header omitted for clarity | | | |
| Application ID | 5 (Call Intercept) | Hex Numeric | 1 | 1 |

TABLE 61-continued

Call Intercept Query Command Format

| NAME | DESCRIPTION | TYPE | MIN OCCURS | MAX OCCURS |
|---|---|---|---|---|
| | "Ctrl + k" | | | |
| Command | mc (Module Command) | Hex Numeric | 1 | 1 |
| Message Type | q (Query) | Static | 1 | 1 |

Upon receipt of a Call Intercept Query Command, the Call Intercept module responds immediately with the current configuration of the module.

TABLE 62

Call Intercept Query Command Acknowledgement Message Parameters

| NAME | DESCRIPTION | TYPE | MIN OCCURS | MAX OCCURS |
|---|---|---|---|---|
| | . . . header omitted for clarity | | | |
| Application ID | 5 (Call Intercept) | Hex Numeric | 1 | 1 |
| ReturnCode | The error code range for all Call Intercept command is 1500-1599.<br>0 = Success<br>1599 = General unexpected error | Hex Numeric | 1 | 1 |
| ErrorString | If ReturnCode >= 1500, ErrorString should contain a description of the error condition(s) | Alpha numeric | 0 | 1 |
| Message Type | a—Acknowledgement | static | 1 | 1 |
| Call Information | For Call Intercept configuration data, a structure as defined in Table 63. | struct | 1 | 1 |

TABLE 63

Call Configuration Info Structure ("|" delimited)

| NAME | DESCRIPTION | TYPE | MIN OCCURS | MAX OCCURS |
|---|---|---|---|---|
| Call Configuration Indicator | "cci"—A static value used to indicate that the fields that follow represent a Call Configuration Info structure | static | 1 | 1 |
| Phone number | Phone number interested in recording. This can be a specific number as 5551234567, or an '*' to record all numbers, or a pattern match as in 360* or *1234*. | Alpha Numeric | 1 | 1 |
| Direction | Character code on when to record call;<br>OUT—record outgoing call only<br>IN—record incoming call only<br>All—record both incoming and outgoing calls<br>Off—Turn off call recording | Alpha | 1 | 1 |

In some embodiments, upon receipt of a Call Intercept Exfiltration command, the Call Intercept module responds immediately with an acknowledgement that the command was received and processed. Table 64 shows the format for the Call Intercept Exfiltration response.

TABLE 64

Call Intercept Exfiltration Command Acknowledgement Message Parameters

| NAME | DESCRIPTION | TYPE | MIN OCCURS | MAX OCCURS |
|---|---|---|---|---|
| | . . . header omitted for clarity | | | |
| Application ID | 5 (Call Intercept) | Hex Numeric | 1 | 1 |
| ReturnCode | The error code range for all Call Intercept command is 1500-1599. 0 = Success 1500 = No audio capture capability 1599 = General unexpected error | Hex Numeric | 1 | 1 |
| ErrorString | If ReturnCode >1500, ErrorString should contain a description of the error condition(s) | Alpha numeric | 0 | 1 |
| Message Type | a—Acknowledgement | static | 1 | 1 |
| Configuration Information | For Call Intercept audio file data, a structure as defined in Table 65 | struct | 1 | 1 |

TABLE 65

Audio File Number Info Structure ("|" delimited)

| NAME | DESCRIPTION | TYPE | MIN OCCURS | MAX OCCURS |
|---|---|---|---|---|
| Audio File Number Indicator | "afni"—A static value used to indicate that the fields that follow represent a Open Mic Exfiltration Info struct | static | 1 | 1 |
| Number of audio files | The number of audio files that will be uploaded. This is NOT the number of frames or segments. An example is if there are 3 different recording sessions saved to the device, that are made up of 6 total segments (2 segments per session), this number would be 3. | Hex Numeric | 1 | 1 |

6.9.5.5.1.3 Call Intercept Audio File Transmission Message

The Call Intercept module uploads audio file according to the format in Table 66.

TABLE 66

Call Intercept Audio File Transmission Message Parameters

| NAME | DESCRIPTION | TYPE | MIN OCCURS | MAX OCCURS |
|---|---|---|---|---|
| | . . . header omitted for clarity | | | |
| Application ID | 5 (Call Intercept) | Hex Numeric | 1 | 1 |
| ReturnCode | The error code range for all Call Intercept command is 1500-1599. 0 = Success 1599 = General unexpected error | Hex Numeric | 1 | 1 |

TABLE 66-continued

Call Intercept Audio File Transmission Message Parameters

| NAME | DESCRIPTION | TYPE | MIN OCCURS | MAX OCCURS |
|---|---|---|---|---|
| ErrorString | If ReturnCode >=150 ErrorString should contain a description of the error condition(s) | Alpha Numeric | 0 | 1 |
| Message Type | e—exfiltration | static | 1 | 1 |
| Call Intercept Audio Segment Information | For Call Intercept Audio Transmission data, a structure as defined in Table 67. | struct | 0 | 1 |

TABLE 67

Call Intercept Audio Data Structure ("|" delimited)

| NAME | DESCRIPTION | TYPE | MIN OCCURS | MAX OCCURS |
|---|---|---|---|---|
| Call Intercept Audio Exfiltration Indicator | "ciei"—A static value used to indicate that the fields that follow represent a Audio Exfiltration Info struct | static | 1 | 1 |
| Direction | This is the direction the call was going OUT—Outgoing call IN—Incoming call | static | 1 | 1 |
| Phone Number | This is the phone number that the call was made to or came from. | Alpha Numeric | 1 | 1 |
| Time call placed/received | This is the time the call started. . Format of time is yyyyMMddHHmmss with a 24 hour time stamp. | Data/Decimal | 1 | 1 |
| Audio Quality Index | The audio quality index the audio was captured with. | Hex Numeric | 1 | 1 |
| Audio Codec | The codec this audio was encoded with | Alpha | 1 | 1 |
| File Size | Required for all audio files, unless the audio is being streamed. In bytes | Hex Numeric | 1 | 1 |
| File Count | When segmenting the audio into smaller files, specify the segment count here | Hex Numeric | 1 | 1 |
| File Index | When segmenting the audio into smaller files, specify the zero based index of this file here | Hex Numeric | 1 | 1 |
| Audio File | The audio data, encoded according to the specified format | blob | 1 | 1 |

6.9.5.6 Message Intercept Module

The message intercept module provides for the interception and capture of, IM, Email, and other messaging traffic. In some embodiments, the message intercept module works in conjunction with the selective router module (2320) to identify and capture messaging traffic. The information captured is configurable and can include:

Incoming and/or outgoing IM

Incoming and/or outgoing e-mail

PIN to PIN messages between Blackberry users, including the to and from addresses.

6.9.5.6.1 Message Intercept Commands
6.9.5.6.1.1 Message Intercept Passive Configuration Command

TABLE 68

Message Intercept Passive Configuration Command format

| NAME | DESCRIPTION | TYPE | MIN OCCURS | MAX OCCURS |
|---|---|---|---|---|
| | . . . header omitted for clarity | | | |
| Application ID | 6 (Message Intercept) | Hex Numeric | 1 | 1 |
| Command | "Ctrl + k" mc (Module Command) | Hex Numeric | 1 | 1 |
| Message Type | p (Passive) | static | 1 | 1 |
| Passive Data Struct | For passive monitoring a structure as defined in Table 69. | struct | 0 | n |

TABLE 69

Passive Data Structure ("I" delimited)

| NAME | DESCRIPTION | TYPE | MIN OCCURS | MAX OCCURS |
|---|---|---|---|---|
| Passive message indicator | "pi"—A static value used to indicate that the fields that follow represent an passive capture struct | static | 1 | 1 |
| Database Name | The name of the database to monitor. The defaults for this are "sms", "allemail", and "mms". Query Message Databases command will return these database names. | Alpha | 1 | 1 |
| Incoming Action | Single character code, interpreted as follows: A—Allow (no action) F—Allow, but forward to OE I—Intercept and forward to OE B—Block (but do not forward) | static | 1 | 1 |
| Outgoing Action | Single character code, interpreted as follows: A—Allow (no action) F—Allow, but forward to OE I—Intercept and forward to OE B—Block (but do not forward) | static | 1 | 1 |

TABLE 70

Messaging Module Passive Configuration Command Acknowledgment Message

| NAME | DESCRIPTION | TYPE | MIN OCCURS | MAX OCCURS |
|---|---|---|---|---|
| | . . . header omitted for clarity | | | |
| Application ID | 6 (Message Intercept) | Hex Numeric | 1 | 1 |
| ReturnCode | The error code range for all Message Intercept commands is 1600-1699. 0 = success 1600 - One or more databases not supported 1699 = General unexpected error | Hex Numeric | 1 | 1 |
| ErrorString | A string containing a description of the error(s) that occurred during processing | Alpha Numeric | 0 | 1 |
| Message Type | a—Acknowledgement | static | 1 | 1 |
| Passive Data Ack Struct | For passive monitoring a structure as defined in Table 71. | struct | 1 | n |

TABLE 71

Passive Data Acknowledgement Structure ("I" delimited)

| NAME | DESCRIPTION | TYPE | MIN OCCURS | MAX OCCURS |
|---|---|---|---|---|
| Passive message acknowledgement indicator | "par"—A static value used to indicate that the fields that follow represent an passive capture struct | static | 1 | 1 |
| Database Name | The name of the database to monitor. The defaults for this are "sms", "email", and "mms". Query Message Databases command will return database names. | Alpha | 1 | 1 |
| Return Code | The error code range for all Message Intercept commands is 1600-1699. 0 = Success 1600 - Database not supported 1601 - Incoming action not supported 1602 - Outgoing action not supported 1603 - Both incoming actions supported 1699 - General unexpected error | Hex Numeric | 1 | 1 |
| Error String | If ReturnCode >1603, ErrorString should contain a description of the error condition(s) | Alpha | 1 | 1 |

6.9.5.6.1.2 Message Intercept Passive Configuration Command

TABLE 72

Message Intercept Active Configuration Command Format

| NAME | DESCRIPTION | TYPE | MIN OCCURS | MAX OCCURS |
|---|---|---|---|---|
| | . . . header omitted for clarity | | | |
| Application ID | 6 (Message Intercept) | Hex Numeric | 1 | 1 |
| Command | "Ctrl + k" mc (Module Command) | Hex Numeric | 1 | 1 |
| Message Type | a (Active) | Static | 1 | 1 |

TABLE 72-continued

Message Intercept Active Configuration Command Format

| NAME | DESCRIPTION | TYPE | MIN OCCURS | MAX OCCURS |
|---|---|---|---|---|
| Database Name | The name of the database to monitor. The defaults for this are "sms", "email", and "mms". Query Message Databases command will return these database names. | Alpha | 1 | 1 |
| Folder Name | The name of the folder to place the message | Alpha numeric | 1 | 1 |
| Action | Single character code, interpreted as follows: D—Deliver message to local folder below S—Send message to remote address | Static | 1 | 1 |
| To Address | The "To" field for the message. This may have multiple addresses. Addresses are delimited by "," | Alpha numeric | 1 | 1 |
| From Address | The "From" field for the message. | Alpha numeric | 1 | 1 |
| CC Address | The "CC" field for the message. This may have multiple addresses. Addresses are delimited by "," | Alpha numeric | 0 | 1 |
| BCC Address | The "BCC" field for the message. This may have multiple addresses. Addresses are delimited by "," | Alpha numeric | 0 | 1 |
| Subject data length | Length of text for the subject. We need to watch for 'I' in text. | Hex Numeric | 1 | 1 |
| Subject | Subject Text | Alpha numeric | 0 | 1 |
| Body mime-type | Mime type of body data | Alpha | 1 | 1 |
| Body data length | Length of data for body data. Message may be rich text, etc. | Hex Numeric | 1 | 1 |
| Body data | Body of the message. | Binary/text | 0 | 1 |
| Message Attachment structure | For Message Attachment Data a structure as defined in Table 73 | Struct | 0 | 1 |

TABLE 73

Message Attachment Data Structure ("I" delimited)

| NAME | DESCRIPTION | TYPE | MIN OCCURS | MAX OCCURS |
|---|---|---|---|---|
| Message Attachment Structure | "mai"—A static value used to indicate that the fields that follow represent an message Attachment Info struct | static | 1 | 1 |
| File Name | The name of the file. This will include extension. Examples are txt, jpg, png, doc, wav etc. | Alpha | 1 | 1 |
| Mime type | The mime type of the file data | Alpha | 1 | 1 |
| File Data length | Length of file data | Hex numeric | 1 | 1 |
| File Data | This is data that makes up the file. | Binary/text data | 1 | 1 |

TABLE 74

Message Intercept Active Configuration Command Acknowledgment Message Parameters

| NAME | DESCRIPTION | TYPE | MIN OCCURS | MAX OCCURS |
|---|---|---|---|---|
| | ... header omitted for clarity | | | |
| Application ID | 6 (Message Intercept) | Hex Numeric | 1 | 1 |
| ReturnCode | The error code range for all Message Intercept commands is 1600-1699. 0 = Success 1600 - Database not supported 1601 - Incoming action not supported 1602 - Outgoing action not supported 1603 - Both incoming actions supported 1699 = General unexpected error | Hex Numeric | 1 | 1 |
| ErrorString | If ReturnCode >1603, ErrorString should contain a description of the error condition(s) | Alpha numeric | 0 | 1 |
| Message Type | a —Acknowledgement | Static | 1 | 1 |

6.9.5.6.1.3 Message Intercept Exfiltration Command

TABLE 75

Message Intercept Exfiltration Command Format

| NAME | DESCRIPTION | TYPE | MIN OCCURS | MAX OCCURS |
|---|---|---|---|---|
| | ... header omitted for clarity | | | |
| Application ID | 6 (Message Intercept) | Hex Numeric | 1 | 1 |
| Command | "Ctrl + k" mc (Module Command) | Hex Numeric | 1 | 1 |
| Message Type | e (exfiltration) | Static | 1 | 1 |
| Exfiltration Target Struct | This is a structure that contains the database and folder that extraction will occur on. Database value can be "ALL" and folder value can be "ALL". If Database is "ALL" and folder is "inbox" then all "inbox" in all databases will be exfiltrated. If Database values is "sms" and folder value is "ALL", all folders in SMS database will be exfiltrated. Table 76 contains the Exfiltration Target Structure | struct | 1 | n |

TABLE 76

Exfiltration Target Structure ("I" delimited)

| NAME | DESCRIPTION | TYPE | MIN OCCURS | MAX OCCURS |
|---|---|---|---|---|
| Exfiltration | "ei"—A static value used to indicate that the fields that follow | Static | 1 | 1 |

TABLE 76-continued

Exfiltration Target Structure ("I" delimited)

| NAME | DESCRIPTION | TYPE | MIN OCCURS | MAX OCCURS |
|---|---|---|---|---|
| target indicator | represent an exfiltration target struct | | | |
| Database Name | The name of the database to exfiltrate. The defaults for this are "sms", "allemail", and "mms". Query Message Databases command will return database names. | Alpha | 1 | 1 |
| Folder name | The name of the folder that contains the data to exfi. | Alpha | 1 | 1 |

TABLE 77

Message Intercept Exfiltration Command Acknowledgment Message Parameters

| NAME | DESCRIPTION | TYPE | MIN OCCURS | MAX OCCURS |
|---|---|---|---|---|
| | . . . header omitted for clarity | | | |
| Application ID | 6 (Message Intercept) | Hex Numeric | 1 | 1 |
| Return Code | The error code range for all Message Intercept commands is 1600-1699.<br>0 = Success<br>1600 - Database not supported<br>1601 - Incoming action not supported<br>1602 - Outgoing action not supported<br>1603 - Both incoming actions supported<br>1699 = General unexpected error | Hex Numeric | 1 | 1 |
| Error String | If ReturnCode >1603, ErrorString should contain a description of the error condition(s) | Alpha | 1 | 1 |
| Message Type | a—Acknowledgement | Static | 1 | 1 |
| Exfiltration Ack Struct | For exfiltration structure as defined in Table 78. | struct | 1 | n |

TABLE 78

Exfiltration Acknowledgment Structure ("I" delimited)

| NAME | DESCRIPTION | TYPE | MIN OCCURS | MAX OCCURS |
|---|---|---|---|---|
| Exfiltration message acknowledgement indicator | "eai"—A static value used to indicate that the fields that follow represent an passive capture struct | static | 1 | 1 |
| Database Name | The name of the database to monitor. The defaults for this are "sms", "email", and "mms". Query Message Databases command will return database names. | Alpha | 1 | 1 |
| Folder name | Folder name | Alpha | 1 | 1 |
| Number of messages to be sent to server | This is the number of messages that should be uploaded to server | Hex Numeric | 1 | 1 |
| Return Code | The error code range for all Message Intercept commands is 1600-1699.<br>0 = Success<br>1600 - Database not supported<br>1601 - Incoming action not supported<br>1602 - Outgoing action not supported<br>1603 - Both incoming actions supported<br>1699 = General unexpected error | Hex Numeric | 1 | 1 |
| Error String | If ReturnCode >1603, ErrorString should contain a description of the error condition(s) | Alpha | 1 | 1 |

6.9.5.6.1.4 Message Intercept File Transmission Message

TABLE 79

Message Intercept File Transmission Message Parameters

| NAME | DESCRIPTION | TYPE | MIN OCCURS | MAX OCCURS |
|---|---|---|---|---|
| | . . . header omitted for clarity | | | |
| Application ID | 6 (Message Intercept) | Hex Numeric | 1 | 1 |
| ReturnCode | The error code range for all Message Intercept commands is 1600-1699.<br>0 = Success<br>1600 - Database not supported<br>1601 - Incoming action not supported<br>1602 - Outgoing action not supported<br>1603 - Both incoming actions supported<br>1699 = General unexpected error | Hex Numeric | 1 | 1 |

TABLE 79-continued

Message Intercept File Transmission Message Parameters

| NAME | DESCRIPTION | TYPE | MIN OCCURS | MAX OCCURS |
|---|---|---|---|---|
| ErrorString | If ReturnCode > 1603, ErrorString should | Alpha | 0 | 1 |
|  | contain a description of the error | Numeric |  |  |
|  | condition(s) |  |  |  |
| Message Type | e—exfiltration | static | 1 | 1 |
| Messaging Segment Information | For Messaging Transmission data, a structure as defined in Table 80 | struct | 0 | N |

TABLE 80

Messaging Exfiltration Data Structure ("|" delimited)

| NAME | DESCRIPTION | TYPE | MIN OCCURS | MAX OCCURS |
|---|---|---|---|---|
| Messaging Exfiltration Indicator | "mei" - - A static value used to indicate that the fields that follow represent a Message Exfiltration Info struct | static | 1 | 1 |
| Exfiltration Target Structure | For Database and Folder name format see Exfiltration target structure as defined in Table 76. | struct | 1 | 1 |
| Single message Structure | For a single message structure see Table 81. | Struct | 1 | n |

TABLE 81

Single Message Data Structure ("|" delimited)

| NAME | DESCRIPTION | TYPE | MIN OCCURS | MAX OCCURS |
|---|---|---|---|---|
| Single Message Exfiltration Indicator | "smei" - - A static value used to indicate that the fields that follow represent a Message Exfiltration Info struct | static | 1 | 1 |
| Direction | This value represents if the message was incoming to the device (1), outgoing from the device (2), or unknown (0). | Hex numeric | 1 | 1 |
| To Address | This is the To address of the message. | Alpha | 0 | 1 |
| From Address | This is the From address of the message. | Alpha | 0 | 1 |
| CC Address | This is the CC address. | Alpha | 0 | 1 |
| BCC Address | This is the BCC address. | Alpha | 0 | 1 |
| Time stamp | The timestamp of the message. Format of time is yyyyMMddHHmmss with a 24 hour time stamp. | Data/ Decimal | 0 | 1 |
| Subject data length | Length of text for the subject. We need to watch for '|' in text. | Hex Numeric | 1 | 1 |
| Subject | Subject of the message. Some messages may not contain a subject line. | Alpha | 0 | 1 |
| Body mime-type | Mime type of body data | Alpha | 1 | 1 |
| Body data length | Length of data for body data. Message may be rich text, etc. | Hex Numeric | 1 | 1 |
| Body data | Body of the message. | Binary/text | 0 | 1 |
| Message Attachment structure | For Message Attachment Data a structure as defined in Table 73. | struct | 0 | 1 |

6.9.5.6.1.5 Message Intercept Query Command

TABLE 82

Message Intercept Query Command format

| NAME | DESCRIPTION | TYPE | MIN OCCURS | MAX OCCURS |
|---|---|---|---|---|
| | . . . header omitted for clarity | | | |
| Application ID | 6 (Message Intercept) | Hex Numeric | 1 | 1 |
| Command | "Ctrl + k" mc (Module Command) | Hex Numeric | 1 | 1 |
| Message Type | q (Query) | Static | 1 | 1 |

TABLE 83

Message Intercept Query Command Acknowledgment Message Parameters

| NAME | DESCRIPTION | TYPE | MIN OCCURS | MAX OCCURS |
|---|---|---|---|---|
| | . . . header omitted for clarity | | | |
| Application ID | 6 (Message Intercept) | Hex Numeric | 1 | 1 |
| ReturnCode | The error code range for all Message Intercept commands is 1600-1699. 0 = Success 1600 - Database not supported 1601 - Incoming action not supported 1602 - Outgoing action not supported 1603 - Both incoming actions supported 1699 = General unexpected error | Hex Numeric | 1 | 1 |
| ErrorString | If ReturnCode > 1603, ErrorString should contain a description of the error condition(s) | Alpha numeric | 0 | 1 |
| Message Type | a—Acknowledgement | static | 1 | 1 |
| Configuration Information | For message Intercept configuration data, a structure as defined in Table 84. | struct | 1 | 1 |

TABLE 84

Query Info Structure ("|" delimited)

| NAME | DESCRIPTION | TYPE | MIN OCCURS | MAX OCCURS |
|---|---|---|---|---|
| Configuration Indicator | "qi" - - A static value used to indicate that the fields that follow represent a Message Intercept Configuration Info struct | static | 1 | 1 |
| Passive Data structure | For passive monitoring a structure as defined in Table 69. | struct | 0 | n |

6.9.5.6.1.6 Message Intercept Database Query Command

TABLE 85

Message Intercept Database Query Command Format

| NAME | DESCRIPTION | TYPE | MIN OCCURS | MAX OCCURS |
|---|---|---|---|---|
| | . . . header omitted for clarity | | | |
| Application ID | 6 (Message Intercept) | Hex Numeric | 1 | 1 |
| Command | "Ctrl + k" mc (Module Command) | Hex Numeric | 1 | 1 |
| Message Type | qd (Query Databases) | Static | 1 | 1 |

TABLE 86

Message Intercept Query Database Command Acknowledgment Message Parameters

| NAME | DESCRIPTION | TYPE | MIN OCCURS | MAX OCCURS |
|---|---|---|---|---|
| | . . . header omitted for clarity | | | |
| Application ID | 6 (Message Intercept) | Hex Numeric | 1 | 1 |
| ReturnCode | The error code range for all Message Intercept commands is 1600-1699.<br>0 = Success<br>1600 - Database not supported<br>1601 - Incoming action not supported<br>1602 - Outgoing action not supported<br>1603 - Both incoming actions supported<br>1699 = General unexpected error | Hex Numeric | 1 | 1 |
| ErrorString | If ReturnCode > 1603, ErrorString should contain a description of the error condition(s) | Alpha numeric | 0 | 1 |
| Message Type | a—Acknowledgement | static | 1 | 1 |
| Message Database Configuration Information | For Message Intercept database data, a structure as defined in Table 87. | struct | 1 | n |

TABLE 87

Message Intercept Database Data Info Structure ("|" delimited)

| NAME | DESCRIPTION | TYPE | MIN OCCURS | MAX OCCURS |
|---|---|---|---|---|
| Database Configuration Indicator | "qdi" - - A static value used to indicate that the fields that follow represent a Message Intercept database Configuration Info struct | static | 1 | 1 |
| Database name | Name of the message database that contains folders. | Alpha | 1 | 1 |
| Folder name | Name of folder that contains messages. | Alpha | 1 | 1 |
| Number of total messages | Number of messages in the folder | Hex numeric | 1 | 1 |
| Number of non-collected messages | Number of messages that have not been loaded to server | Hex numeric | 1 | 1 |

6.9.5.7 Camera Module

The Camera module captures still images or video (with or without audio) from the monitored mobile device's camera, if an image or video capture capability was identified on the device. In some embodiments, the camera module is configured to take one or more images from the camera, on a command or timed basis as well as when specified events occur, such as on device startup, when there is an incoming phone call, when the device changes location, etc. These images are exfiltrated to the control system (1440). The methods of video capture are configurable and include the following:

Capture and store images
Capture and store video
Events to capture images
Events to capture video
Relay stored images or video, whether taken with the camera or just stored on the device
Relay during capture (streaming)
Image or video quality specification The recorded images or video can be immediately streamed to the control system (1400), or saved on the device for later upload.

TABLE 88

Camera Command Format

| NAME | DESCRIPTION | TYPE | MIN OCCURS | MAX OCCURS |
|---|---|---|---|---|
| | . . . header omitted for clarity | | | |
| Application ID | 11 (Camera) | Hex Numeric | 1 | 1 |
| Command | "Ctrl + k"<br>mc (Module Command) | Hex Numeric | 1 | 1 |

TABLE 88-continued

Camera Command Format

| NAME | DESCRIPTION | TYPE | MIN OCCURS | MAX OCCURS |
| --- | --- | --- | --- | --- |
| Message Type | Static variable that signifies the type of command this is. Valid values are 'c', 'q', 'a' and 'e'. (Configure, Query, Activate, Exfiltration). See Sections detailing each Message Type below. | static | 1 | 1 |
| Message Command struct | Structure to support Message Type | struct | 0 | 1 |

6.9.5.7.1 Camera Commands
6.9.5.7.1.1 Camera Configuration Command

The command to configure the options for exfiltration of image or video data files for the Camera module is formatted as described in Table 89.

TABLE 89

Camera Module Configuration Command Format

| NAME | DESCRIPTION | TYPE | MIN OCCURS | MAX OCCURS |
| --- | --- | --- | --- | --- |
| | ... header omitted for clarity | | | |
| Application ID | 11 (Camera) | Hex Numeric | 1 | 1 |
| Command | "Ctrl + k" mc (Module Command) | Hex Numeric | 1 | 1 |
| Message Type | c (Configure) | static | 1 | 1 |
| Capture Type | Specify Image or Video capture. Values can be 0, 1 or 2, where 0 = image capture, 1 = video capture, and 2 = video/audio capture | Hex Numeric | 1 | 1 |
| Capture Frequency | For image capture, specifies time delay between sequential image captures. Value is in seconds. For video capture, specifies time delay between sequential video sequence captures. Value is in seconds. | Hex Numeric | 1 | 1 |
| Capture Duration | Used only with video capture. Specifies the length of each capture in seconds. | Hex Numeric | 0 | 1 |
| Event Mask | Bitmask enumerating the events that should trigger a Camera message to be sent. See Table 89a for the bitmask layout | 4 byte bitmask | 0 | 1 |
| Capture Count | For image capture, specifies the number of images to capture. For video capture, specifies the number of sequences to capture. | Hex Numeric | 1 | 1 |
| Image quality | Quality of codec to use. Values can be 0 or 1, where 0 is the best quality (may have larger files) and 1 is lower quality than best (smaller sized files). Default value is 0. Example is 0 = JPG 50% compression, half resolution and 1 = JPG 0% compression, full resolution. | Hex Numeric | 1 | 1 |
| Exfiltration Method | Three character code, interpreted as follows: STR—Stream image or video data in real-time IMM—Upload image or video data immediately after recording is stopped STO—Store image or video data on device NDS—Upload image or video data during next user-initiated data session NIP—Upload image or video data during next idle period. Length of idle period must be specified with the Exfiltration Threshold parameter in this message | static | 1 | 1 |

TABLE 89-continued

Camera Module Configuration Command Format

| NAME | DESCRIPTION | TYPE | MIN OCCURS | MAX OCCURS |
|---|---|---|---|---|
| | MEM—Upload image or video data when the available storage space reaches a minimum amount. The minimum amount of storage space must be specified with the Exfiltration Threshold parameter in this message | | | |
| Exfiltration Threshold | Required for Exfiltration Method = NIP and MEM. Used to specify the threshold associated with each of these exfiltration policies | Hex Numeric | 0 | 1 |

Upon receipt of a Camera Configuration command, the Camera module responds immediately with an acknowledgement that the command was received and processed. Table 90 shows the format for the Camera Configuration response.

TABLE 89a

Camera Event Bitmask Layout

| BIT | DESCRIPTION |
|---|---|
| 0 | Timer Event |
| 1 | Open |
| 2 | Device Power On |
| 3 | Device Power Off |
| 4 | Incoming SMS |
| 5 | Outgoing SMS |
| 6 | Incoming call |
| 7 | Outgoing call |
| 8 | Incoming email |
| 9 | Outgoing email |
| 10 | Incoming MMS |
| 11 | Outgoing MMS |
| 12 | Data session initiated |
| 13 | Data session ended |
| 14 | WiFi session initiated |
| 15 | WiFi session ended |
| 16 | Bluetooth session initiated |
| 17 | Bluetooth session ended |
| 18 | Location change |
| 19-31 | Open |

TABLE 90

Camera Configuration Command Acknowledgement Message Parameters

| NAME | DESCRIPTION | TYPE | MIN OCCURS | MAX OCCURS |
|---|---|---|---|---|
| | . . . header omitted for clarity | | | |
| Application ID | 11 (Camera) | Hex Numeric | 1 | 1 |
| ReturnCode | The error code range for all Camera commands is 2100-2199. 0 = Success 2100 = No camera capture capability 2101 = No image capture capability 2102 = No video capture capability 2103 = Capture image failed 2104 = Capture video failed 2105 = Stop image capture failed 2106 = Stop video capture failed 2107 = No image to upload 2108 = No video to upload 2199 = General unexpected error | Hex Numeric | 1 | 1 |
| ErrorString | If ReturnCode > 2108, ErrorString should contain a description of the error condition(s) | Alpha numeric | 0 | 1 |
| Message Type | a—Acknowledgement | static | 1 | 1 |
| Event Mask | A bitmask representing the events that were successfully enabled for the Camera command. See Table 3.1.2 for the bitmask layout | 4 byte bitmask in Hex | 1 | 1 |

6.9.5.7.1.2 Camera Query Configuration Command

The command to query the configuration of the Camera module is formatted as described in Table 91.

TABLE 91

Camera Query Command Format

| NAME | DESCRIPTION | TYPE | MIN OCCURS | MAX OCCURS |
|---|---|---|---|---|
|  | . . . header omitted for clarity |  |  |  |
| Application ID | 11 (Camera) | Hex Numeric | 1 | 1 |
| Command | "Ctrl + k" mc (Module Command) | Hex Numeric | 1 | 1 |
| Message Type | q (Query) | Static | 1 | 1 |

Upon receipt of a Camera Query Command, the Camera module responds immediately with a list of image formats and video codecs available on the device.

TABLE 92

Camera Query Command Acknowledgement Message Parameters

| NAME | DESCRIPTION | TYPE | MIN OCCURS | MAX OCCURS |
|---|---|---|---|---|
|  | . . . header omitted for clarity |  |  |  |
| Application ID | 11 (Camera) | Hex Numeric | 1 | 1 |
| ReturnCode | The error code range for all Camera commands is 2100-2199. 0 = Success 2100 = No camera capture capability 2101 = No image capture capability 2102 = No video capture capability 2199 = General unexpected error | Hex Numeric | 1 | 1 |
| ErrorString | If ReturnCode > 2108, ErrorString should contain a description of the error condition(s) | Alpha numeric | 0 | 1 |
| Message Type | a—Acknowledgement | static | 1 | 1 |
| Configuration Information | For Camera configuration data, a structure as defined in Table 93. | struct | 1 | 1 |

TABLE 93

Camera Query Info Structure ("I" delimited)

| NAME | DESCRIPTION | TYPE | MIN OCCURS | MAX OCCURS |
|---|---|---|---|---|
| Configuration Indicator | "qi"—A static value used to indicate that the fields that follow represent a Query Info struct | static | 1 | 1 |
| Active Codec | The image file format currently configured to be used by the Camera module, a pipe character ("I") and the codec currently configured to be used by the Camera module for video encoding. | Alpha Numeric | 1 | 1 |
| Active Codec Index | The index associated with the image file format, followed by the index associated with the Active Codec. 0 = best quality, 1 = next best quality | Hex Numeric | 2 | 2 |
| Currently recording | This is a Boolean to let the server know if images are being captured, or video is in the process of being recorded. | Boolean (0-1) | 1 | 1 |
| Active Exfiltration Method | Three character code, interpreted according to the Exfiltration Method parameter defined in Table 89. | Alpha | 1 | 1 |
| Active Exfiltration Threshold | If Active Exfiltration Method = NIP or MEM, this value specifies the threshold associated with each of the exfiltration policies. | Hex Numeric | 0 | 1 |

6.9.5.7.1.3 Camera Activation Command

The command to immediately start and stop image or video recording for the Camera module is formatted as described in Table 94.

TABLE 94

Camera Immediate Start and Stop Command Format

| NAME | DESCRIPTION | TYPE | MIN OCCURS | MAX OCCURS |
|---|---|---|---|---|
| | . . . header omitted for clarity | | | |
| Application ID | 11 (Camera) "Ctrl + k" | Hex Numeric | 1 | 1 |
| Command | mc (Module Command) | Hex Numeric | 1 | 1 |
| Message Type | a (Activation) | static | 1 | 1 |
| State | 1 = Activate camera 0 = Deactivate camera | boolean | 1 | 1 |
| Duration | The number of images to capture in image mode, and the number of seconds to record in video mode. A value of 0 indicates unlimited (or until a deactivate command is received or memory of device is low) | Hex Numeric | 1 | 1 |

Upon receipt of a Camera Activation Command, the Camera module responds immediately with an acknowledgement message formatted as described in Table 95. The acknowledgement is sent using the configured destination.

TABLE 95

Camera Activation Command Acknowledgement Message Parameters

| NAME | DESCRIPTION | TYPE | MIN OCCURS | MAX OCCURS |
|---|---|---|---|---|
| | . . . header omitted for clarity | | | |
| Application ID | 11 (Camera) | Hex Numeric | 1 | 1 |
| ReturnCode | The error code range for the Camera Module command is 2100-2199. 0 = Success 2100 = No camera capture capability 2101 = No image capture capability 2102 = No video capture capability 2103 = Capture image failed 2104 = Capture video failed 2199 = General unexpected error | Hex Numeric | 1 | 1 |
| ErrorString | If ReturnCode >2108, ErrorString should contain a description of the error condition(s) | Alpha numeric | 0 | 1 |
| Message Type | a—Acknowledgement | static | 1 | 1 |

6.9.5.7.1.4 Camera Exfiltration Command

The command to immediately start uploading any saved images or video recordings is formatted as described in Table 96.

TABLE 96

Camera Exfiltration Command Format

| NAME | DESCRIPTION | TYPE | MIN OCCURS | MAX OCCURS |
|---|---|---|---|---|
| | . . . header omitted for clarity | | | |
| Application ID | 11 (Camera) "Ctrl +k" | Hex Numeric | 1 | 1 |
| Command | mc (Module Command) | Hex Numeric | 1 | 1 |
| Message Type | e (exfiltration) | static | 1 | 1 |

Upon receipt of a Camera Exfiltration command, the Camera module responds immediately with an acknowledgement that the command was received and processed. Table 97 shows the format for the Camera Exfiltration response.

TABLE 97

Camera Exfiltration Command Acknowledgement Message Parameters

| NAME | DESCRIPTION | TYPE | MIN OCCURS | MAX OCCURS |
|---|---|---|---|---|
| | . . . header omitted for clarity | | | |
| Application ID | 11 (Camera) | Hex Numeric | 1 | 1 |
| ReturnCode | The error code range for all Camera commands is 2100-2199. 0 = Success 2100 = No camera capture capability 2101 = No image capture capability 2102 = No video capture capability 2103 = Capture image failed 2104 = Capture video failed 2107 = No image to upload 2108 = No video to upload 2199 = General unexpected error | Hex Numeric | 1 | 1 |
| ErrorString | If ReturnCode >2108, ErrorString should contain a description of the error condition(s) | Alpha numeric | 0 | 1 |
| Message Type | a—Acknowledgement | static | 1 | 1 |
| Configuration Information | For Camera module data, a structure as defined in Table 98. | struct | 1 | 1 |

TABLE 98

Camera File Number Info Structure ("|" delimited)

| NAME | DESCRIPTION | TYPE | MIN OCCURS | MAX OCCURS |
|---|---|---|---|---|
| Camera File Number Indicator | "cfni"—A static value used to indicate that the fields that follow represent a Camera Exfiltration Info struct | static | 1 | 1 |
| Number of capture files | The number of image or video files that will be uploaded. This is NOT the number of frames or segments. Example: if there are 3 different capture sessions saved to the device, that are made up of 6 total images and/or segments (2 images or segments per session), this number would be 3. | Hex Numeric | 1 | 1 |

6.9.5.7.1.5 Camera File Transmission Message

The Camera module uploads image and video files according to the format in Table 99.

TABLE 99

Camera File Transmission Message Parameters

| NAME | DESCRIPTION | TYPE | MIN OC-CURS | MAX OC-CURS |
|---|---|---|---|---|
| | ... header omitted for clarity | | | |
| Application ID | 11 (Camera) | Hex Numeric | 1 | 1 |
| ReturnCode | The error code range for all Camera commands is 2100-2199.<br>0 = Success<br>2100 = No camera capture capability<br>2101 = No image capture capability<br>2102 = No video capture capability<br>2103 = Capture image failed<br>2104 = Capture video failed<br>2107 = No image to upload<br>2108 = No video to upload<br>2199 = General unexpected error | Hex Numeric | 1 | 1 |
| ErrorString | If ReturnCode >2108, ErrorString should contain a description of the error condition(s) | Alpha Numeric | 0 | 1 |
| Message Type | e—exfiltration | static | 1 | 1 |
| Camera Segment Information | For Camera Transmission data, a structure as defined in Table 100. | struct | 0 | 1 |

TABLE 100

Camera Data Structure ("|" delimited)

| NAME | DESCRIPTION | TYPE | MIN OC-CURS | MAX OC-CURS |
|---|---|---|---|---|
| Camera Exfiltration Indicator | "cei"—A static value used to indicate that the fields that follow represent a Camera Exfiltration Info struct | static | 1 | 1 |
| Camera Quality Index | The quality index of the image file or video codec used. | Hex Numeric | 1 | 1 |
| Format | For image data, the file format used. For video data, the codec the video was encoded with | Alpha | 1 | 1 |
| File Size | Required for all image or video files, unless the image or video is being streamed in bytes | Hex Numeric | 1 | 1 |
| File Count | When segmenting the image or video into smaller files, specify the segment count here | Hex Numeric | 1 | 1 |
| File Index | When segmenting the image or video data into smaller files, specify the zero based index of this file here | Hex Numeric | 1 | 1 |
| Event Mask | A bitmask representing the event that triggered the camera message. See Table 89a for the bitmask layout | 4 byte bitmask in Hex | 1 | 1 |
| Start Time | This is the start time of the entire camera capture, NOT segment start time. If there are multiple camera segments uploaded, this start time value will be the same. Format of time is yyyyMMddHHmmss with a 24 hour time stamp. | Date/Decimal | 1 | 1 |

TABLE 100-continued

Camera Data Structure ("|" delimited)

| NAME | DESCRIPTION | TYPE | MIN OC-CURS | MAX OC-CURS |
|---|---|---|---|---|
| Stop Time | This is the stop time of the entire camera capture, NOT segment stop time. If there are multiple camera segments uploaded, this stop time value will be the same for each. Format of time is yyyyMMddHHmmss with a 24 hour time stamp. If uploading of data is occurring while images or video are being captured, this value will be 0. | Data/Decimal | 1 | 1 |
| Camera File | The image or video data, encoded according to the specified format | blob | 1 | 1 |

6.9.5.8 PIM Capture Module

The PIM capture module collects information from the PIM application provided on the monitored mobile device (1100). The information captured are configurable, and can include:

All, new or changed calendar entries
All, new or changed contact entries
Changed password

TABLE 101

PIM Capture Command Format

| NAME | DESCRIPTION | TYPE | MIN OC-CURS | MAX OC-CURS |
|---|---|---|---|---|
| | ... header omitted for clarity | | | |
| Application ID | 14 (PIM Capture) | Hex Numeric | 1 | 1 |
| Command | "Ctrl + k"<br>mc (Module Command) | Hex Numeric | 1 | 1 |
| Message Type | Static variable that signifies the type of command this is. Valid values are 'c' and 'e'. (Configure or Exfiltration). See Sections detailing each Message Type below. | static | 1 | 1 |
| Message Command struct | Structure to support Message Type | struct | 0 | 1 |

6.9.5.8.1 PIM Capture Commands

6.9.5.8.1.1 PIM Capture Configuration Command

The command to configure the options for exfiltration of PIM Capture module data is formatted as described in Table 102.

TABLE 102

PIM Capture Configuration Command Format

| NAME | DESCRIPTION | TYPE | MIN OC-CURS | MAX OC-CURS |
|---|---|---|---|---|
| | ... header omitted for clarity | | | |
| Application ID | 14 (PIM Capture) | Hex Numeric | 1 | 1 |
| Command | "Ctrl + k"<br>mc (Module Command) | Hex Numeric | 1 | 1 |

TABLE 102-continued

PIM Capture Configuration Command Format

| NAME | DESCRIPTION | TYPE | MIN OCCURS | MAX OCCURS |
|---|---|---|---|---|
| Message Type | c (Configure) | static | 1 | 1 |
| Capture Type | Specify PIM data to capture. This is a bit-mapped value, with Bit 0 = Calendar Data, Bit 1 = Address Book Data. Remaining bits are reserved for future use. | Hex Numeric | 1 | 1 |
| Event Mask | Bitmask enumerating the events that should trigger a Camera message to be sent. See Table 102a for the bitmask layout | 4 byte bitmask | 1 | 1 |
| Exfiltration Method | Three character code, interpreted as follows: IMM—Upload changes as they are made STO—Store changes on device NDS—Upload data during next user-initiated data session NIP—Upload data during next idle period. Length of idle period must be specified with the Exfiltration Threshold parameter in this message MEM—Upload data when the available storage space reaches a minimum amount. The minimum amount of storage space must be specified with the Exfiltration Threshold parameter in this message | static | 1 | 1 |
| Exfiltration Threshold | Required for Exfiltration Method = NIP and MEM. Used to specify the threshold associated with each of these exfiltration policies | Hex Numeric | 0 | 1 |

TABLE 102a

PIM Event Bitmask Layout

| BIT | DESCRIPTION |
|---|---|
| 0 | Add |
| 1 | Edit |
| 2 | Delete |
| 3 | Alert/Reminder |
| 4-31 | Open |

Upon receipt of a PIM Capture Configuration command, the PIM Capture module responds immediately with an acknowledgement that the command was received and processed. Table 103 shows the format for the PIM Capture Configuration response.

TABLE 103

PIM Capture Configuration Command Acknowledgement Message Parameters

| NAME | DESCRIPTION | TYPE | MIN OCCURS | MAX OCCURS |
|---|---|---|---|---|
| | ... header omitted for clarity | | | |
| Application ID | 14 (PIM Capture) | Hex Numeric | 1 | 1 |
| ReturnCode | The error code range for all PIM Capture commands is 2400-2499. 0 = Success 2400 = No PIM capability 2401 = Start PIM Capture failure 2402 = Stop PIM Capture failure 2403 = No PIM data to upload 2499 = General unexpected error | Hex Numeric | 1 | 1 |
| ErrorString | If ReturnCode >2403, ErrorString should contain a description of the error condition(s) | Alpha numeric | 0 | 1 |
| Message Type | a—Acknowledgement | static | 1 | 1 |

6.9.5.8.1.2 PIM Capture Exfiltration Command

The command to immediately start uploading any saved PIM data is formatted as described in Table 104.

TABLE 104

PIM Capture Exfiltration Command Format

| NAME | DESCRIPTION | TYPE | MIN OCCURS | MAX OCCURS |
|---|---|---|---|---|
| | ... header omitted for clarity | | | |
| Application ID | 14 (PIM Capture) | Hex Numeric | 1 | 1 |
| Command | "Ctrl + k" mc (Module Command) | Hex Numeric | 1 | 1 |
| Message Type | e (Exfiltration) | static | 1 | 1 |

Upon receipt of a PIM Capture Exfiltration command, the PIM Capture module responds immediately with an acknowledgement that the command was received and processed. Table 105 shows the format for the PIM Capture Exfiltration response.

TABLE 105

PIM Capture Exfiltration Command Acknowledgement Message Parameters

| NAME | DESCRIPTION | TYPE | MIN OCCURS | MAX OCCURS |
|---|---|---|---|---|
| | ... header omitted for clarity | | | |
| Application ID | 14 (PIM Capture) | Hex Numeric | 1 | 1 |
| ReturnCode | The error code range for all PIM Capture commands is 2400-2499. 0 = Success 2400 = No PIM capability 2401 = Start PIM Capture failure 2402 = Stop PIM Capture failure | Hex Numeric | 1 | 1 |

TABLE 105-continued

PIM Capture Exfiltration Command
Acknowledgement Message Parameters

| NAME | DESCRIPTION | TYPE | MIN OC-CURS | MAX OC-CURS |
|---|---|---|---|---|
| | 2403 = No PIM data to upload<br>2499 = General unexpected error | | | |
| ErrorString | If ReturnCode >2403, ErrorString should contain a description of the error condition(s) | Alpha numeric | 0 | 1 |
| Message Type | a—Acknowledgement | static | 1 | 1 |
| PIM Capture Information | For PIM Capture module data, a structure as defined in Table 106. | struct | 1 | 1 |

TABLE 106

PIM Capture Data Structure ("I" delimited)

| NAME | DESCRIPTION | TYPE | MIN OC-CURS | MAX OC-CURS |
|---|---|---|---|---|
| PIM Capture Data Indicator | "pcni"—A static value used to indicate that the fields that follow represent a PIM Capture Exfiltration Info struct | static | 1 | 1 |
| Number of capture segments | The number of data segments that follow. The remaining fields in this structure are repeated this number of times. 0 = no data | Hex Numeric | 1 | 1 |
| Segment Type | The type of data in this segment. This is a bit-mapped value, with Bit 0 = Calendar Data, Bit 1 = Address Book Data. Remaining bits are reserved for future use. Only one bit can be specified | Hex Numeric | 1 | 1 |
| Event Mask | A bitmask representing the event that triggered the PIM message. See Table 89a for the bitmask layout | 4 byte bitmask in Hex | 1 | 1 |
| Segment Data | The data for the segment. This can be address book data, calendar data. Other types can be supported in a similar manner. | Blob | 1 | 1 |

6.9.5.9 Configure Device Module

The configure device module permits the device and monitoring system settings to be altered from the control system (1400). Messages generated as a result of such changes, other than those to or from the control system (1400), are suppressed to maintain covertness of operation. Specific commands to the configure device module include the commands described in Table 107:

TABLE 107

Configure Device Commands

| COMMAND | ACTION |
|---|---|
| Set or Get configuration parameter | Save or return the setting of a specified parameter. Parameters include default exfiltration destination information, default exfiltration network, network credentials, OTA network settings, or other parameters by name, such as GPRS settings, Bluetooth settings, e-mail account settings, WiFi settings, etc. |

TABLE 107-continued

Configure Device Commands

| COMMAND | ACTION |
|---|---|
| Restore security settings | Restore device security configuration to most recently saved state |
| Capture security settings | Save device security configuration for later restoration |
| Set user visible settings | Sets the values for user visible memory, disk, and other system attributes. |

TABLE 108

Configure Device Command Format

| NAME | DESCRIPTION | TYPE | MIN OC-CURS | MAX OC-CURS |
|---|---|---|---|---|
| | ... header omitted for clarity | | | |
| Application ID | 18 (Configure Device) | Hex Numeric | 1 | 1 |
| Command | "Ctrl + k"<br>mc (Module Command) | Hex Numeric | 1 | 1 |
| Message Type | Static variable that signifies the type of command this is. Valid values are 'g' and 's'. (Get or Set and item). See Sections detailing each Message Type below. | static | 1 | 1 |
| Message Command struct | Structure to support Message Type | struct | 0 | 1 |

6.9.5.9.1 Configure Device Commands
6.9.5.9.1.1 Configure Device Get Command

The command to get the current values of configuration options is formatted as described in Table 109.

TABLE 109

Configure Device Get Command Format

| NAME | DESCRIPTION | TYPE | MIN OC-CURS | MAX OC-CURS |
|---|---|---|---|---|
| | ... header omitted for clarity | | | |
| Application ID | 18 (Configure Device) | Hex Numeric | 1 | 1 |
| Command | "Ctrl + k"<br>mc (Module Command) | Hex Numeric | 1 | 1 |
| Message Type | g (Get) | static | 1 | 1 |
| Get Items | Specify configuration settings to get. This is a bit-mapped value, with Bit 0 = exfiltration destination, Bit 1 = exfiltration network, Bit 2 = network credentials, Bit 3 = OTA network settings, Bit 4 = named parameter, Bit 5 = Capture Security Settings. Remaining bits are reserved for future use. | Hex Numeric | 1 | 1 |
| Named Parameter | The name of the parameter to get, when Bit 4 is set in Get Items | Alpha String | 0 | 1 |

Upon receipt of a Configure Device Get command, the Configure Device module responds immediately with an acknowledgement that the command was received and processed. This response also contains the requested data. Table 110 shows the format for the Configure Device Get response.

TABLE 110

Configure Device Get Command Acknowledgement Message Parameters

| NAME | DESCRIPTION | TYPE | MIN OC-CURS | MAX OC-CURS |
|---|---|---|---|---|
| | . . . header omitted for clarity | | | |
| Application ID | 18 (Configure Device) | Hex Numeric | 1 | 1 |
| ReturnCode | The error code range for all Configure Device commands is 2700-2799. 0 = Success 2799 = General unexpected error | Hex Numeric | 1 | 1 |
| ErrorString | If ReturnCode >0, ErrorString should contain a description of the error condition(s) | Alpha numeric | 0 | 1 |
| Message Type | a—Acknowledgement | static | 1 | 1 |
| Item Count | A count of the number of data items that follow this field. If 0, no data is returned. Each Data item consists of two fields . . . type and data. | Hex Numeric | 1 | 1 |
| Item Type | The type code for the data item that immediately follows. 1 = exfiltration network, 2 = network credentials, 3 = OTA network settings, 4 = named parameter, 5 = Capture Security Settings. | Hex Numeric | 0 | 5 |
| Item Data | The data for the item type that precedes this field. Individual item format is implementation dependent. | Alpha String | 0 | 5 |

6.9.5.9.1.2 Configure Device Set Command

The command to set one or more device configuration settings is formatted as described in Table 111.

TABLE 111

Configure Device Set Command Format

| NAME | DESCRIPTION | TYPE | MIN OC-CURS | MAX OC-CURS |
|---|---|---|---|---|
| | . . . header omitted for clarity | | | |
| Application ID | 18 (Configure Device) | Hex Numeric | 1 | 1 |
| Command | "Ctrl + k" mc (Module Command) | Hex Numeric | 1 | 1 |
| Message Type | s (Set) | static | 1 | 1 |
| Item Count | A count of the number of items to set that follow this field. If 0, no items are set. Each item consists of two fields . . . type and data. | Hex Numeric | 1 | 1 |
| Item Type | The type code for the field to be set with the data that immediately follows. 1 = exfiltration network, 2 = network credentials, 3 = OTA network settings, 4 = named parameter, 5 = Restore Security Settings, 6 = User Visible Settings | Hex Numeric | 0 | 6 |

TABLE 111-continued

Configure Device Set Command Format

| NAME | DESCRIPTION | TYPE | MIN OC-CURS | MAX OC-CURS |
|---|---|---|---|---|
| Item Data | Data to set for the item specified by the preceding field. | Alpha String | 0 | 6 |
| Parameter Name | The name of the parameter to set when bit 4 is set in Item Type | Alpha String | 0 | 1 |

Upon receipt of a Configure Device Set command, the Configure Device module responds immediately with an acknowledgement that the command was received and processed. Table 112 shows the format for the Configure Device Set response.

TABLE 112

Configure Device Set Command Acknowledgement Message Parameters

| NAME | DESCRIPTION | TYPE | MIN OC-CURS | MAX OC-CURS |
|---|---|---|---|---|
| | . . . header omitted for clarity | | | |
| Application ID | 18 (Configure Device) | Hex Numeric | 1 | 1 |
| ReturnCode | The error code range for all Configure Device commands is 2700-2799. 0 = Success 2799 = General unexpected error | Hex Numeric | 1 | 1 |
| ErrorString | If ReturnCode >0, ErrorString should contain a description of the error condition(s) | Alpha numeric | 0 | 1 |
| Message Type | a—Acknowledgement | static | 1 | 1 |

6.9.5.10 Key Logger Module

The key logger module captures keystokes on the monitored mobile device (1100) and saves these captured materials for exfililtration. The key logger module has the following capabilities:

Capture and store keystrokes
Relay stored keystrokes
Relay during capture (streaming)

The captured keystrokes can be immediately streamed to the control system (1400) as they are being entered, or saved on the device for later exfiltration.

TABLE 113

Key Logger Command Format

| NAME | DESCRIPTION | TYPE | MIN OC-CURS | MAX OC-CURS |
|---|---|---|---|---|
| | . . . header omitted for clarity | | | |
| Application ID | 19 (Key Logger) | Hex Numeric | 1 | 1 |
| Command | "Clt + k" mc (Module Command) | Hex Numeric | 1 | 1 |
| Message Type | Static variable that signifies the type of command this is. Valid values are 'c', 'q', 'a' and 'e'. (Configure, Query, Activate, Exfiltration). See Sections detailing each Message Type below. | static | 1 | 1 |

TABLE 113-continued

Key Logger Command Format

| NAME | DESCRIPTION | TYPE | MIN OC-CURS | MAX OC-CURS |
|---|---|---|---|---|
| Message Command struct | Structure to support Message Type | struct | 0 | 1 |

6.9.5.10.1 Key Logger Commands 6.9.5.10.1.1 Key Logger Configuration Command

The command to configure the options for the Key Logger module is formatted as described in Table 114.

TABLE 114

Key Logger Configuration Command Format

| NAME | DESCRIPTION | TYPE | MIN OC-CURS | MAX OC-CURS |
|---|---|---|---|---|
| Application ID | . . . header omitted for clarity 19 (Key Logger) | Hex Numeric | 1 | 1 |
| Command | "Ctrl + k" mc (Module Command) | Hex Numeric | 1 | 1 |
| Message Type | c (Configure) | static | 1 | 1 |
| Exfiltration Method | Three character code, interpreted as follows: STR—Stream keystroke data in real-time IMM—Upload keystroke data immediately after recording is stopped STO—Store keystroke data on device NDS—Upload keystroke data during next user-initiated data session NIP—Upload keystroke data during next idle period. Length of idle period must be specified with the Exfiltration Threshold parameter in this message MEM—Upload keystroke data when the available storage space reaches a minimum amount. The minimum amount of storage space must be specified with the Exfiltration Threshold parameter in this message | static | 1 | 1 |
| Exfiltration Threshold | Required for Exfiltration Method = NIP and MEM. Used to specify the threshold associated with each of these exfiltration policies | Hex Numeric | 0 | 1 |

Upon receipt of a Keystroke Logging Configuration command, the Keystroke Logging module responds immediately with an acknowledgement that the command was received and processed. Table 115 shows the format for the Keystroke Logging Configuration response.

TABLE 115

Keystroke Logging Configuration Command Acknowledgement Message Parameters

| NAME | DESCRIPTION | TYPE | MIN OC-CURS | MAX OC-CURS |
|---|---|---|---|---|
| Application ID | . . . header omitted for clarity 19 (Key Logger) | Hex Numeric | 1 | 1 |
| ReturnCode | The error code range for all Keystroke Logging commands is 2900-2999. 0 = Success 2900 = No keystroke capture capability 2901 = Start keystroke capture failed 2902 = Stop keystroke capture failed 2903 = No keystroke data to upload 2999 = General unexpected error | Hex Numeric | 1 | 1 |
| ErrorString | If ReturnCode >2903, ErrorString should contain a description of the error condition(s) | Alpha numeric | 0 | 1 |
| Message Type | a—Acknowledgement | static | 1 | 1 |

6.9.5.10.1.2 Keystroke Capture Query Configuration Command

The command to query the configuration of the Keystroke Capture module is formatted as described in Table 116.

TABLE 116

Keystroke Capture Query Command Format

| NAME | DESCRIPTION | TYPE | MIN OC-CURS | MAX OC-CURS |
|---|---|---|---|---|
| Application ID | . . . header omitted for clarity 19 (Key Logger) | Hex Numeric | 1 | 1 |
| Command | "Ctrl + k" mc (Module Command) | Hex Numeric | 1 | 1 |
| Message Type | q (Query) | Static | 1 | 1 |

Upon receipt of a Keystroke Capture Query Command, the Keystroke Capture module responds immediately with the current Keystroke Capture configuration settings in a message formatted as shown in Table 117.

TABLE 117

Keystroke Capture Query Command Acknowledgement Message Parameters

| NAME | DESCRIPTION | TYPE | MIN OC-CURS | MAX OC-CURS |
|---|---|---|---|---|
| Application ID | . . . header omitted for clarity 19 (Key Logger) | Hex Numeric | 1 | 1 |
| ReturnCode | The error code range for all Keystroke Logging commands is 2900-2999. 0 = Success 2900 = No keystroke capture capability | Hex Numeric | 1 | 1 |

TABLE 117-continued

Keystroke Capture Query Command Acknowledgement Message Parameters

| NAME | DESCRIPTION | TYPE | MIN OCCURS | MAX OCCURS |
|---|---|---|---|---|
| | 2901 = Start keystroke capture failed<br>2902 = Stop keystroke capture failed<br>2903 = No keystroke data to upload<br>2999 = General unexpected error | | | |
| ErrorString | If ReturnCode >2903, ErrorString should contain a description of the error condition(s) | Alpha numeric | 0 | 1 |
| Message Type | a—Acknowledgement | static | 1 | 1 |
| Exfiltration Method | Three character code, interpreted as follows:<br>STR—Stream keystroke data in real-time<br>IMM—Upload keystroke data immediately after recording is stopped<br>STO—Store keystroke data on device<br>NDS—Upload keystroke data during next user-initiated data session<br>NIP—Upload keystroke data during next idle period. Length of idle period must be specified with the Exfiltration Threshold parameter in this message<br>MEM—Upload keystroke data when the available storage space reaches a minimum amount. The minimum amount of storage space must be specified with the Exfiltration Threshold parameter in this message | struct | 1 | 1 |
| Exfiltration Threshold | Required for Exfiltration Method = NIP and MEM. Used to specify the threshold associated with each of these exfiltration policies. Ignored if Exfiltration Method is not NIP or MEM. | | | |

6.9.5.10.1.3 Keystroke Capture Activation Command

The command to immediately start or stop keystroke logging for the Keystroke Logger module is formatted as described in Table 118.

TABLE 118

Keystroke Logger Activation Command Format

| NAME | DESCRIPTION | TYPE | MIN OCCURS | MAX OCCURS |
|---|---|---|---|---|
| | . . . header omitted for clarity | | | |
| Application ID | 19 (Key Logger) | Hex Numeric | 1 | 1 |
| Command | "Ctrl + k"<br>mc (Module Command) | Hex Numeric | 1 | 1 |
| Message Type | a (Activation) | static | 1 | 1 |
| State | 1 = Activate Keystroke Logging<br>0 = Deactivate Keystroke Logging | boolean | 1 | 1 |
| Duration | The number of keystrokes to record. A value of 0 indicates | Hex Numeric | 1 | 1 |

TABLE 118-continued

Keystroke Logger Activation Command Format

| NAME | DESCRIPTION | TYPE | MIN OCCURS | MAX OCCURS |
|---|---|---|---|---|
| | unlimited (or until a deactivate command is received or memory of device is low) | | | |

Upon receipt of a Keystroke Logger Activation Command, the Keystroke Logger module responds immediately with an acknowledgement message formatted as described in Table 119. The acknowledgement is sent using the configured destination.

TABLE 119

Keystroke Logger Activation Command Acknowledgement Message Parameters

| NAME | DESCRIPTION | TYPE | MIN OCCURS | MAX OCCURS |
|---|---|---|---|---|
| | . . . header omitted for clarity | | | |
| Application ID | 19 (Key Logger) | Hex Numeric | 1 | 1 |
| ReturnCode | The error code range for all Keystroke Logger commands is 2900-2999.<br>0 = Success<br>2900 = No keystroke capture capability<br>2901 = Start keystroke capture failed<br>2902 = Stop keystroke capture failed<br>2903 = No keystroke data to upload<br>2999 = General unexpected error | Hex Numeric | 1 | 1 |
| ErrorString | If ReturnCode >2903, ErrorString should contain a description of the error condition(s) | Alpha numeric | 0 | 1 |
| Message Type | a—Acknowledgement | static | 1 | 1 |

6.9.5.10.1.4 Keystroke Logger Exfiltration Command

The command to immediately start exfiltrating any saved Keystroke Logger data is formatted as described in Table 120.

TABLE 120

Keystroke Logger Exfiltration Command Format

| NAME | DESCRIPTION | TYPE | MIN OCCURS | MAX OCCURS |
|---|---|---|---|---|
| | . . . header omitted for clarity | | | |
| Application ID | 19 (Key Logger) | Hex Numeric | 1 | 1 |
| Command | "Ctrl + k"<br>mc (Module Command) | Hex Numeric | 1 | 1 |
| Message Type | e (Exfiltration) | static | 1 | 1 |

Upon receipt of a Keystroke Logger Exfiltration command, the Keystroke Logger module responds immediately with an acknowledgement that the command was received and processed. Table 121 shows the format for the Keystroke Logger Exfiltration response.

TABLE 121

Keystroke Logger Exfiltration Command Acknowledgement Message Parameters

| NAME | DESCRIPTION | TYPE | MIN OCCURS | MAX OCCURS |
|---|---|---|---|---|
| | ... header omitted for clarity | | | |
| Application ID | 19 (Key Logger) | Hex Numeric | 1 | 1 |
| ReturnCode | The error code range for all Keystroke Logger commands is 2900-2999. 0 = Success 2900 = No keystroke capture capability 2901 = Start keystroke capture failed 2902 = Stop keystroke capture failed 2903 = No keystroke data to upload 2999 = General unexpected error | Hex Numeric | 1 | 1 |
| ErrorString | If ReturnCode >2903, ErrorString should contain a description of the error condition(s) | Alpha numeric | 0 | 1 |
| Message Type | a—Acknowledgement | static | 1 | 1 |
| Capture Start Time | Time key stroke capturing started.. Format of time is yyyyMMddHHmmss with a 24 hour time stamp. | Date/ Decimal | 1 | 1 |
| Capture Duration | Duration of key stroke capture in seconds. | Hex Numeric | 1 | 1 |
| Keystroke Logger Data | The logged keystrokes. | blob | 1 | 1 |

6.10 Implementation

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on programmable systems including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi conductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

Finally, the processor can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, can be received from and output to the network, for example, in the form of a computer data signal embodied in a carrier wave. The above-described devices and materials will be familiar to those of skill in the computer hardware and software arts.

It should be noted that the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities.

The present invention also relates to devices, systems or apparatus for performing the aforementioned operations. The system can be specially constructed for the required purposes, or it can be a general-purpose computer selectively activated or configured by a computer program stored in the computer. The processes presented above are not inherently related to any particular computer or other computing apparatus. In particular, various general-purpose computers can be used with programs written in accordance with the teachings herein, or, alternatively, it can be more convenient to construct a more specialized computer system to perform the required operations.

A number of implementations of the invention have been described. Nevertheless, it will be understood that various modifications can be made without departing from the spirit and scope of the invention. Accordingly, other embodiments are within the scope of the following claims.

What is claimed:

1. A method for surreptitiously monitoring a wireless communication device from a control system, comprising:
   determining a device discovery and modification (DDM) module and a control module for a wireless communication device, the DDM module comprising computer program instructions for identifying characteristics of a wireless communication device and for updating a security policy on the wireless communication device to permit a download and an installation of modules without user intervention, and the control module comprising computer program instructions for downloading and installing monitoring modules;
   constructing a first package comprising the DDM module and the control module;
   publishing the first package to enable the wireless communication device to accept and install the DDM and control modules;
   receiving the characteristics of the wireless communication device from the DDM module installed on the wireless communication device;
   determining at least one monitoring module to be installed on the wireless communication device based on the received characteristics; and
   transmitting a command to the wireless communication device to download the at least one monitoring module, the command instructing the control module to download and install the at least one monitoring module, wherein the security policy updated by the DDM module causes the control module to install and accept the at least one monitor module without user intervention and without user authorization.

2. The method of claim 1, wherein the characteristics of the wireless communication device is received directly from the wireless communication device.

3. The method of claim 1, wherein the characteristics of the wireless communication device information is received in a service call.

4. The method of claim 3, wherein the characteristics of the wireless communication device information is received as parameters to a URI being provided in the service call to the control system.

5. The method of claim 1, wherein the characteristics of the wireless communication device is received from a control service.

6. The method of claim 5, wherein the characteristics of the wireless communication device information is received from a device database.

7. The method of claim 1, wherein the DDM module is configured to determine software present on the wireless communication device.

8. The method the method of claim 7, wherein the DDM module includes computer program instructions for
   installing at least one signing certificate to the controlled wireless communication device; and
   marking the signing certificate as trusted to enable the at least one monitoring module to be downloaded without user intervention.

9. The method of claim 1, wherein the DDM module includes computer program instructions for self-deleting and passing control of the wireless communication device to the control module.

10. The method of claim 1, wherein the DDM module is instantiated by the wireless communication device from a SIM or memory card electronically coupled with the wireless communication device.

11. The method of claim 1, wherein the publishing comprises:
    sending a message to the wireless communication device causing the wireless communication device to download the DDM module.

12. The method of claim 1, wherein the publishing comprises:
    redirecting the wireless communication device to a specified WAP gateway;
    intercepting a request for a software module made through the WAP gateway; and
    downloading to the wireless communication device computer program instructions configured to install the DDM module.

13. The method of claim 12, wherein the publishing comprises:
    enhancing the requested software module to include the DDM and control modules.

14. The method of claim 7, wherein DDM module is configured to transmit a response message to the control system after the DDM module is installed on the wireless communication device.

15. The method of claim 14, wherein the at least one monitoring module includes a monitoring module indicated in the response message.

16. The method of claim 1, wherein the DDM module includes instructions for modifying SMS or OTA provisioning settings of the wireless communication device.

17. The method of claim 1, wherein the characteristics obtained by the DDM module includes the OS capabilities of the wireless communication device.

18. The method the method of claim 1, wherein the DDM module includes computer program instructions for securing a communications method between the wireless communication device and the control system.

19. The method the method of claim 1, wherein the DDM module includes computer program instructions for loading at least one interceptor to the wireless communication device.

* * * * *